United States Patent [19]

Horimai et al.

[11] Patent Number: 5,577,018

[45] Date of Patent: Nov. 19, 1996

[54] PHASE CHANGING APPARATUS AND OPTICAL PICKUP APPARATUS FOR MAGNETO-OPTIC STORAGE DEVICE USING SAME

[75] Inventors: Hideyoshi Horimai, Kawasaki; Katsuhiro Seo, Sagamihara; Kimihiro Saito, Bunkyo-ku; Kiyoshi Toyota, Oota-ku, all of Japan

[73] Assignee: Sony Corporation, Japan

[21] Appl. No.: 122,411

[22] PCT Filed: Feb. 8, 1993

[86] PCT No.: PCT/JP93/00158

§ 371 Date: Sep. 21, 1993

§ 102(e) Date: Sep. 21, 1993

[87] PCT Pub. No.: WO93/16469

PCT Pub. Date: Aug. 19, 1993

[30] Foreign Application Priority Data

Feb. 7, 1992 [JP] Japan ........................................ 4-56945
Apr. 30, 1992 [JP] Japan ........................................ 4-137769

[51] Int. Cl.[6] ........................................ G11B 11/10
[52] U.S. Cl. .................... 369/112; 369/100; 369/110; 369/109; 369/113
[58] Field of Search ............................. 369/112, 113, 369/100, 110, 109

[56] References Cited

U.S. PATENT DOCUMENTS

| | | | |
|---|---|---|---|
| 4,298,244 | 11/1981 | Kaneko et al. | 359/25 |
| 4,368,946 | 1/1983 | Kaneko et al. | 359/25 |
| 4,894,815 | 1/1990 | Yamanaka | 369/112 |
| 5,119,352 | 6/1992 | Bell, Jr. | |
| 5,150,342 | 9/1992 | Nagahara et al. | 369/44.14 |
| 5,270,996 | 12/1993 | Ono | 369/110 |

FOREIGN PATENT DOCUMENTS

| | | |
|---|---|---|
| 0258450 | 3/1988 | European Pat. Off. . |
| 0339900 | 2/1989 | European Pat. Off. . |
| 0317535 | 5/1989 | European Pat. Off. . |
| 0338840 | 10/1989 | European Pat. Off. . |
| 0463295 | 1/1992 | European Pat. Off. . |
| 57-88540 | 6/1982 | Japan . |
| 59-79446 | 5/1984 | Japan . |
| 59-96551 | 6/1984 | Japan . |
| 59-191156 | 10/1984 | Japan . |
| 61-90346 | 5/1986 | Japan . |
| 61-160852 | 7/1986 | Japan . |
| 62-66452 | 3/1987 | Japan . |
| 63-138533 | 6/1988 | Japan . |
| 63-200346 | 8/1988 | Japan . |
| 63-247941 | 10/1988 | Japan . |
| 63-291238 | 11/1988 | Japan . |
| 1315036 | 12/1989 | Japan . |

Primary Examiner—Viet Q. Nguyen
Attorney, Agent, or Firm—Ronald P. Kananen

[57] ABSTRACT

In an optical pickup apparatus, including a laser source (11) arranged along an optical axis (0-0'), a polarization beam splitter (14) and an objective lens (13), wherein light emitted from the laser source (11) is emitted on a recording plane (1a) of an optical-magnetical recording media (1) as a converged beam, light beams reflected from the recording media (1a) of the optical-magnetical recording media (1) are separated by said polarization beam splitter (14) to obtain a predetermined polarized light component, a phase change means, which changes a phase of light passing through one side of said optical axis (0-0') and a phase of light passing through another side of said optical axis (0-0') by a predetermined angle, such as ½ wavelength plate (15), a phase retardation type prism (39) and a combination optical rotation plate (52), is provided between the polarization beam splitter (14) and the objective lens (13), and, an optical detection element, which detects the light polarized by the polarization beam splitter (14), is provided at a side intersecting the phase change means of the polarization beam splitter (14).

46 Claims, 38 Drawing Sheets

LIGHT PATH OF $I_1$

LIGHT PATH OF I2

OUTGOING PATH

RETURN PATH $\alpha = 5°$ $\alpha = 10°$ $\alpha = 22.5°$ $\alpha = 30°$ $\alpha = 45°$ Ex COMPONENT (cos α)

Ey COMPONENT (sin α)

$I_1 + I_2$
AMPLITUDE = 1

PASS THROUGH OUTGOING PATH ROTATING PLATE

Ex COMPONENT
$\cos\alpha$

Ey COMPONENT
$\sin\alpha$

DIFFRACTION BY DISK

ℓ TIMES C TIMES r TIMES

ℓ TIMS C TIMS r TIMES $(C+\ell)\cos\alpha$
$(C+\ell)\cos\alpha$
$C \cdot \cos\alpha$

L ←|→ R $C \cdot \sin\alpha$   $C \cdot \sin\alpha$
$(C-\ell)\sin\alpha$   $(C-r)\sin\alpha$

L ←|→ R

RETURN ROTATIN PLATE
FIG. 36i
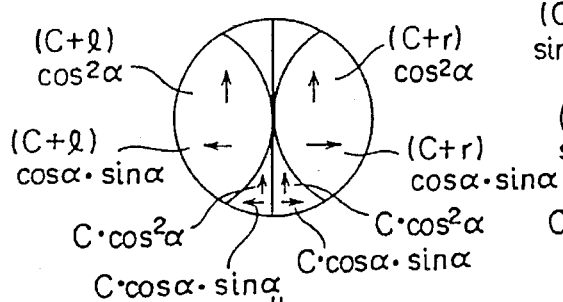
FIG. 36j
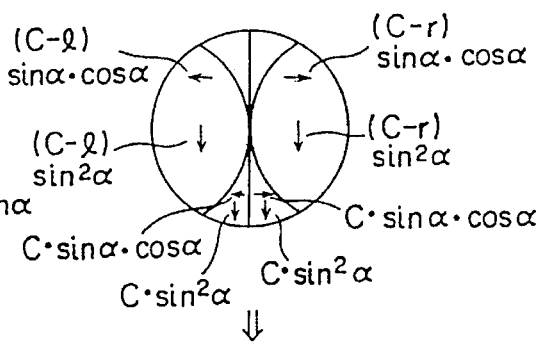
FIG. 36k PBS 14 WAVE-DETECTION (ONLY PARALLEL COMPONENT) FIG. 36ℓ
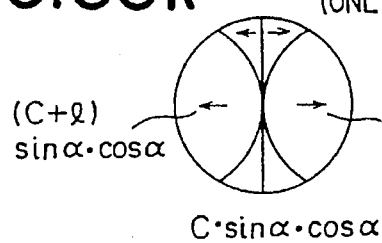
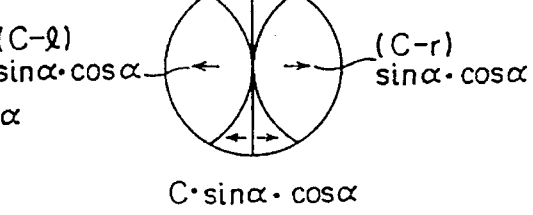
FIG. 36m
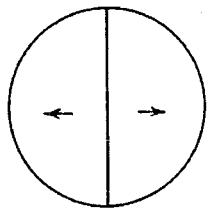
$2 \cdot C \cdot \sin\alpha \cdot \cos\alpha$ $$\frac{\text{PUSH-PULL}}{(C+\ell)-(C+r)} = \ell - r$$

THEORETICAL

EXPRRIMENTAL 5,577,018

PHASE CHANGING APPARATUS AND OPTICAL PICKUP APPARATUS FOR MAGNETO-OPTIC STORAGE DEVICE USING SAME

This application is a 371 of PCT/JP93/00158 filed Feb. 8, 1993.

TECHNICAL FIELD

The present invention relates to a phase changing apparatus such as a phase delay type prism, combination optical rotating plate, etc. and to an optical pickup apparatus used for an optical disk device using the phase changing apparatus more particularly relates to an optical pickup apparatus for a magneto-optic storage device suitable for reproduction of information recorded in a magneto-optic recording medium (MO) and a phase difference generation apparatus used in this optical pickup apparatus etc.

BACKGROUND ART

In an optical pickup apparatus used for a magneto-optic storage device for reproducing information recorded in a magneto-optic recording medium, for example, a magneto-optic disk, a linear polarized laser beam is irradiated on a recording surface of the magneto-optic disk, and the information recorded as a magnetization direction on the recording surface is converted to a rotation of the polarization plane by the electrooptic Kerr effect or the Faraday effect, which are interactions between light and magnetization, and then detected.

Such an optical pickup apparatus for a magneto-optic storage device differs from an optical pickup apparatus which reproduces information from a compact disk (CD) such as an optical disk used only for reproduction, a write-once optical disk, a phase change type optical disk, etc., that is, an optical pickup apparatus for an optical recording and reproduction apparatus which detects the change of the amount of reflection light based on the presence/absence of pits.

In an optical system for a CD, as seen in a laser coupler, a reduction of size has been realized. However, in an optical system for an MO, it is technically difficult how to design that the reflection film of a beam splitter for splitting the MO signal can be used in the converged light, and thus the reduction of size as in the optical system for a CD has not yet been realized.

On the other hand, a polarization beam splitter has been known as an optical element which can exhibit desired characteristics even if it is placed in converged light, but it has been thought to be difficult to separate a MO signal using a polarization beam splitter. Nevertheless, several methods mentioned below have been known.

A conventional optical pickup apparatus for a magneto-optic storage device is constituted by for example a semi-conductor laser; a collimate lens which collimates the light emitted from this semiconductor laser to a parallel beam; an objective lens which converges the emitted light collimated to the parallel beam by this collimate lens and irradiates the same on the recording surface of the magneto-optic disk; a polarization beam splitter which is arranged between the semiconductor laser and the objective lens and separates a part of the reflection light reflected at the recording surface of the magneto-optic disk (hereinafter referred to as the first polarization beam splitter); a light detector which detects a part of the reflection light split by this first polarization beam splitter; a photoelectric conversion element which detects the level of the light transmitted through this light detector (hereinafter referred to as a detector), etc. The emitted light from the semiconductor laser is converged and irradiated on the recording surface of the magneto-optic disk, a part of the reflection light reflected at this recording surface is split, and the level of the component having a predetermined polarization plane in a part of the split reflection light, that is, a predetermined light vibration plane is detected, and the information recorded in the magneto-optic disk is detected from that component.

As the above-mentioned light detector, a "sheet analyzer" has been generally used, but a sheet analyzer has a low "extinction rate", and therefore has a problem in that the S/N (signal to noise ratio) is low. This type of optical pickup apparatus for a magneto-optic storage device is not used much at all at present.

Therefore, an optical pickup apparatus for a magneto-optic storage device using a ½-wavelength plate and a second polarization beam splitter in place of the above-described light detector has been proposed. In this optical pickup apparatus for a magneto-optic storage device, the components of the reflection light split by the first polarization beam splitter, that is, the so-called P wave component, i.e., the component having the same plane of vibration as that of the emitted light from the laser, and the S wave component, which has a vibration direction orthogonal to this P wave component, are split by the ½-wavelength plate and the second polarization beam splitter in place of the light detector, the levels of the split orthogonal S wave component and P wave component are detected by the two detectors, a level difference between them is detected at a differential amplifier, and the recorded information is detected by the differentiation method.

In an optical pickup apparatus for a magneto-optic storage device using a ½-wavelength plate and a second polarization beam splitter in place of a light detector, since the S wave component of the laser beam split from the reflection light at the first polarization beam splitter is a magneto-optic signal (hereinafter referred to as an MO signal), the reflectance with respect to the S wave of the first polarization beam splitter is desirably set to 100 percent, but the reflectance with respect to the P wave component is still set so that the amount of light incident upon the detector and a shot noise of the detector or a noise due to the birefringence of the disk substrate or the like are well balanced, and therefore there is a problem in that the coupling efficiency is low in comparison with an optical pickup apparatus used only for reproduction etc. Also, the laser beam split at the first polarization beam splitter is split into two components by the second polarization beam splitter, and therefore it is necessary to establish the light path for it. The dimensions for the establishment of the light path are large, and thus the reduction of size of the optical pickup apparatus is difficult. Further, the coating for the polarization-splitting of the polarization beam splitter is difficult. For example, the coating technique for reducing the phase difference with respect to the P wave and S wave is very difficult, and therefore generally it is necessary to arrange the first polarization beam splitter in the parallel beam, and a collimate lens is always necessary.

Further, there has also been known an optical pickup apparatus for a magneto-optic storage device not using a ½-wavelength plate and a second polarization beam splitter, but using a Wollaston prism in place of the above-described light detector. However, this optical pickup apparatus for a magneto-optic storage device also meets with a similar problem to the one which occurred in the optical pickup apparatus for a magneto-optic storage device using a ½-wavelength plate and a second polarization beam splitter.

DISCLOSURE OF THE INVENTION

An object of the present invention is to achieve a reduction of size of a magneto-optic storage device reproducing information recorded in a magneto-optic recording medium such as a magneto-optic disk by reducing the number of parts of the optical pickup apparatus.

Another object of the present invention is to provide an optical pickup apparatus for a magneto-optic storage device having a high coupling efficiency.

A further object of the present invention is to provide a phase changing apparatus which can be suitably used for such an optical pickup apparatus for a magneto-optic storage device.

Still another object of the present invention is to provide a phase changing apparatus for changing the phase of the light which can be suitably applied for various purposes, not being restricted to an optical pickup apparatus for a magneto-optic storage device.

In an optical pickup apparatus for a magneto-optic storage device of the present invention, a phase change means such as a ½-wavelength plate, a phase difference generation prism, a combination optical rotating plate, etc. is used.

Therefore, according to the present invention, there is provided an optical pickup apparatus having a laser beam source, a polarization beam splitter, an objective lens, and a light detection element, which are arranged along a light axis, wherein an emitted light from the aforesaid laser beam source is emitted as converged light to the recording surface of the magneto-optic recording medium and in which a predetermined polarization light component in the reflection light from the recording surface of the magneto-optic recording medium is split by the aforesaid polarization beam splitter and taken out by the aforesaid light detection element, characterized in that:

a phase change means for changing the phase of the light passing through one side of the aforesaid light axis and the phase of the light passing through the other side of the aforesaid light axis exactly at a predetermined angle is provided between the aforesaid polarization beam splitter and the aforesaid objective lens; and the light changed by the aforesaid phase change means is detected via the aforesaid polarization beam splitter and the aforesaid light detection element.

As the aforesaid phase change means, use can be made of a ½-wavelength plate which has two division regions obtained by division into at least two sections facing each other across the aforesaid light axis as a boundary on a plane orthogonal to the aforesaid light axis, has planes of vibration at predetermined angles with respect to the aforesaid light axis, and has C axes with respect to the aforesaid light axes as a $C_1$ axis and $C_2$ axis and which is arranged so as to allow the emitted light from the aforesaid laser beam source to pass through one division region and allow the reflection light reflected at the recording surface of the aforesaid magneto-optic recording medium to pass through another division region.

The aforesaid light detection element is divided into four regions corresponding to the division of the aforesaid ½-wavelength plate with the aforesaid light axis as the center, preferably is divided into four so as not to have a detection portion in a portion corresponding to the aforesaid light axis, and detects the magneto-optic (MO) recording signal recorded in the aforesaid magneto-optic recording medium from the detection signals of the four division regions.

Preferably, the aforesaid ½-wavelength plate is face-adhered to the surface of the aforesaid objective lens side of the aforesaid polarization beam splitter.

Also, preferably, as the aforesaid light detection element, a light detection element having a large light receiving surface area is secured to the plane of the aforesaid polarization beam splitter orthogonal to the surface to which the aforesaid ½-wavelength plate is face-adhered.

Further, preferably, a hologram laser unit equipped with a focus error detection function is used as the aforesaid laser beam source.

Preferably a polarization beam splitter having a phase difference relative to the polarized P wave component and the polarized S wave component of almost 0° is used as the aforesaid polarization beam splitter.

Also, a light detection element such as an avalanche photodiode (APD) in which the angles of the planes of vibration in the aforesaid two division regions of the aforesaid ½-wavelength plate are made different and the light receiving plane is not divided as the aforesaid light detection element is used.

Also, the optical pickup apparatus for the magneto-optic storage device is preferably provided with a microprism which has a first parallel plane having a plane with a predetermined inclination angle and reflecting light incident through that plane at a first position and a second parallel plane parallel to the aforesaid first parallel plane at which the light reflected at that first position is further reflected and is constituted so that the light reflected at the second parallel plane is further reflected to a second position of the first parallel plane; two light detection elements which are provided corresponding to the aforesaid first portion and second position of the aforesaid first parallel plane, each of which has three division regions obtained by division into three, i.e., a center portion and the two side portions thereof; a first mirror using a laser coupler integrally constituting a laser beam source provided so as to face the aforesaid inclined plane of the aforesaid microprism on the same semiconductor substrate and provided on the side at which the light from the aforesaid laser beam source incident upon the inclined plane of the aforesaid microprism is reflected; a second mirror facing the reflection plane of the first mirror, receiving reflection light from the first mirror, and emitting it in an orthogonal direction; and a ½-wavelength plate for dividing the emitted light from the second mirror which has two division regions which are obtained by division into at least two sections facing each other across the aforesaid light axis as a boundary on the plane orthogonal to the aforesaid light axis, have planes of vibration at predetermined angles, and have C axes with respect to the aforesaid optical axis of the $C_1$ axis and $C_2$ axis and which is arranged so that the emitted light from the aforesaid second mirror passes through one division region, and the reflection light reflected at the recording surface of the aforesaid magneto-optic recording medium passes through another division region.

The optical pickup apparatus for the magneto-optic storage device further includes two differential amplifiers which detect the differential signal from the three division regions of the aforesaid two light detection elements and a third differential amplifier which further differentially amplifies the output signal of these differential amplifiers.

Also, as the aforesaid phase change means, use can be made of a phase difference generation device which has a 45 degree prism and has phase difference generation film which is coated on the reflection surface of the 45 degree prism, has a plurality of division regions which are obtained by division into at least two on a plane orthogonal to the aforesaid light axis and have mutually predetermined phase difference characteristics and which is arranged so that the emitted light from the aforesaid laser beam source passes through one division region, and the reflection light reflected at the recording surface of the aforesaid magneto-optic recording medium passes through another division region.

The film thickness of the aforesaid phase difference generation film may be adjusted to change the aforesaid phase difference.

The number of the aforesaid division regions may be two, which two division regions may be obtained by division symmetrically using a diagonal line of the aforesaid reflection plane as the center, symmetrically in the vertical direction of the reflection plane, or symmetrically in a horizontal direction of the reflection plane.

Further, as the aforesaid phase change means, use can be made of a combination optical rotating plate which has division regions obtained by division into at least two on a plane orthogonal to the aforesaid light axis, which passes the emitted light from the aforesaid laser beam source through one side region while optical rotating the same right or optical rotating the same left exactly at a predetermined angle and passes the reflection light reflected at the recording surface of the above-described magneto-optic recording medium through the other side region while optical rotating the same in an inverse rotation direction to the above-described rotation exactly at a predetermined angle.

The optical rotation angle of the aforesaid combination optical rotating plate is defined by the material and thickness of the optical combination optical rotating plate.

As the aforesaid combination optical rotating plate, (1) use may be made of a divisional combination optical rotating plate which is divided by a line parallel to the direction of formation of the pits of the recording surface of the aforesaid magneto-optic disk and wherein the aforesaid phase change characteristics are adjusted by setting the optical rotation angle of the divisional left optical rotating plate and right optical rotating plate to a predetermined value or (2) use may be made of a divisional optical combination rotating plate which is divided by a line orthogonal to the direction of formation of the pits of the recording surface of the aforesaid magneto-optic disk and wherein the aforesaid phase change characteristics are adjusted by setting the optical rotation angle of the divisional left optical rotating plate and right optical rotating plate to predetermined values.

The optical rotation angle of the aforesaid combination optical rotating plate is set to about 10° or more and 22.5° in the latter half.

According to the present invention, there is also provided a phase difference generation device which has a 45 degree prism and a plurality of division regions which are coated on the reflection surface of the 45 degree prism, are obtained by division into at least two on the plane orthogonal to the aforesaid light axis, and have mutually predetermined phase difference characteristics and wherein a predetermined phase difference is produced between the light incident upon one division region and the light emitted from the other region.

Further, according to the present invention, there is provided a combination optical rotating plate which has division regions obtained by division into at least two on a plane orthogonal to the light axis and formed so as to pass the light incident upon one region therethrough while optical rotating the same right or optical rotating the same left exactly at a predetermined angle and pass the light incident upon another region while optical rotating the same in an inverse rotation direction to the above-described rotation exactly at a predetermined angle.

The optical rotation angle of the aforesaid optical rotating plate is defined by the material and thickness of the combination optical rotating plate.

BRIEF DESCRIPTION OF THE DRAWINGS

These object and features and other objects and other features of an optical pickup apparatus for a magneto-optic storage device of the present invention mentioned above will be more apparent from the following description with reference to the accompanying drawings, in which:

FIG. 36a to FIG. 36m are views illustrating the beam trace in FIG. 35.

BEST MODE FOR CARRYING OUT THE INVENTION

An optical pickup apparatus of the first embodiment of the optical pickup apparatus for the magneto-optic storage device of the present invention will first be explained referring to FIG. 1 to FIG. 16.

Figure 1:
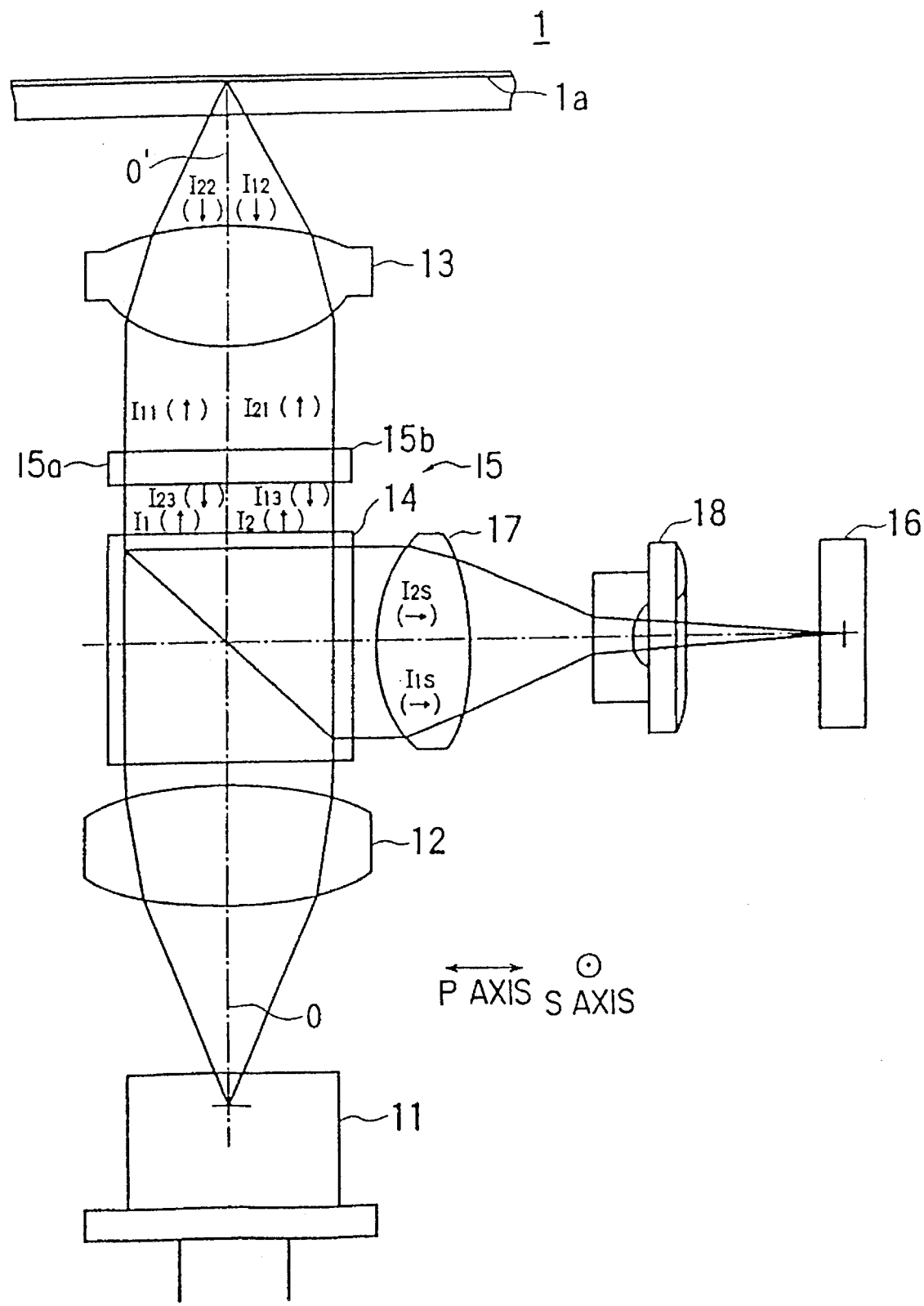
FIG. 1 is a plan structural view of an optical pickup apparatus of one embodiment of an optical pickup apparatus for a magneto-optic storage device of the present invention.

FIG. 1 is a view showing the plan structure of an optical pickup apparatus of the first embodiment of the optical pickup apparatus for the magneto-optic storage device of the present invention used when information recorded on, for example, a magneto-optic disk is reproduced.

This optical pickup apparatus is constituted by a laser beam source 11; a collimate lens 12 which collimates the emitted light from this laser beam source 11 to a parallel beam; an objective lens which converges the parallel beam from this collimate lens 12 and irradiates the same to the recording surface 1a of the magneto-optic disk 1; a polarization beam splitter (PBS) 14 which is arranged between the laser beam source 11 and the objective lens 13 and splits the predetermined polarization beam component in the reflection light reflected at the recording surface 1a of the magneto-optic disk 1; a ½-wavelength plate 15 which is arranged between the polarization beam splitter 14 and the magneto-optic disk 1, in which the C axes in the regions 15a and 15b obtained by division into at least two, i.e., left and right (or upper and lower) on the plane orthogonal to the light axis O-O', that is the $C_1$ axis and $C_2$ axis, are set to have different angles; a photoelectric conversion element (hereinafter referred to as a detector) 16 as the light detection element detecting the level of the predetermined polarization beam component split at the polarization beam splitter 14; a condenser lens 17 which is arranged between the polarization beam splitter 14 and the detector 16 and converges the predetermined polarization beam component split at the polarization beam splitter 14, that is, the S wave component or P wave component; and a cylindrical lens 18 which is arranged between this condenser lens 17 and the detector 16 for producing the focus error signal FE.

The laser beam source 11 is constituted by, for example, a semiconductor laser.

The collimate lens 12 collimates the emitted light from the laser beam source 11 to a parallel beam and makes the same incident upon the polarization beam splitter 14.

In the plane parallel to the recording surface 1a of the magneto-optic disk 1, if the axis parallel to the sheet surface of FIG. 1 is the P axis and the axis vertical to the sheet surface (axis orthogonal thereto) is the S axis, the P wave having the plane of polarization (vibration direction) parallel to, for example, the P axis is output from the laser beam source 11.

In the polarization beam splitter 14, theoretically, the reflectance is 0 percent with respect to the P wave and 100 percent with respect to the S wave. In other words, the transmittance of the polarization beam splitter 14 is 100 percent with respect to the P wave and 0 percent with respect to the S wave. Accordingly, the polarization beam splitter 14 transmits the emitted light, which is the P wave, from the laser beam source 11 100 percent therethrough, and the P wave transmitted through the polarization beam splitter 14 is incident upon the ½-wavelength plate 15.

The ½-wavelength plate 15 has at least two division regions 15a and 15b on the plane vertical (orthogonal) to the light axis. The C axes in these regions, that is, $C_1$ axis and $C_2$ axis, have the different angles.

Figure 2:
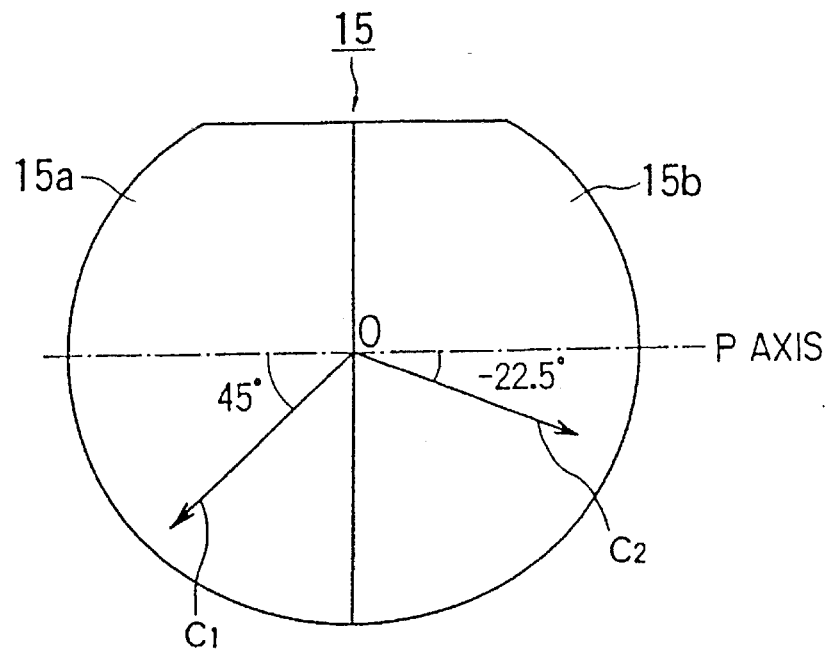
FIG. 2 is a plan view showing the $C_1$ axis and $C_2$ axis in two regions constituting a ½-wavelength plate constituting the optical pickup apparatus of the first embodiment of the present invention.

Concretely, in the ½-wavelength plate 15, as shown in FIG. 2, the boundary of the regions 15a and 15b obtained by division into two on the plane orthogonal to the light axis O-O' runs through the light axis O-O', and the C axis which is in parallel to the S axis and is the phase advanced axis of the ½-wavelength plate 15 has a first axis having an angle of 45 degrees with respect to the P axis in the first division region 15a (hereinafter this axis is referred to as the $C_1$ axis) and a second axis having an angle of −22.5 degrees with respect to the P axis in the second division region 15b (hereinafter this axis is referred to as the $C_2$ axis).

Accordingly, as shown in FIG. 1, the optical component (hereinafter referred to as the laser beam $I_1$) passing through the first division region 15a in the P wave from the polarization beam splitter 14 passes through the first division region 15a as shown in for example FIG. 3, whereby it is converted so that the vibration plane thereof becomes linearly symmetrical relative to the $C_1$ axis and becomes the laser beam $I_{11}$ which is the S wave. On the other hand, the component (hereinafter referred to as the laser beam $I_2$) passing through the second division region 15b in the P wave from the polarization beam splitter 14 passes through the second division region 15b as shown in for example FIG. 4, whereby it is converted so that the vibration direction thereof becomes linearly symmetrical relative to the $C_2$ axis and becomes the laser beam $I_{21}$, the vibration plane of which has an angle of −45 degrees with respect to the P axis.

In this way, the laser beam $I_1$ on the left side on the sheet surface and the laser beam $I_2$ on the right side with respect to the light axis O-O' in FIG. 1 in the emitted light from the laser beam source 11 are respectively converted to the laser beam $I_{11}$ of the S wave and the laser beam $I_{21}$ having a vibration direction of −45 degrees with respect to the P axis by the ½-wavelength plate 15, and then are converged by the objective lens 13 and irradiated to the recording surface 1a of the magneto-optic disk 1.

The recording surface 1a of the magneto-optic disk 1 is magnetized in a predetermined direction on the basis of the storage information. The laser beams $I_{11}$ and $I_{21}$ are reflected at the recording surface 1a of the magneto-optic disk 1, whereby the vibration direction thereof is rotated exactly by −θ degrees as shown in FIG. 3 and FIG. 4 by the interaction between the light and magnetization, for example, the "electrooptic Kerr effect", and they are converted to the laser beams $I_{12}$ and $I_{21}$ with planes of vibration which respectively come to have an angle of −θ degrees with respect to the laser beams $I_{11}$ and $I_{12}$ and, at the same time, their optical paths are inverted between the outgoing path and returning path with the light axis O-O' as a boundary.

Concretely, the laser beam $I_{12}$, which is the reflection beam of the laser beam $I_{11}$, passes through the right side on the sheet surface with respect to the light axis O-O' in FIG. 1, and the laser beam $I_{22}$, which is the reflection beam of the laser beam $I_{21}$, passes through the left side on the sheet surface with respect to the light axis O-O'.

The laser beams $I_{12}$ and $I_{22}$ reflected at the storage surface 1a of the magneto-optic disk 1 are collimated to parallel beams by the objective lens 13, and then are made incident upon the ½-wavelength plate 15 again.

Figure 3:
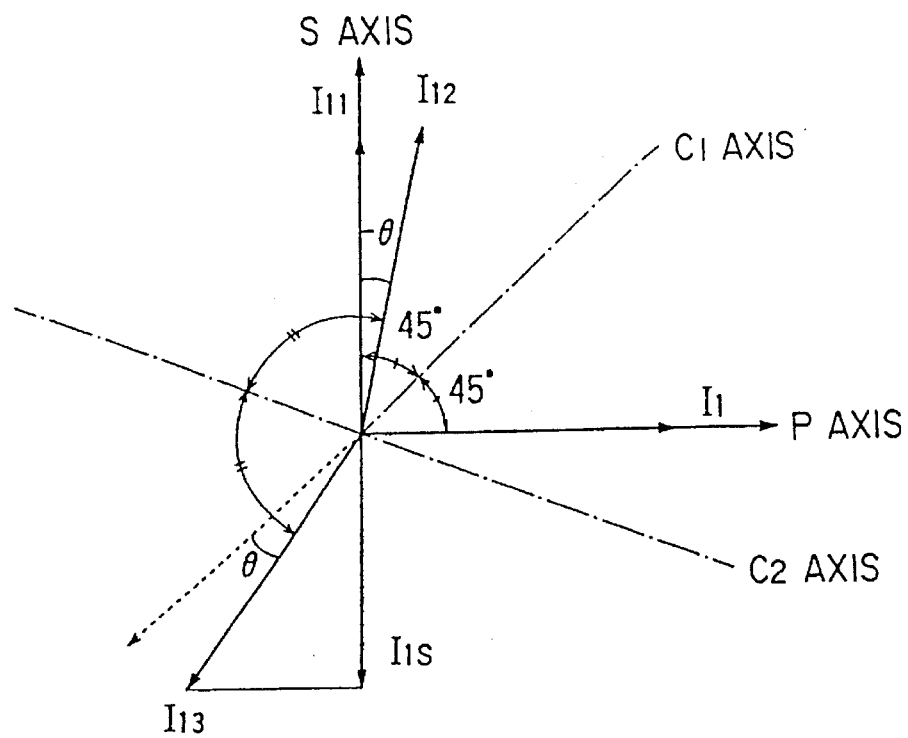
FIG. 3 is a view showing a first aspect of a vector of a laser beam for explaining the operation principle of the optical pickup apparatus of the first embodiment of the present invention.
Figure 4:
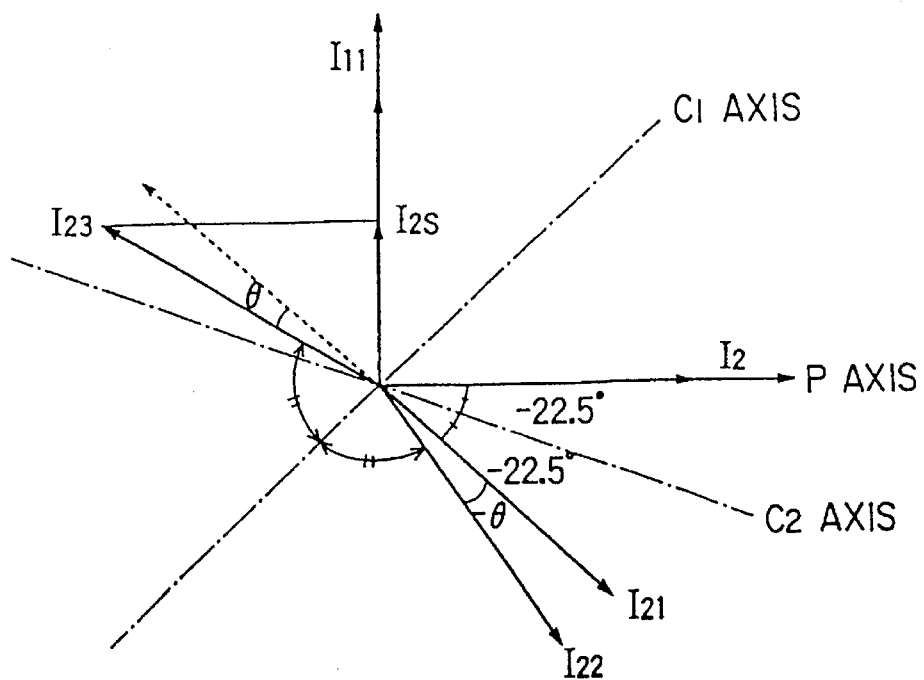
FIG. 4 is a view showing a second aspect of a vector of a laser beam for explaining the operation principle of the optical pickup apparatus of the first embodiment of the present invention.

Since the ½-wavelength plate 15 has the $C_1$ axis and $C_2$ axis having different angles in the two division regions 15a and 15b as mentioned above, the laser beam $I_{12}$ reflected at the recording surface 1a of the magneto-optic disk 1, passing the right side of the light axis O-O', passes through the second division region 15b, whereby, as shown in FIG. 3, it is converted so that its plane of vibration becomes linearly symmetrical relative to the $C_2$ axis, and becomes the laser beam $I_{13}$ having a plane of vibration advanced exactly by θ degrees with respect to the component (indicated by a broken line) having a vibration direction coincident with the $C_1$ axis obtained in a case where it is assumed that there is no electrooptic Kerr effect. On the other hand, the laser beam $I_{22}$ reflected at the recording surface 1a of the magneto-optic disk 1, passing the left side of the light axis O-O', passes through the first division region 15a, whereby, as shown in FIG. 4, it is converted so that its plane of vibration becomes linearly symmetrical relative to the $C_1$ axis and becomes the laser beam $I_{23}$ having the plane of vibration orthogonal to the $C_1$ axis obtained in a case where it is assumed that there is no electrooptic Kerr effect, and having a plane of vibration advanced exactly by θ degrees with respect to the component (indicated by a broken line) having the same level as that of the component having the plane of vibration coincident with the $C_1$ axis.

These laser beams $I_{13}$ and $I_{23}$ are incident upon the polarization beam splitter 14.

In the polarization beam splitter 14, as mentioned above, the reflectances with respect to the P wave and the S wave become 0 percent and 100 percent, respectively, and therefore in the polarization beam splitter 14, only the S wave components of the laser beams $I_{13}$ and $I_{23}$ are reflected and are made to be incident upon the detector 16 via the condenser lens 17 and the cylindrical lens 18.

Figure 5:
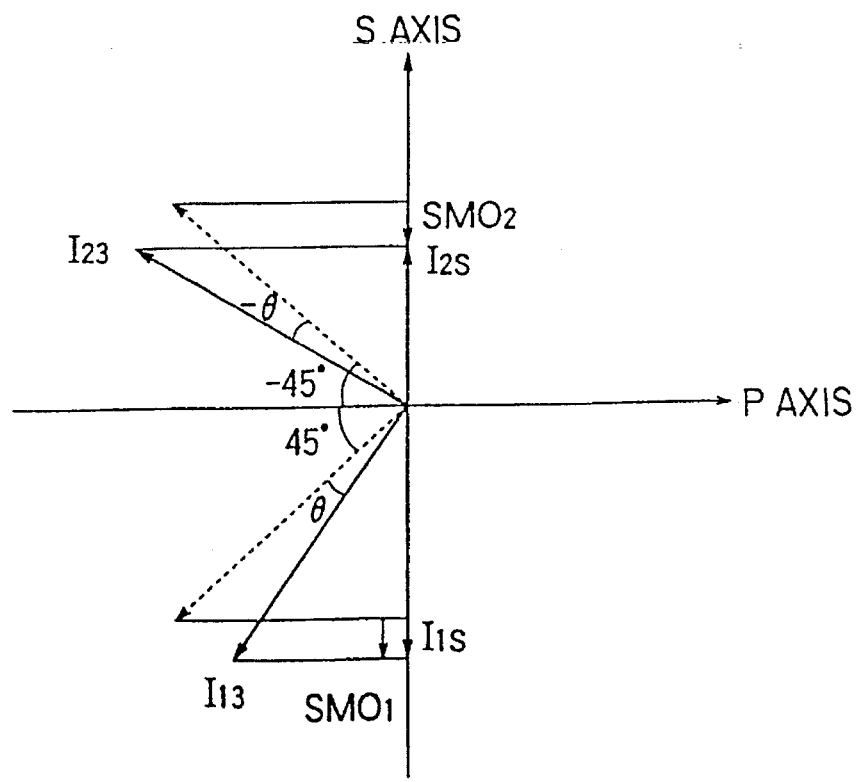
FIG. 5 is a view showing a third aspect of a vector of a laser beam for explaining the operation principle of the optical pickup apparatus of the first embodiment of the present invention.

Concretely, as shown in FIG. 5, the component obtained by projecting the laser beam $I_{13}$ to the S axis (hereinafter referred to as light component $I_{1S}$) and the component obtained by projecting the laser beam $I_{23}$ to the S axis (hereinafter referred to as light component $I_{2S}$) are made incident upon the detector 16.

Figure 6:
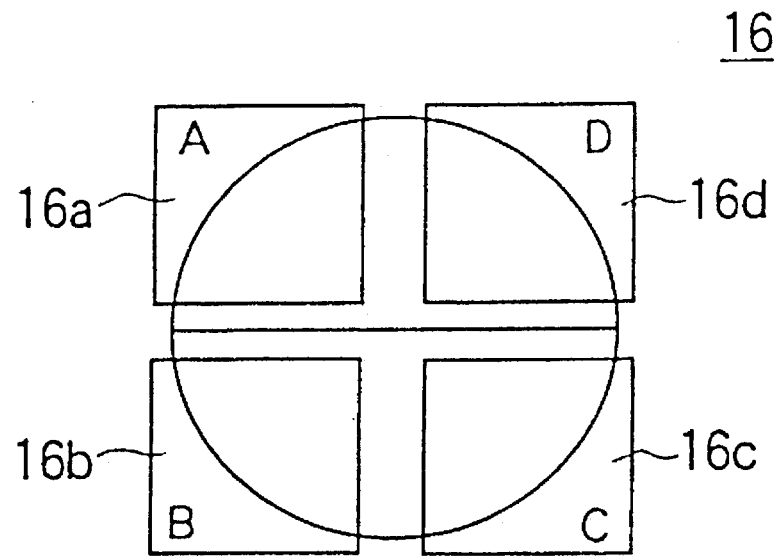
FIG. 6 is a view diagrammatically showing a light receiving region of a detector constituting the optical pickup apparatus of the first embodiment of the present invention.

The detector 16 is divided into a plurality of parts in the light receiving region thereof, for example, as shown in FIG. 6, is divided into four regions 16a, 16b, 16c, and 16d. The divisional arrangement is an arrangement in which the level of the light component $I_{1S}$ is detected by the regions 16b and 16c, and the level of the light component $I_{2S}$ is detected by the regions 16a and 16d.

Accordingly, when the level signals detected at the regions 16a, 16b, 16c, and 16d of the detector 16 are the level signals A, B, C, and D, respectively, by finding the difference of the level signals (B+C) detected by the two of the regions 16b and 16c from the level signals (A+D) detected by the two of the regions 16a and 16d, that is, by the "Push-Pull method", as shown in FIG. 5, a signal defined by the following equation, having a value proportional to the angle displacement θ by the electrooptic Kerr effect can be obtained:

$$-(|SMO_1|+|SMO_2|)$$

On the other hand, when the recording surface 1a of the magneto-optic disk 1 is magnetized in an inverse direction to that mentioned above, a signal defined by the following equation, having a value with an inverted polarity proportion to the angle displacement θ of the plane of vibration by the electrooptic Kerr effect, can be obtained:

$$(|SMO_1|+|SMO_2|)$$

As a result, a reproduction signal (hereinafter referred to as an MO signal) obtained by reproducing the information recorded on the magneto-optic disk 1 (hereinafter referred to as an MO signal) can be obtained by the following equation 1:

$$MO\ signal=(A+D)-(B+C) \quad (1)$$

As mentioned above, in the optical pickup apparatus of the first embodiment of the present invention, light in the emitted light from the laser beam source 11, which is passed through the first division region 15a of the ½-wavelength plate 15, is irradiated to the recording surface 1a of the magneto-optic disk 1 via the objective lens 13, and the reflection light reflected thereat is made to pass through the second division region 15b of the ½-wavelength plate 15 via the objective lens 13 and made be incident upon the detector 16 via the condenser lens 17 and the cylindrical lens 18. Also, light in the emitted light from the laser beam source 11, which is passed through the second division region 15b of the ½-wavelength plate 15, is irradiated to the recording surface 1a of the magneto-optic disk 1 via the objective lens 13, and the reflection light reflected thereat is made to pass through the first division region 15a of the ½-wavelength plate 15, is split by the polarization beam splitter 14, and is made incident upon the detector 16 via the cylindrical lens 18. As a result, the MO signal defined by equation 1 can be detected at the detector 16.

The optical pickup apparatus for the magneto-optic storage device of the first embodiment of the present invention mentioned above and the conventional optical pickup apparatus for a magneto-optic storage device mentioned above will be compared. The light detector needed in the conventional optical pickup apparatus for the magneto-optic storage device, the ½-wavelength plate and polarization beam splitter used in place of the light detector, and the Wollaston prism replacing the light detector become unnecessary in the optical pickup apparatus of the present invention. That is, in the optical pickup apparatus of the present invention, the number of parts can be reduced, the size of the apparatus can be made smaller, and a lower price can be realized. Also, in the conventional optical pickup apparatus, as mentioned above, the reflectance of the polarization beam splitter with respect to the P wave component must be set so that the amount of light incident upon the detector and the noise are well balanced, but in the present invention, the reflectance of the polarization beam splitter 14 with respect to the P wave component can be set to 0 percent in actuality, that is, the so-called coupling efficiency in the outgoing path can be made almost 100 percent, and thus a high coupling efficiency can be obtained. As a result, it becomes possible to use even a laser diode having a small output power as that used in a compact disk (CD) device etc. in the optical pickup apparatus for the magneto-optic storage device of the present invention.

Further, as shown in FIG. 5, in the optical pickup apparatus of the present invention, the amount of light of the P wave component and the S wave component of the laser beam passed through the ½-wavelength plate 15 two times is made almost 50 percent based on the emitted light, whereby it is possible to make the same resistant to the effect of the birefringence.

Note that, in the optical pickup apparatus of the present invention, the ½-wavelength plate 15 is formed so that the inclinations of the $C_1$ axis and $C_2$ axis are made different from each other between the region 15a and region 15b as mentioned above, whereby it can be considered that an influence is exerted upon the MO signal by the boundary between the region 15a and the region 15b, but as shown in FIG. 6, by not detecting the part corresponding to the boundary at the detector 16, it is possible to reduce the influence to zero.

On the other hand, the focus error signal FE can be calculated by the following equation 2 by the "astigmatism method":

$$FE=(A+C)-(B+D) \quad (2)$$

As clear from equation 2, in the optical pickup apparatus of this embodiment, the MO signal and the focus error signal FE can be detected by one optical system. In other words, the optical pickup apparatus for the magneto-optic storage device of the present invention can be made to have almost the same simple structure as that of the optical pickup apparatus for the optical disk of the type used only for reproduction, of the write once type, etc. That is, the structure can be made simple compared with the conventional optical pickup apparatus for a magneto-optic storage device.

Figure 7:
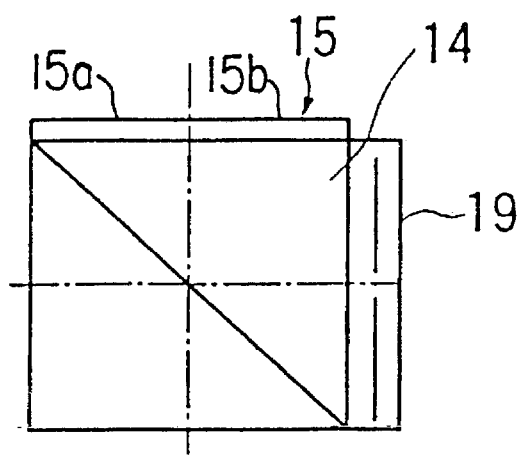
FIG. 7 is another structural view of a polarization beam splitter, a ½-wavelength plate, and a detector constituting the optical pickup apparatus of the first embodiment of the present invention.

The structures of the above-mentioned ½-wavelength plate 15, detector 16, etc. are not restricted to the structures shown in FIG. 1. For example, as shown in FIG. 7, it is also possible to arrange the detector 19 or a ½-wavelength plate 15 having a large light receiving surface area on the corresponding plane of the polarization beam splitter 14 in close contact to detect the MO signal without the use of the condenser lens 17.

Figure 8:
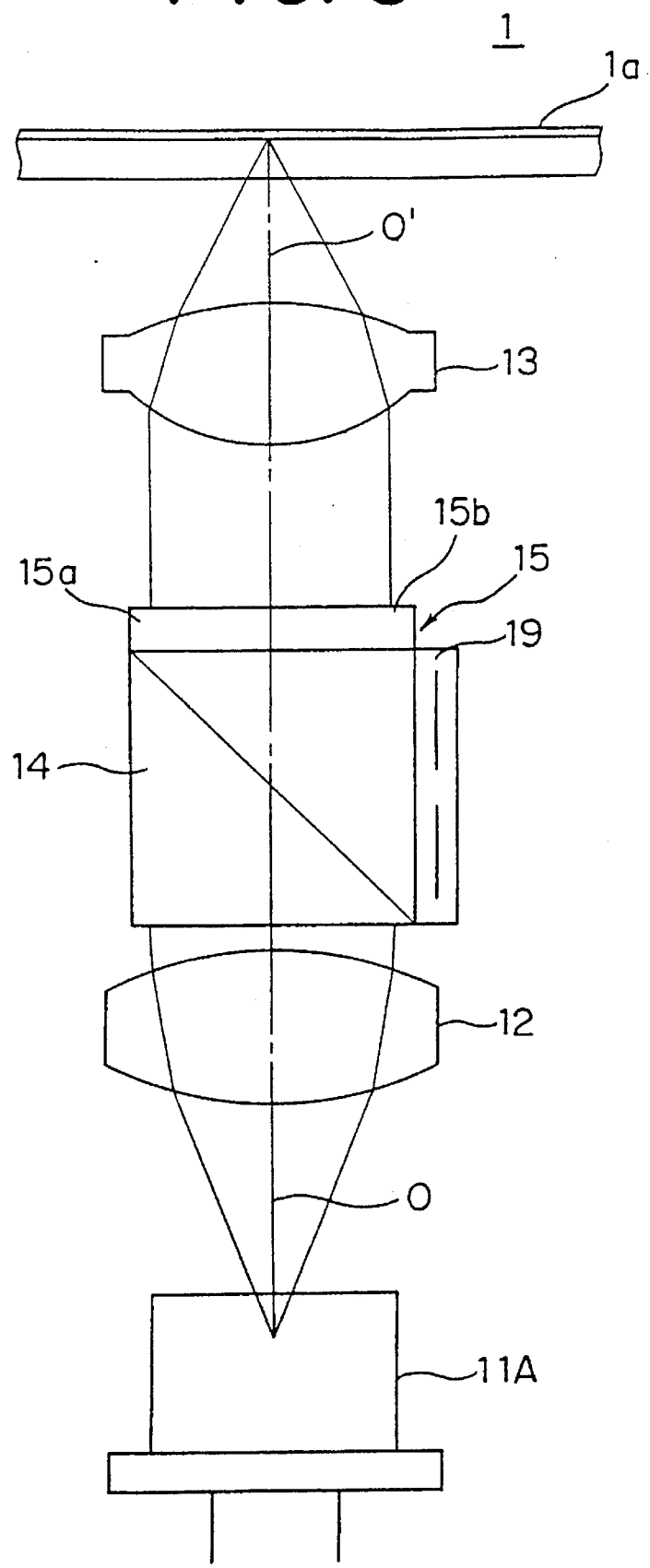
FIG. 8 is a plan structural view of an optical pickup apparatus using the polarization beam splitter, ½-wavelength plate, and detector shown in FIG. 7 as a first modified aspect of the first embodiment of the present invention.

FIG. 8 is a plan structural view of the optical pickup apparatus for a magneto-optic storage device of the first modified aspect of the structure of the optical pickup apparatus of the first embodiment shown in FIG. 1. The optical pickup apparatus shown in FIG. 8 has a laser beam source 11, a collimate lens 12, a polarization beam splitter 14, a ½-wavelength plate 15, a detector 19 having a large light receiving surface area, and an objective lens 13.

When comparing the optical pickup apparatus shown in FIG. 8 with the optical pickup apparatus shown in FIG. 1, in the optical pickup apparatus shown in FIG. 8, the distance between the polarization beam splitter 14 and the objective lens 13 is shortened. Further, in the optical pickup apparatus shown in FIG. 8, the condenser lens 17 and the cylindrical lens 18 are unnecessary. As a result, the optical pickup apparatus shown in FIG. 8 becomes further smaller in size than the optical pickup apparatus shown in FIG. 1. The laser beam source 11A of FIG. 8 uses for example a laser unit equipped with a hologram provided with for example a focus error detection function.

Figure 9:
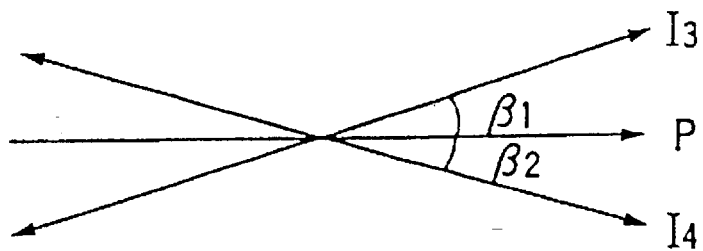
FIG. 9 is a view showing a vector of a laser beam for explaining the relationship between the $C_1$ axis and $C_2$ axis in the two regions constituting the ½-wavelength plate constituting the optical pickup apparatus of the first embodiment of the present invention.

It is sufficient if the structure of the ½-wavelength plate 15 is such that, for example, as shown in FIG. 9, the laser beam $I_3$ (corresponding to the light component shown by a broken line in FIG. 3) which is passed through the ½-wavelength plate 15 two times and in a case assuming there is no electrooptic Kerr effect and the laser beam $I_4$ (corresponding to the light component indicated by a broken line in FIG. 4) are symmetrical ($\beta_1=\beta_2=\beta$).

Figure 10:
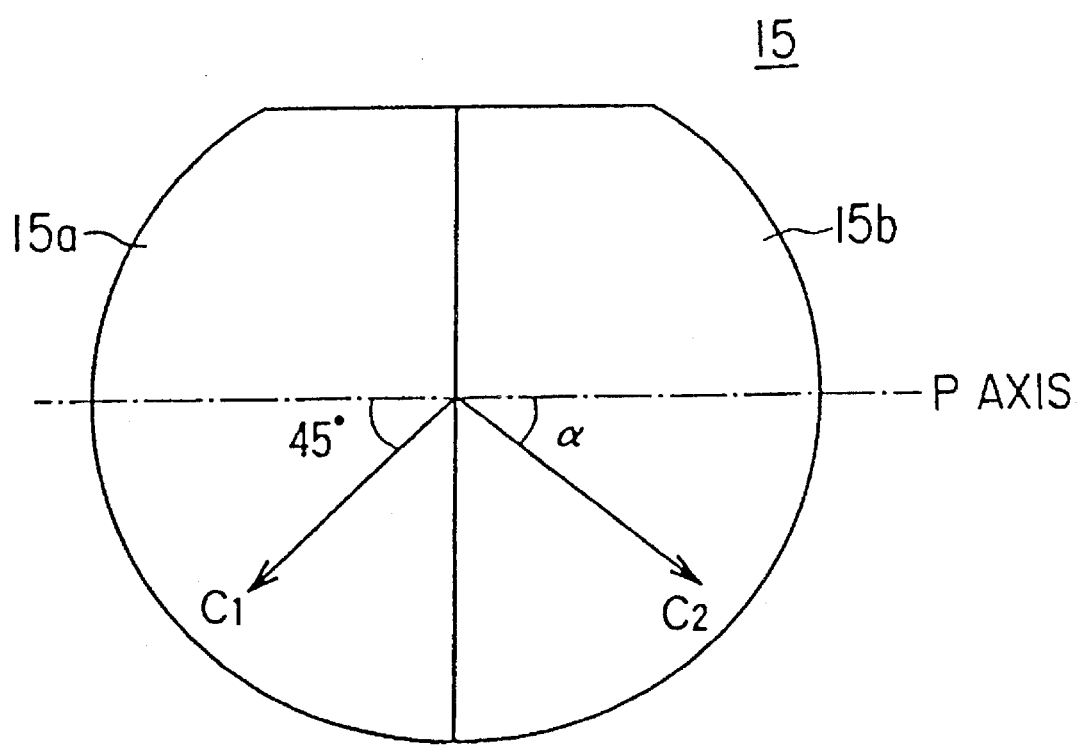
FIG. 10 is another structural view of a ½-wavelength plate constituting the optical pickup apparatus of the first embodiment of the present invention.

Concretely, for example, as shown in FIG. 10, when assuming that the angle of the $C_1$ axis of the first region 15a of the ½-wavelength plate 15 with respect to the P axis is 45 degrees, the angle α of the $C_2$ axis of the second region 15b of the ½-wavelength plate 15 with respect to the P axis can be obtained by the following equation 3:

$$\alpha = \frac{1}{2}(90-\beta) \qquad (3)$$

For example, when β=10 degrees, α becomes equal to 40 degrees.

When assuming that the inclination of the vibration plane with respect to the polarization beam splitter 14 is made approximately ±10 degrees in this way, a polarization beam splitter having a phase difference with respect to the P wave and S wave of almost 0 degree can be easily formed.

Figure 11:
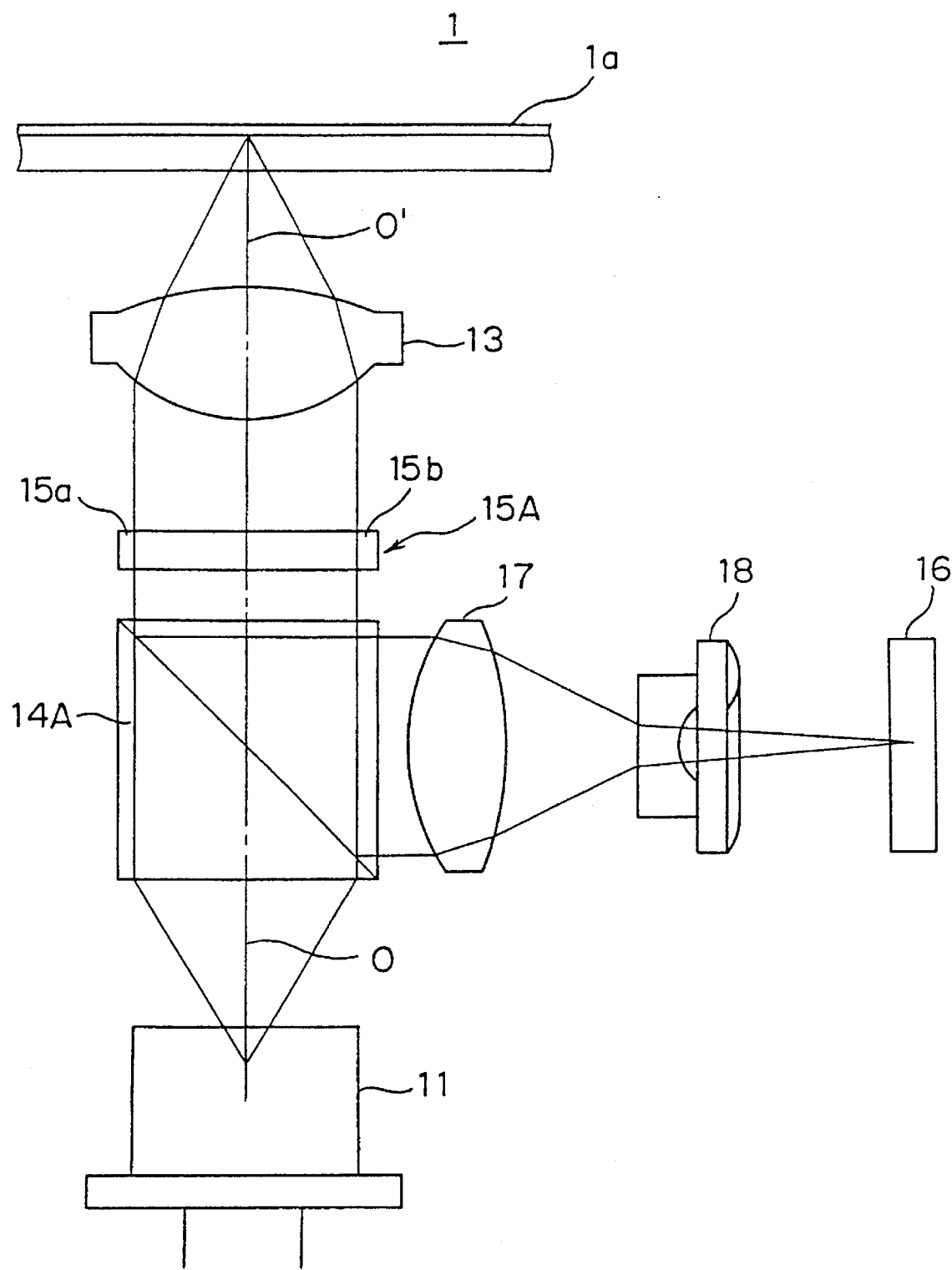
FIG. 11 is a plan structural view of an optical pickup apparatus using the ½-wavelength plate shown in FIG. 10 as a second modified aspect of the first embodiment of the present invention.

FIG. 11 is a plan structural view of the optical pickup apparatus of the second modified aspect of the first embodiment of the present invention in which the polarization beam splitter 14A formed in this way is arranged in the dispersion light (or converged light) of the laser beam source 11.

The optical pickup apparatus shown in FIG. 11 has a laser beam source 11, a ½-wavelength plate 15A formed as shown in FIG. 10, a polarization beam splitter reducing the phase difference to almost 0, an objective lens 13, a condenser lens 17, a cylindrical lens 18, and a detector 16.

When comparing the optical pickup apparatus shown in FIG. 11 with the optical pickup apparatus shown in FIG. 1, in the optical pickup apparatus shown in FIG. 11, it becomes possible to delete the collimate lens 12 in the optical pickup apparatus shown in FIG. 1, and thus it is possible to further reduce the size of the optical pickup apparatus.

In the optical pickup apparatus shown in FIG. 11, the MO signal can be detected by using almost 100 percent of the S wave component produced by the electrooptic Kerr effect, and therefore it is possible to considerably improve the S/N in comparison with the conventional optical pickup apparatus.

Figure 12:
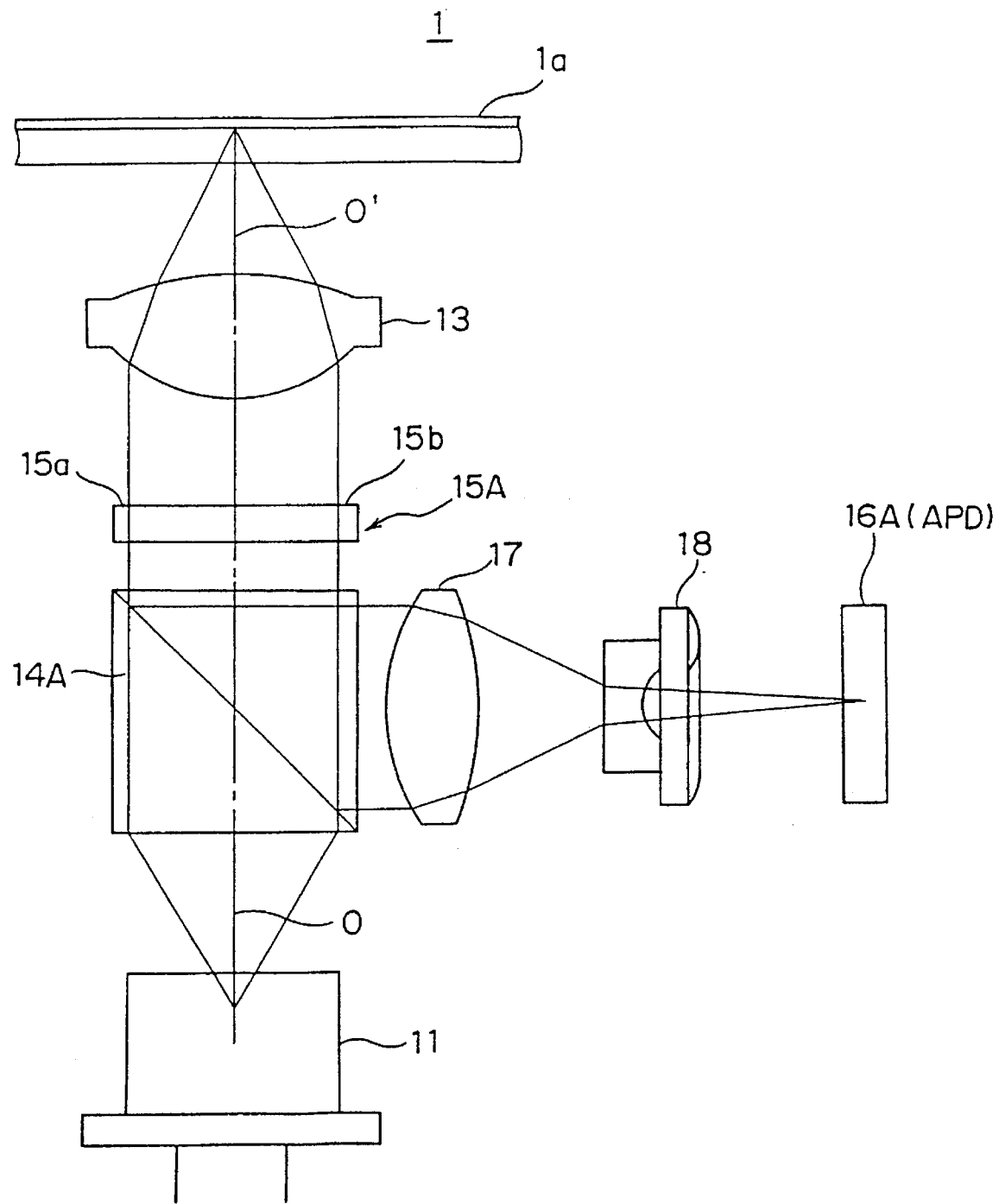
FIG. 12 is a plan structural view of an optical pickup apparatus as the modified aspect of the optical pickup apparatus shown in FIG. 11.

Further, it is also possible to set the angles $\beta_1$ and $\beta_2$ of the planes of vibration of the laser beams $I_3$ and $I_4$ with respect to the P axis illustrated in FIG. 9 so as to be not equal to each other, and set for example $\beta_2$ to almost 0 degree, and as illustrated in FIG. 12, use one photoelectric conversion element (detector) having an undivided light receiving plane for the MO signal, for example, an avalanche photodiode (APD) 16A in place of the detector 16 shown in FIG. 11.

When constituting the apparatus as shown in FIG. 12, a high positioning precision is not required for the attachment of the ½-wavelength plate 15 in the constitution of the optical pickup apparatus.

Also, it is also possible to rotate the laser beam source 11 a little around the light axis O-O', that is, change the state so that a small amount of the S wave component exists in the emitted light from the laser beam source 11, take out this S wave component in an opposite direction (left side in the drawing) to the detector 16 shown in FIG. 11 or the APD 16A shown in FIG. 12 by the polarization beam splitter 14, and perform front automatic power control (FAPC) of the laser beam source 11 based on the level of this component. In this case, the emitted light from the laser beam source 11, passing through the polarization beam splitter 14A, consists of only the P component, and therefore there is no influence on the detection of the MO signal.

An specific example of the structure of the optical pickup apparatus shown in FIG. 11 or FIG. 12 obtained by deleting the collimate lens 12 from the optical pickup apparatus illustrated in FIG. 1 or FIG. 8 will be explained next.

Figure 13:
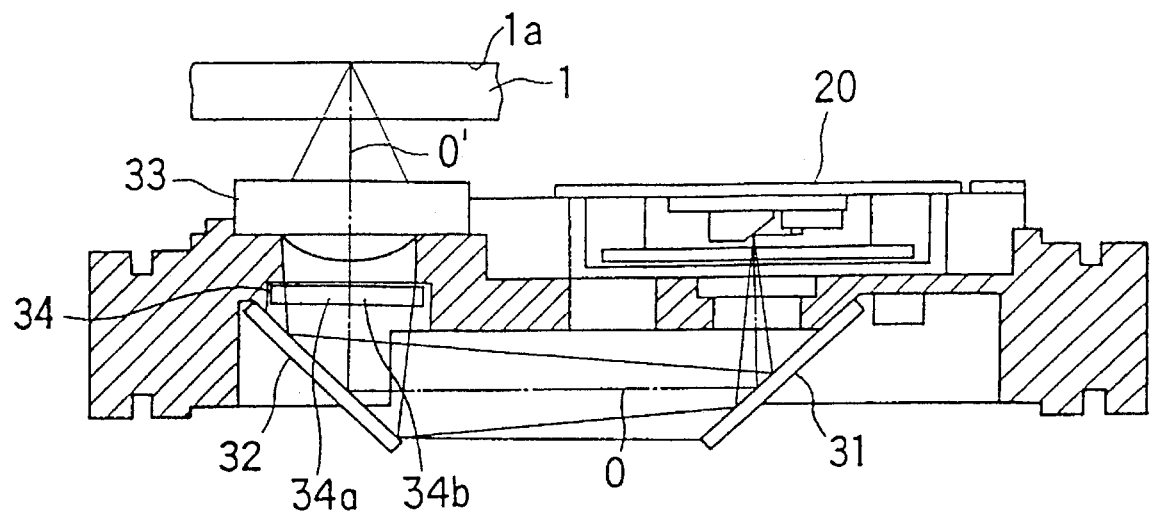
FIG. 13 is a side structural view of an optical pickup apparatus as a third modified aspect of the optical pickup apparatus of the first embodiment of the present invention.

This optical pickup apparatus is constituted by, as shown in FIG. 13, a laser coupler 20 formed by providing a laser beam source, a polarization beam splitter, a detector, etc. on the same silicon substrate; two silicon mirrors 31 and 32 for moving (polarizing) the light axis O-O' of the emitted light from this laser coupler 20; an objective lens 33 converging the emitted light reflected at the silicon mirror 32 and irradiating the same onto the recording surface 1a of the magneto-optic disk 1; and a ½-wavelength plate 34 which is arranged between the laser coupler 20 and the magneto-optic disk 1 and has at least two divided regions 34a and 34b obtained by division into at least two on the plane orthogonal to the light axis O-O', the $C_1$ axis and $C_2$ in these regions having different angles.

Figure 14:
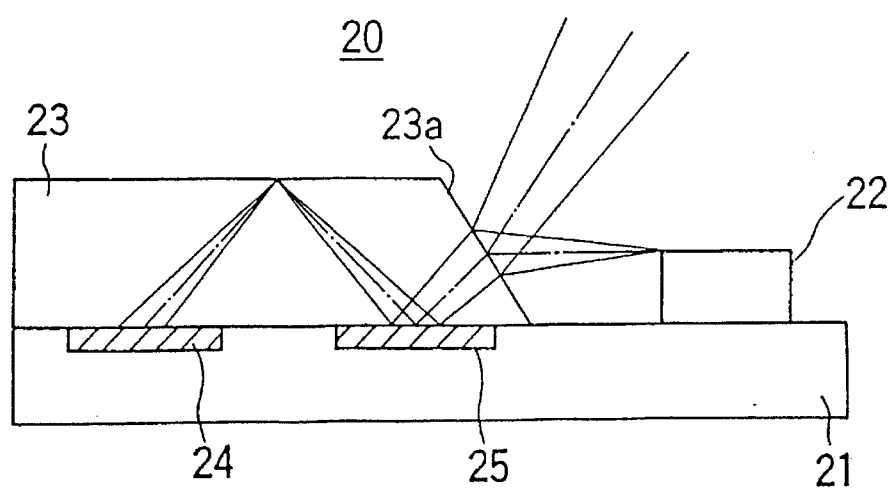
FIG. 14 is a structural view of a laser coupler constituting the optical pickup apparatus shown in FIG. 13.

The laser coupler 20 is constituted by, for example, as shown in FIG. 14, a laser beam source 22 provided on the silicon substrate 21; a microprism 23 which has a plane of polarization arranged along the light axis O-O' between this laser beam source 22 and the objective lens 33, splits the predetermined polarized beam component in the reflection light reflected at the recording surface 1a of the magneto-optic disk 1 and, at the same time, for producing the focus error signal FE; and detectors 24 and 25 which are formed on the silicon substrate 21 and respectively detect the light amounts at positions an equal distance from the focal point, respectively.

Figure 15:
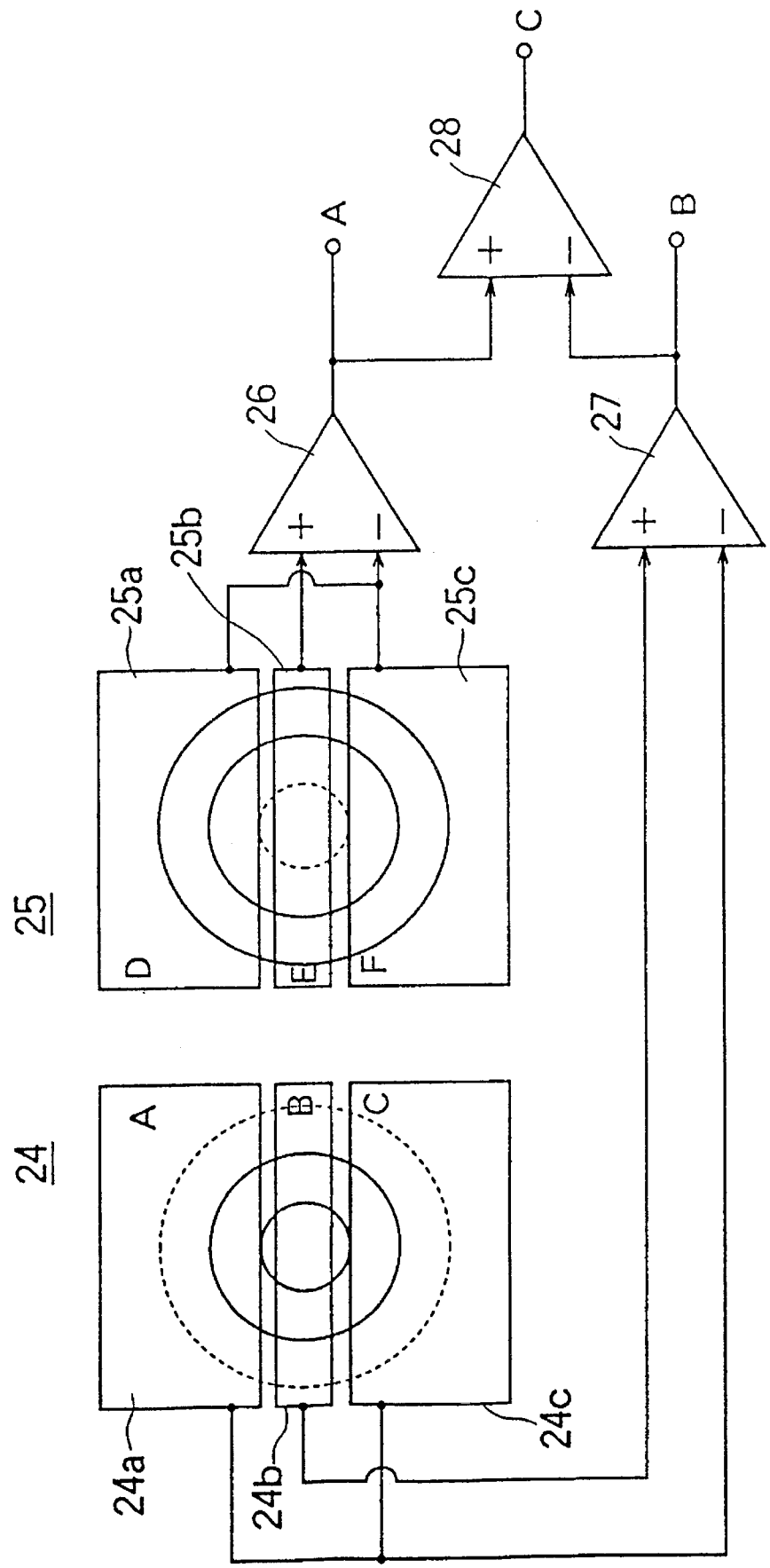
FIG. 15 is a view diagrammatically showing the light receiving region of the detector constituting the laser coupler shown in FIG. 13.

The light receiving regions of the detectors 24 and 25 are divided to, for example, as shown in FIG. 15, three regions 24a, 24b, and 24c and three regions 25a, 25b, and 25c, respectively.

Similar to the above-mentioned embodiment shown in FIG. 1, FIG. 8, FIG. 11, and FIG. 12, the optical pickup apparatus shown in FIG. 13 sets the $C_1$ axis and $C_2$ axis in regions of the ½-wavelength plate 34 obtained by division into at least two on the plane vertical (orthogonal) to the light axis O-O', for example, in the two division regions 34a and 34b, to have different angles and, at the same time, set the reflectances of the plane 23a of the microprism 23 with respect to the P wave and S wave to 0 percent and 100 percent, respectively, and makes the reflection light in the emitted light from the laser beam source 22, passed through the first region 34a of the ½-wavelength plate 34 and reflected at the recording surface 1a of the magneto-optic disk 1, pass through the second region 34b of the ½-wavelength plate 34, and makes the reflection light in the emitted light from the laser beam source 22, passed through the second region 34b of the ½-wavelength plate 34 and reflected at the recording surface 1a of the magneto-optic disk 1, pass through the first region 34a of the ½-wavelength plate 34, whereby, if it is assumed that the level signals detected at the regions 24a, 24b, and 24c, and regions 25a, 25b, and 25c of the detectors 24 and 25, are A, B, and C and D, E, and F, respectively, the MO signal can be obtained by the following equation 4, and the focus error signal FE can be obtained by the following equation 5 according to the "microprism detector focal point error detection method" by using three differential amplifiers 26, 27, and 28:

$$MO\ signal = (A-C)+(F-D) \qquad (4)$$

$$FE = [(A+C)-B]-[(D+F)-E] \qquad (5)$$

Note that, an explanation overlapping that for the above-mentioned embodiment will be omitted.

The optical pickup apparatus of the third modified aspect of the first embodiment shown in FIG. 13 has a structure in which the collimate lens 12 in the optical pickup apparatus of the embodiment shown in FIG. 1 and FIG. 8 is deleted, and the optical pickup apparatus is further reduced in size.

Figure 16:
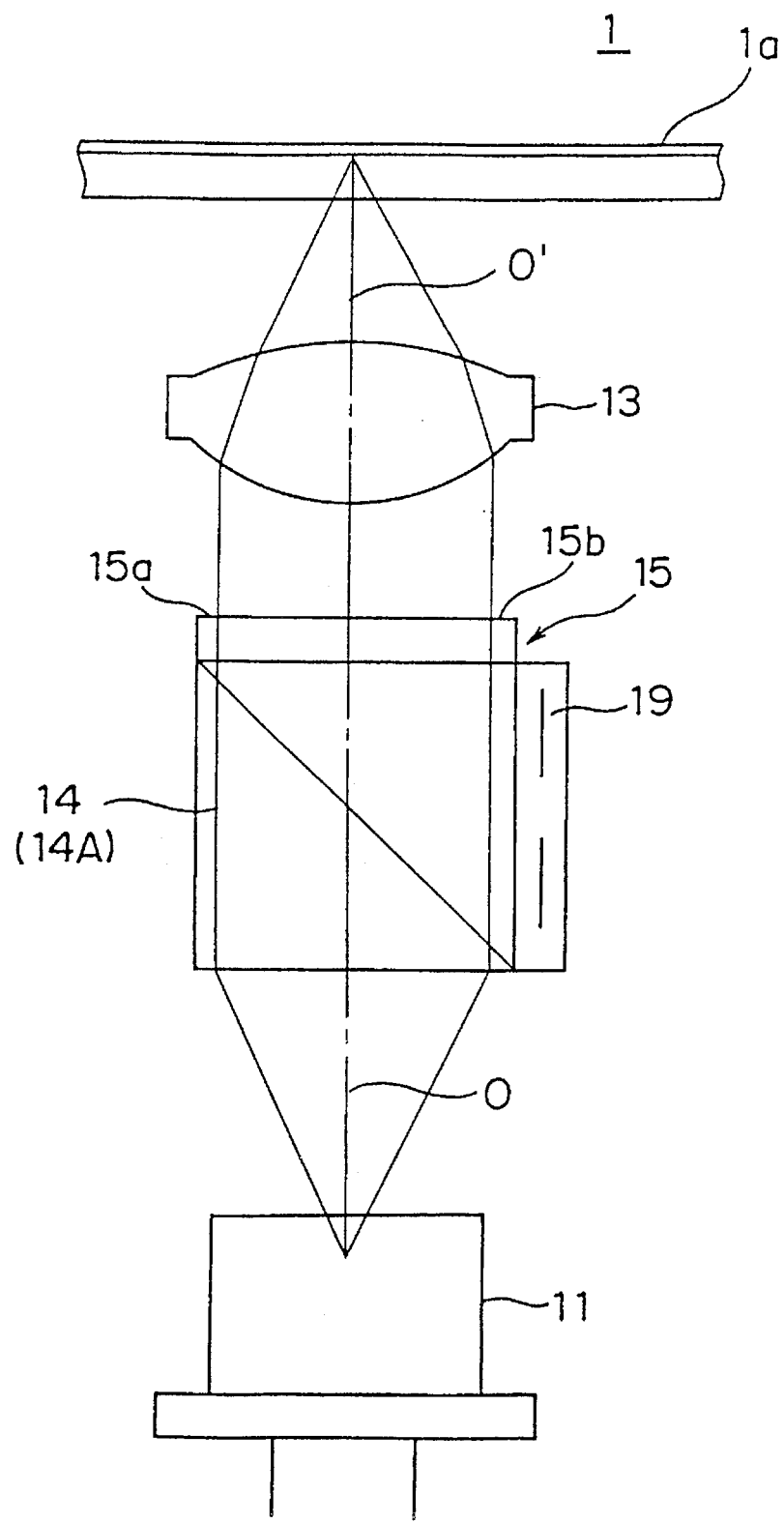
FIG. 16 is a plan structural view of an optical pickup apparatus as a fourth modified aspect of the optical pickup apparatus of the first embodiment of the present invention.

For the execution of the present invention, an optical pickup apparatus shown in FIG. 16 can be constituted by combining the optical pickup apparatus shown in FIG. 8 and the optical pickup apparatus shown in FIG. 11 or FIG. 12, or FIG. 13.

In the optical pickup apparatus of the fourth modified aspect of the first embodiment of the optical pickup apparatus for the magneto-optic storage device of the present invention illustrated in FIG. 16, the collimate lens 12 and objective lens 13 in the optical pickup apparatus illustrated in FIG. 1 are deleted, and further the condenser lens 17 and the cylindrical lens 18 are deleted. Accordingly, in comparison with the optical pickup apparatus shown in FIG. 1, the length in the light axis O-O' direction, and the length in the direction orthogonal to the light axis O-O' are shortened very much, and the optical pickup apparatus can be further reduced in size.

The optical pickup apparatus of the first embodiment of the present invention is not restricted to the structure illustrated in FIG. 16 and can have any structure obtained by appropriately selecting and combining the structures of FIG. 1, FIG. 8, FIG. 11, FIG. 12, and FIG. 13.

In the embodiment shown in FIG. 1 or FIG. 14, using the ½-wavelength plate 15, the light axis of the S wave component split at the polarization beam splitter 14 or the plane 23a of the microprism 23 is made a diametrical (or radial) direction of the magneto-optic disk 1, but it is also possible to arrange the optical pickup apparatus so that the light axis of this S wave component becomes the tangential direction of the tracks of the magneto-optic disk 1 and detects the MO signal by the "tangential push-pull method".

Also, needless to say the present invention can be applied to various types of control systems of a beam spot in an optical pickup apparatus, for example, an optical pickup apparatus using the "three beam method".

The optical pickup apparatus of the second embodiment of the optical pickup apparatus for the magneto-optic storage device of the present invention will be explained next referring to FIG. 17 to FIG. 21.

Figure 17:
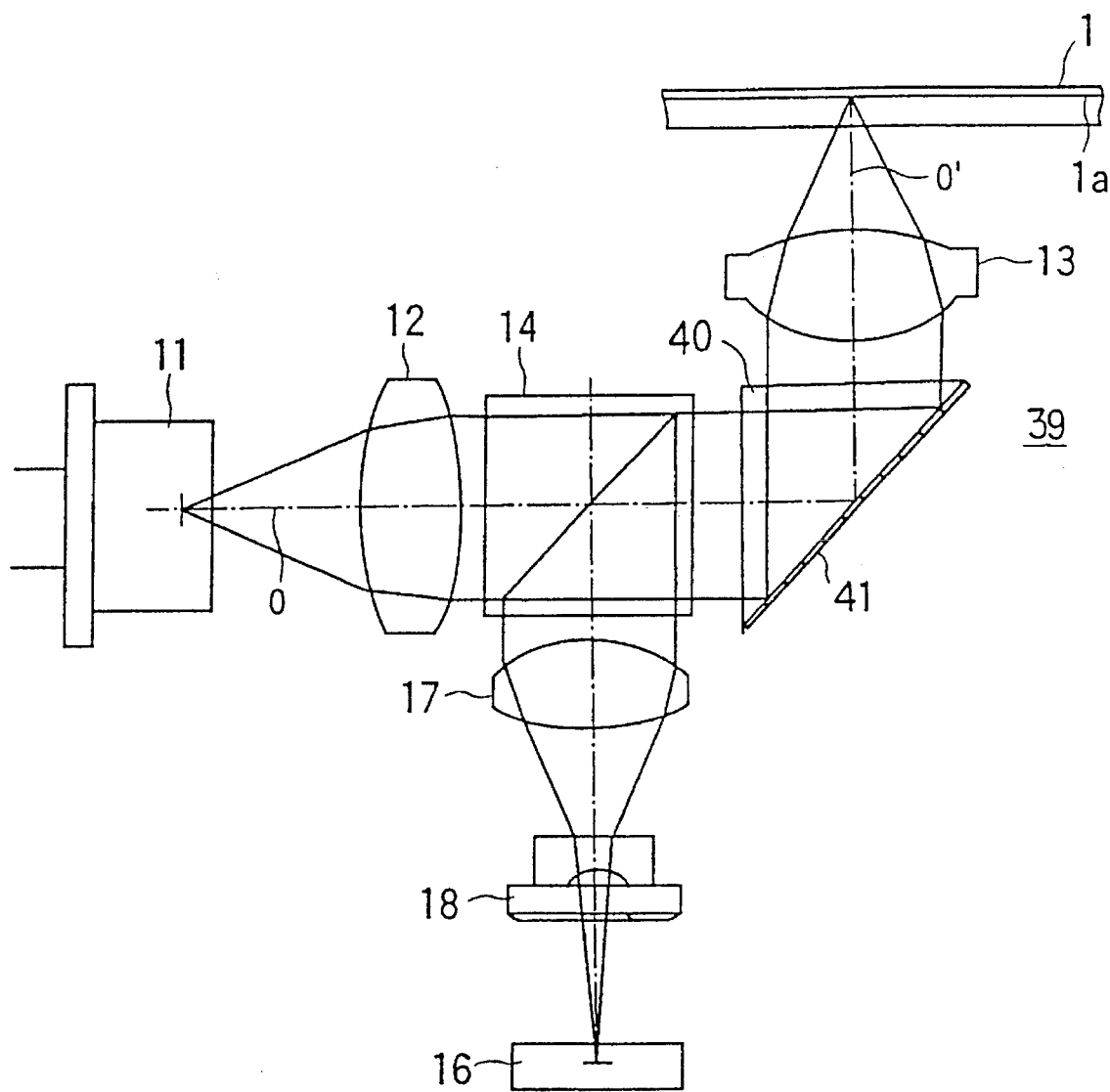
FIG. 17 is a plan structural view of the optical pickup apparatus as a second embodiment of the optical pickup apparatus for the magneto-optic storage device of the present invention.

FIG. 17 is a plan structural view of the optical pickup apparatus of the second embodiment of the optical pickup apparatus for a magneto-optic storage device of the present invention.

This optical pickup apparatus comprises the laser beam source 11; a collimate lens 12; a polarization beam splitter 14; a combination phase retardation prism (CPR) 39; an objective lens 13; a condenser lens 17; a cylindrical lens 18; and a detector 16.

The optical pickup apparatus shown in FIG. 17 uses the CPR 39 in place of the ½-wavelength plate 15 of the optical pickup apparatus shown in FIG. 1. The other constituent members are the same as those shown in FIG. 1. Note, the path of the light axis O-O' is different due to the use of the CPR 39.

Figure 18A:
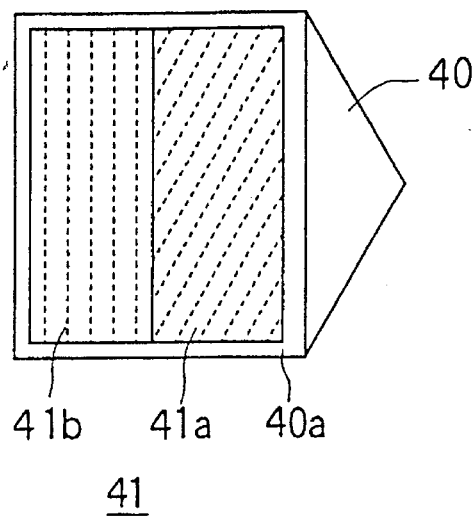
FIG. 18a to FIG. 18c are structural views of a combination phase retardation prism (CPR) shown in FIG. 17.
Figure 18B:
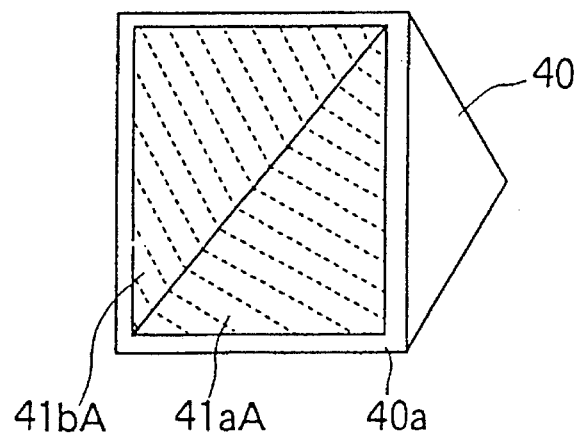
Figure 18C:
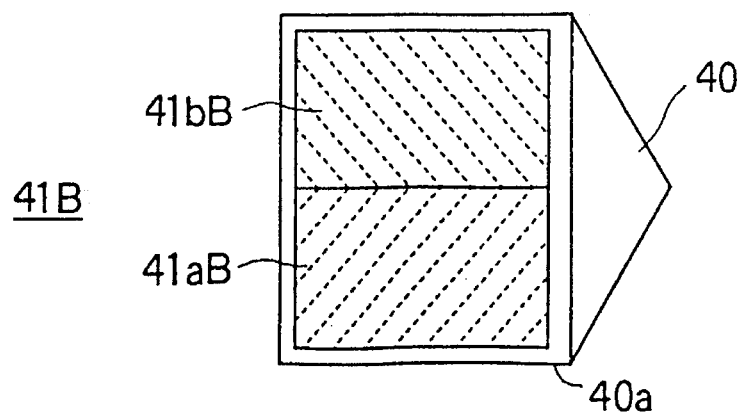

Three aspects of the CPR 39 will be illustrated in FIG. 18a to FIG. 18c.

The CPR 39 shown in FIG. 18a is formed by coating a phase difference generating thin film 41 on the reflection plane 40a of the 45 degree prism 40, and the phase difference generating thin film 41 comprises a first phase difference generating thin film 41a and a second phase difference generating thin film 41b. The first phase difference generating thin film 41a and second phase difference generating thin film 41b have almost the same surface area and are symmetrically coated on the two sides of the reflection plane 40a in a vertical direction with the center of the reflection plane 40a as the light axis O-O'.

These phase difference generating thin films 41a and 41b all reflect the incident light. The first phase difference generating thin film 41a reflects the same without the change of the phase of the incident light, and the second phase difference generating thin film 41b reflects the incident light by retarding the same by 180 degrees. Such a phase retardation can be achieved by adjusting the film thickness of these phase difference generating thin films 41a and 41b.

Accordingly, a phase difference of 180 degrees is produced between the light incident upon the first phase difference generating thin film 41a and the light incident upon the second phase difference generating thin film 41b. In this point, the CPR 39 exhibits a similar function to that of the ½-wavelength plate 15 shown in FIG. 1.

The structure of the CPR 39A and CPR 39B having another structure will be shown in FIG. 18b and FIG. 18c.

The CPR 39A shown in FIG. 18b is formed by coating the first phase difference generating thin film 41aA and the second phase difference generating thin film 41bA as total reflection films obliquely on the reflection plane 40a half and half obliquely. These films are formed so that a phase difference of 180 degrees is produced between the first phase difference generating thin film 41aA and the second phase difference generating thin film 41bA.

The CPR 39B shown in FIG. 18c is formed by coating the first phase difference generating thin film 41aB and the second phase difference generating thin film 41bB as total reflection films on the surface of the reflection plane 40a half and half vertically. These films are formed so that a phase difference of 180 degrees is produced between the first phase difference generating thin film 41aB and the second phase difference generating thin film 41bB.

As the CPR 39 shown in FIG. 17, any of the CPR 39, 39A, and 39B illustrated in FIG. 18a to FIG. 18c can be used, but a case using the CPR 39 illustrated in FIG. 18a will be exemplified below.

Figure 19:
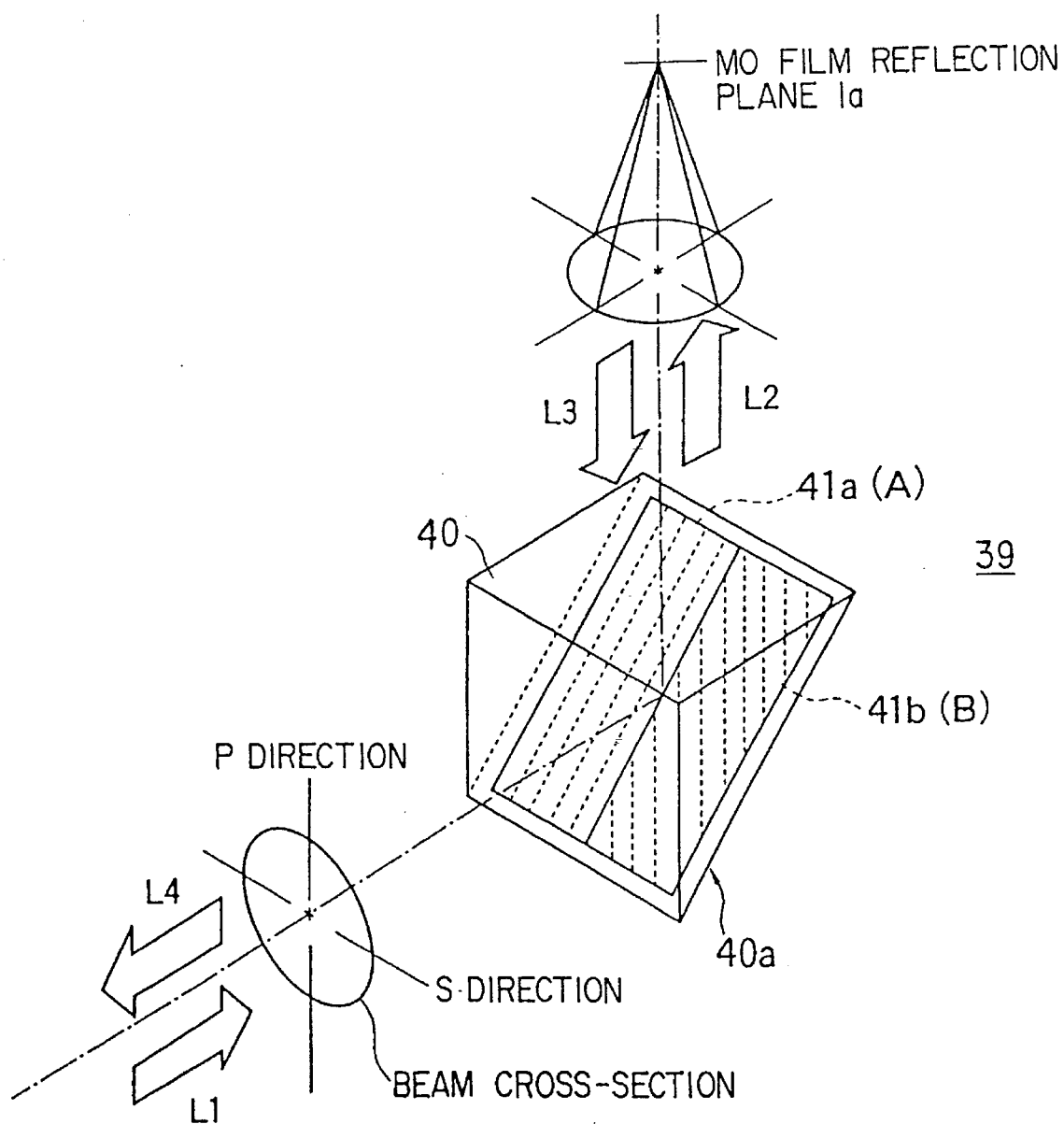
FIG. 19 is a view illustrating the path of light passing through the combination phase retardation prism (CPR) shown in FIG. 17 and the characteristics thereof.

FIG. 19 is a view illustrating the ray tracing on the periphery of the CPR 39 in FIG. 17.

The ray tracing will be mentioned. The light L1 from the polarization beam splitter 14 is reflected at the second phase difference generating thin film 41b of the CPR 39, passes through the objective lens 13, and is irradiated onto the recording surface 1a (MO film reflection plane) of the magneto-optic disk 1 as the converged light L2, and that reflected light L3 passes through the objective lens 13 and is incident upon the first phase difference generating thin film 41a of the CPR 39, reflected thereat, and emitted to the polarization beam splitter Among the light paths of the above-described lights L1 to L4, as shown in FIG. 1, there is a light path inverse to this. Equation 1, equation 2, equation 4, and equation 5 stand also in this second embodiment.

FIG. 20a to FIG. 20d are graphs showing the characteristics of the above-described lights L1 to L4.

Figure 20A:
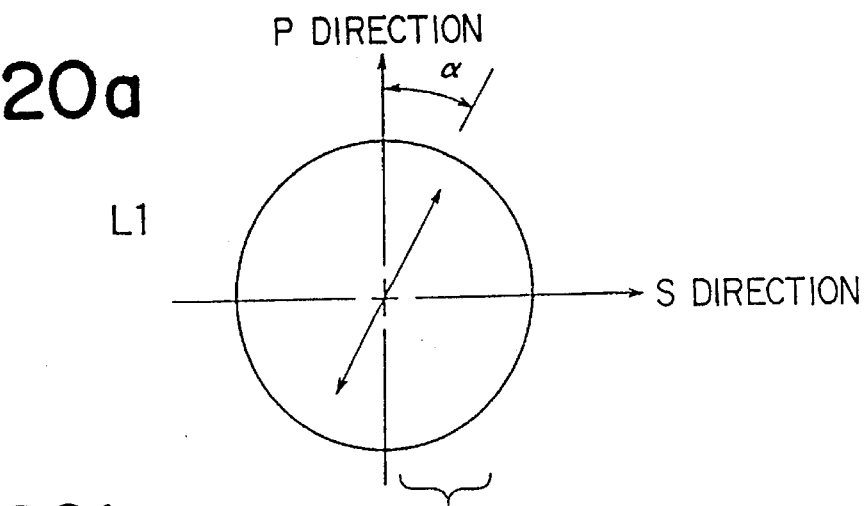
FIG. 20a to FIG. 20d are views showing the characteristics of the light shown in FIG. 19.

As shown in FIG. 20a, the plane of polarization of the light L1 is inclined exactly at the angle $\alpha$. Note that, the C axes of the ½-wavelength plate 15, that is, the $C_1$ axis and $C_2$ axis, are in the P direction.

Figure 20B:
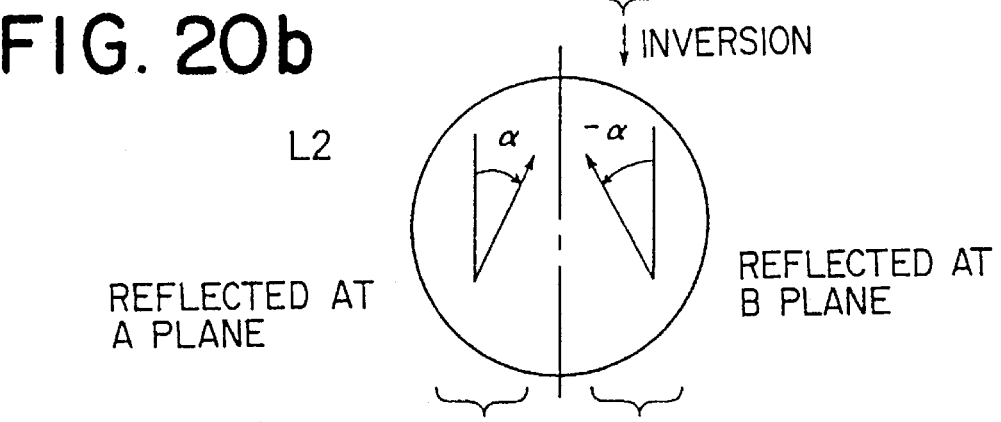

As shown in FIG. 20b, when the light L1 is incident upon the CPR 39, it is reflected in the outgoing path and changed in phase exactly by 90 degrees in the first phase difference generating thin film 41a and the second phase difference generating thin film 41b, respectively.

Figure 20C:
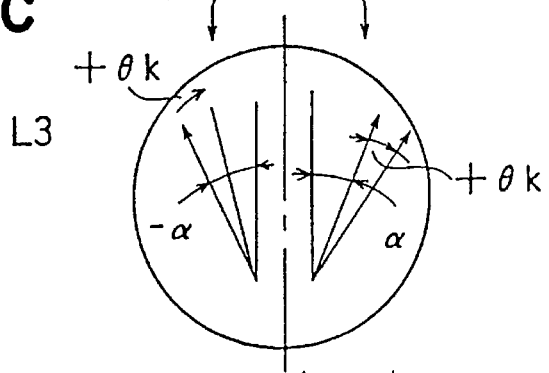

As shown in FIG. 20c, the reflected light irradiated onto the recording surface 1a of the magneto-optic disk 1 via the objective lens 13 and that reflected reflection beam is inverted in the light path. At this time, the phase is deviated exactly by the angle $+\theta k$ by the electrooptic Kerr effect.

Figure 20D:
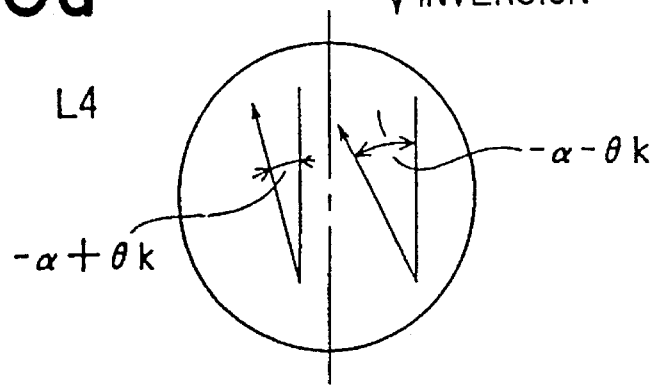

As shown in FIG. 20d, the light L3 in the returning path is reflected at the first phase difference generating thin film 41a, whereby the phase is deviated by 90 degrees.

The surface areas of the semi-spheres are respectively converted to:

$$-(\alpha \pm \theta k)$$

and therefore when it is detected at the polarization beam splitter 14 and the differentiation in the detector 16 is obtained, also in the second embodiment, a result similar to that in the above-mentioned first embodiment is obtained, and the MO signal can be detected.

An optical pickup apparatus of the first embodiment using the ½-wavelength plate 15 shown in FIG. 1 is compared with the optical pickup apparatus of the second embodiment using the CPR 39.

The ½-wavelength plate 15 is produced, as shown in FIG. 2, by bonding a first ½-wavelength plate 15a and a second ½-wavelength plate 15b, obtained by division into two, about the light axis O-O' as a center (as the boundary), but in actuality, it is difficult to precisely produce the same, and it is not always suitable for mass production. The CPR 39 is formed by only coating the phase difference generating thin film 41 to the 45 degree mirror 40, and therefore can be easily produced, and thus is excellent in mass producibility.

Also, in the optical pickup apparatus of the second embodiment using the CPR 39, the division of the beam spot by the inclination of the light axis, which probably occurs where the ½-wavelength plate 15 is used, does not occur.

Further, it has an advantage that the vector-interference degree can be arbitrarily set by the angle α shown in FIG. 20a to FIG. 20d where the CPR 39 is used.

Also, where the CPR 39 is used, it can be detected at an angle two times the angle α, and therefore the wave detection sensitivity becomes higher.

In the optical pickup apparatus of the second embodiment using the CPR 39, the light axis O-O' is deflected by the CPR 39, and therefore it is possible to reduce the distance between the laser beam source 11 and the objective lens 13. That is, there is an advantage that the optical pickup apparatus of the second embodiment can reduce the size of the optical system.

Also, the CPR 39 can be produced at a low cost.

In the optical pickup apparatus using the CPR 39, the reflected returning beam is the polarization beam in the same direction, but only the MO signal can be obtained in an inverse phase.

As in the analysis of the laser beam trace referring to FIG. 19, the CPR 39, 39A, and 39B shown in FIGS. 18a to 18c or the CPR 39 having the structure according to the same concept as that for them not only can be applied to the optical pickup apparatus, but also can be used for a wider purpose as a phase difference generation device for generating a predetermined phase difference between one light incident upon a first phase difference generating thin film 41a and the other light incident upon a second phase difference generating thin film 41b.

This phase difference generation device can arbitrarily change the phase difference according to the film thickness of the phase difference generating thin film 41 coated on the reflection plane 40a of the 45 degree prism 40.

As the coating method of the phase difference generating thin film 41, various coating methods in accordance with the material of the phase difference generating thin film 41, for example, a coating method such as sputtering, can be applied.

Note that, the modified aspect mentioned as the first embodiment can be applied also with respect to the optical pickup apparatus of the second embodiment.

Figure 21:
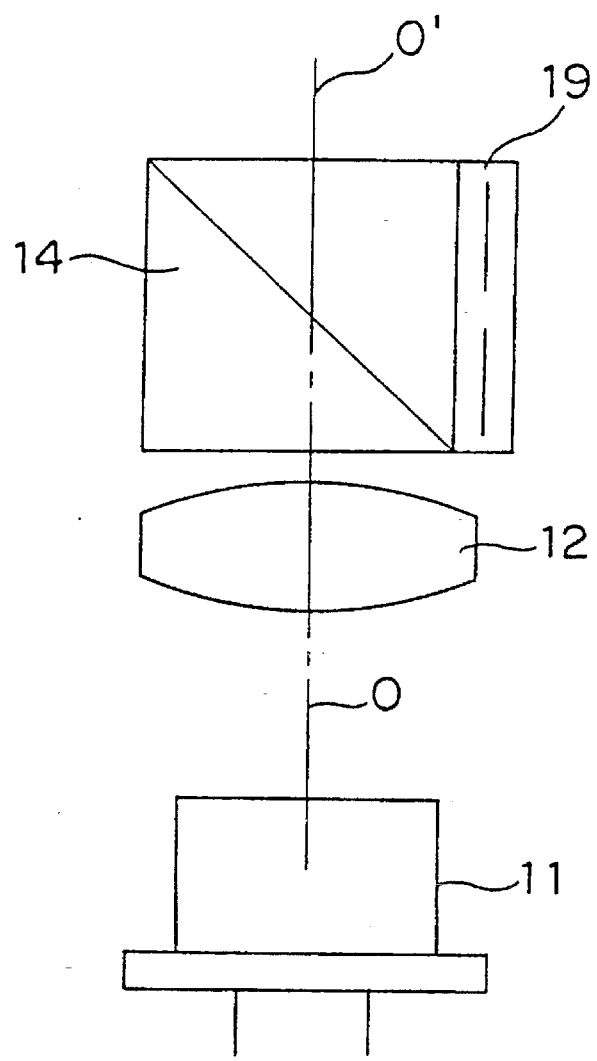
FIG. 21 is a partial structural view of a second aspect of the second embodiment of the optical pickup apparatus for the magneto-optic storage device of the present invention.

FIG. 21 is a structural view of an integral construction of the polarization beam splitter 14 corresponding to FIG. 7 and the detector 19 having a large light receiving surface area of the first modified aspect of the second optical pickup apparatus. Note, the ½-wavelength plate 15 is not used in the optical pickup apparatus of the second embodiment, and therefore the ½-wavelength plate 15 shown in FIG. 7 is not face-adhered to the polarization beam splitter 14 in FIG. 21. Needless to say the polarization beam splitter 14 and the detector 19 having a large light receiving surface area shown in FIG. 21 can be applied to the optical pickup apparatus shown in FIG. 17. In this first modified aspect, the condenser lens 17 and cylindrical lens 18 shown in FIG. 17 become unnecessary.

As the second modified aspect of the optical pickup apparatus of the second embodiment of the present invention, a structure corresponding to FIG. 11 and FIG. 12, that, is a structure formed by deleting the collimate lens 12 between the laser beam source 11 and the polarization beam splitter 14A, can be adopted. The advantage of this second modified aspect is similar to the advantage in the optical pickup apparatus shown in FIG. 11 and FIG. 12. The illustration of this structure will be omitted.

As the third aspect of the optical pickup apparatus of the second embodiment of the present invention, a structure corresponding to FIG. 13 can be adopted. The advantage of this third modified aspect is similar to the advantage in the optical pickup apparatus shown in FIG. 13. An illustration will be omitted for also this structure.

An optical pickup apparatus of the third embodiment of the optical pickup apparatus for the magneto-optic storage device of the present invention will be explained next referring to FIG. 22 to FIG. 29.

Figure 22:
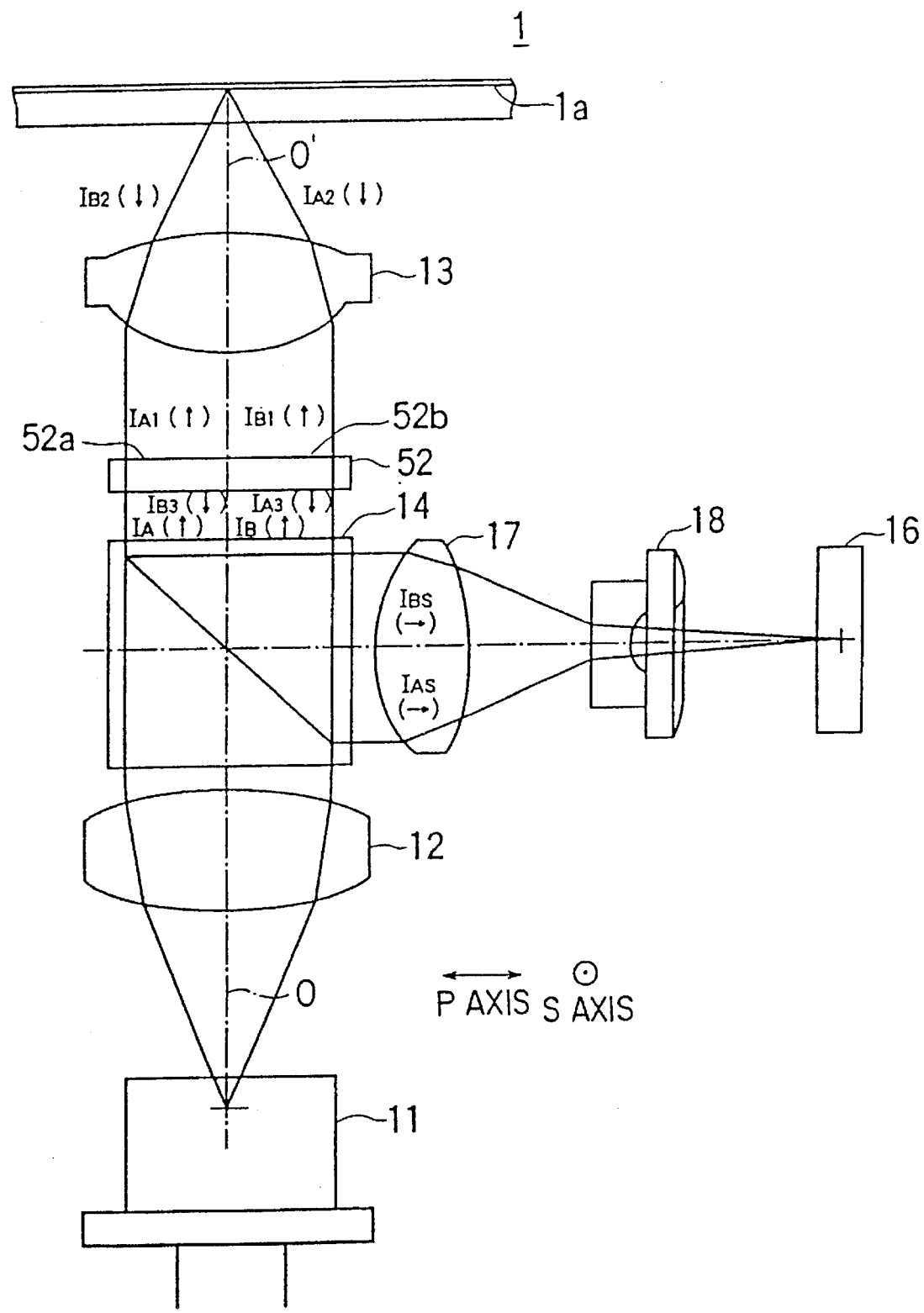
FIG. 22 is a plan structural view of an optical pickup apparatus as a third embodiment of the optical pickup apparatus for the magneto-optic storage device of the present invention.

FIG. 22 is a plan structural view of the optical pickup apparatus of the third embodiment.

This optical pickup apparatus comprises a laser beam source 11; a collimate lens 12; a polarization beam splitter 14; an optical rotating plate 52; an objective lens 13; a condenser lens 17; a cylindrical lens 18; and a detector 16.

When comparing this with the optical pickup apparatus shown in FIG. 1, the optical pickup apparatus shown in FIG. 22 differs from the optical pickup apparatus shown in FIG. 1 only in a point that the optical rotating plate 52 is used in place of the ½-wavelength plate 15 shown in FIG. 1. The fundamental structure and the other constituent members are the same as those of the optical pickup apparatus shown in FIG. 1.

The optical rotating plate 52 is constituted by the left optical rotating plate 52a and the right optical rotating plate 52b.

The left optical rotating plate 52a rotates only the polarized beam exactly at the predetermined angle in a counter-clockwise direction seen from the observation side, that is, from the objective lens 13 side in this example, without a change of the phase difference (true also for the following). The right optical rotating plate 52b rotates only the polarized beam exactly at the predetermined angle in the clockwise direction seen from the observation side without a change of the phase difference. In this way, the left optical rotating plate 52a and the right optical rotating plate 52b do not give an optical phase difference (retardation) to the transmission light, and therefore rotate the same as linear polarization as is. Even if the wavelength is changed, only the optical rotary power is changed. Accordingly, a difference of the optical rotation angles of exactly the sum of the optical rotation angles of the two is produced between the light incident upon the left optical rotating plate 52a and the light incident upon the right optical rotating plate 52b.

Figure 23A:
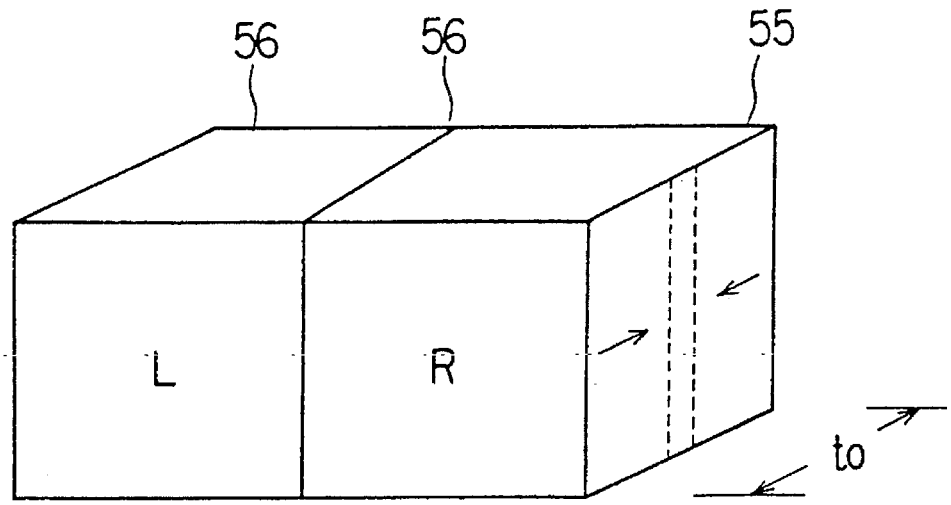
FIG. 23a and FIG. 23b are views illustrating the method of production of the rotation member shown in FIG. 22.
Figure 23B:
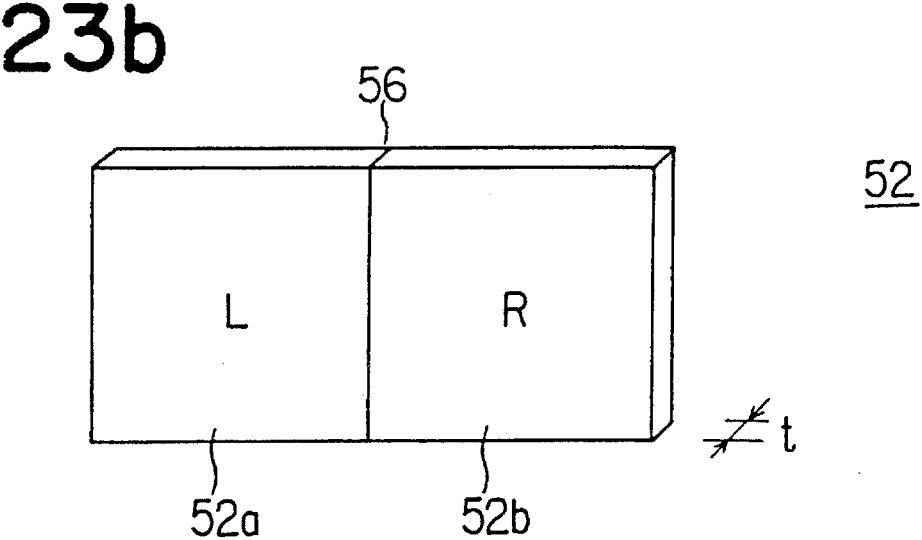

The method of production of the optical rotating plate 52 will be illustrated in FIG. 23a and FIG. 23b.

As shown in FIG. 23a, first, an optical member 55 having a right optical rotation angle having a thick thickness t0 and an optical member 54 having a left optical rotation angle and having almost the same thickness are surface-adhered at the plane of the center line corresponding to the light axis O-O'. The thicknesses of these optical members 54 and 55 are great, and accordingly this surface-adhesion work can be easily carried out.

As the optical members 54 and 55, for example, crystals obtained by cutting quartz orthogonally to the optical axis is used. The right crystal is used as the optical member 55 having the right optical rotation angle and the left crystal is used as the optical member 54 having the left optical rotation angle.

The optical rotary power giving the optical rotation angle is physically determined. That is, the wavelength dependency of the optical rotation angle becomes the value shown in the following Table 1.

TABLE 1

| Wavelength (γ): nm | Rotation angle (degrees/mm) |
|---|---|
| 670.79 | 16.54 |
| 728.14 | 13.92 |
| 794.8 | 11.589 |
| 1014.1 | 6.976 |

That is, the optical rotation angle is determined by the thickness t of the optical material.

As shown in FIG. 23b, a optical rotating plate 52 having a desired thickness t is produced by polishing from the two surfaces the optical materials 54 and 55 having a thickness t0 in a state where they are face-adhered.

The desired thickness t is, for example, about 3.7 mm in the case of an optical rotation angle of 45 degrees. The polishing is performed until the predetermined thickness t is obtained in accordance with the desired optical rotation angle. This polishing work can also be easily carried out. Accordingly, the optical rotating plate 52 formed by the face-adhesion of the left optical rotating plate 52a and the right optical rotating plate 52b can be easily produced and can be produced at a low cost and in a short time. In addition, by adjusting the thickness thereof, the optical rotation angle can be arbitrarily set. The optical rotation angle is in substantially proportional to the thickness thereof.

When comparing the CPR used in the third embodiment of the present invention, that is, the combination optical rotating plate 52 with the CPR 39 of the second embodiment, where the combination optical rotating plate 52 is used, since the $C_1$ axis and $C_2$ axis as in the ½-wavelength plate 15 do not exist in the plane of the optical rotating plate 52, the linear polarized beam can be made incident toward any direction in the plane, and it is not necessary to define the polarization angle α of the incident light as shown in FIG. 20a, and therefore the degree of freedom of design can be enhanced.

An optical rotating plate 52 formed by a combination of two plates, a left optical rotating plate 52a and a right optical rotating plate 52b, formed in this way is called a combination optical rotating plate (CRP).

A detailed description will be made of a concrete example of the CRP.

Figure 24A:
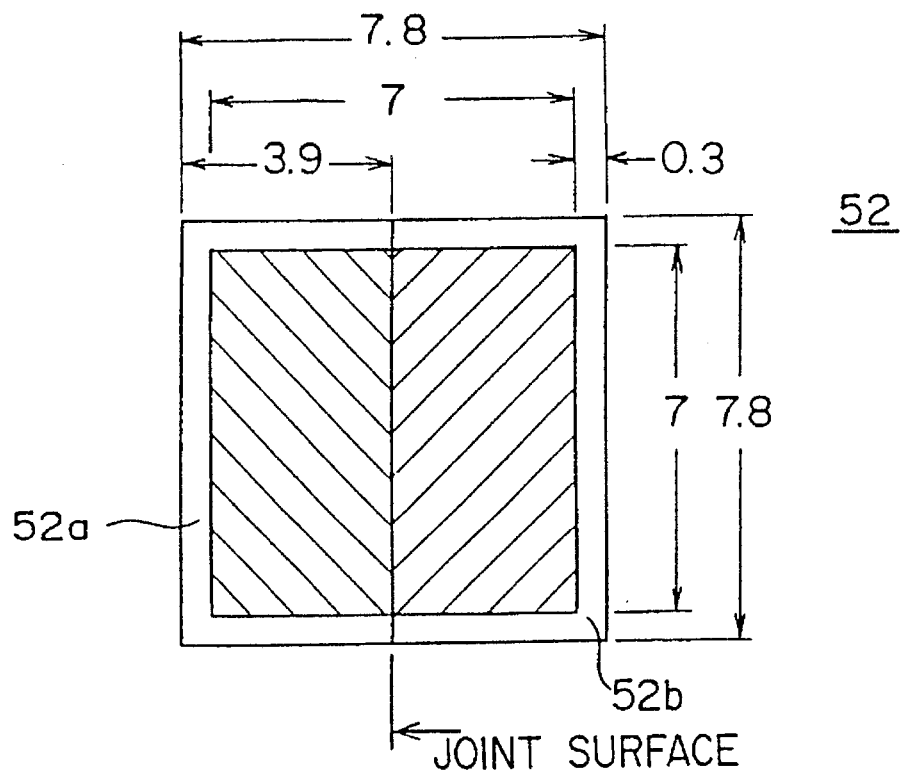
FIG. 24a and FIG. 24b are views concretely illustrating the rotation member.
Figure 24B:
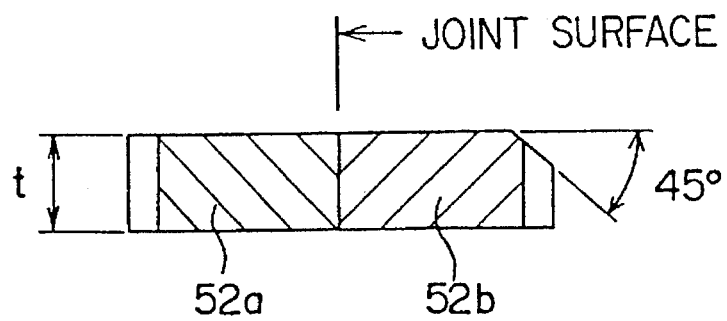

FIG. 24a is a front view of a CRP used in the third embodiment of the present invention, and FIG. 24b is a top plan view thereof. The numerals in the drawings show the actual dimensions using m m as the units. The machining precision was ±0.1 mm. A clear aperture indicated by a hatching indicating an effective light transmission surface area is 7 mm×7 mm.

In this example, use was made of one with an AR coating reflectance=0.3 percent or less (soft coating is possible) where the wavelength=780±20 mm, the wave transmission surface=λ/6 or less, and reflection prevention film:incident angle=0°±0.5°; there was no inclination of the light axis:inclination of the transmission light between the left optical rotating plate 52a and the right optical rotating plate 52b; there were no fissures (fine cracks), cracks, chips, scratches, stains, etc. in the clear aperture, by the inspection of the outer appearance. Note that, for convenience, CRPs having the following optical rotation angles were used with the type names shown in the following Table 2.

TABLE 2

| Type name | Rotation angle: Right/left (degrees/mm) |
|---|---|
| CPR 5 | 5° ± 1.5° |
| CPR 10 | 10° ± 1.5° |
| CPR 22.5 | 22.5° ± 1.5° |
| CPR 30 | 30° ± 1.5° |
| CPR 45 | 45° ± 1.5° |

Below, a detailed description of the optical pickup apparatus using the combination optical rotating plate 52 will be given.

Figure 25:
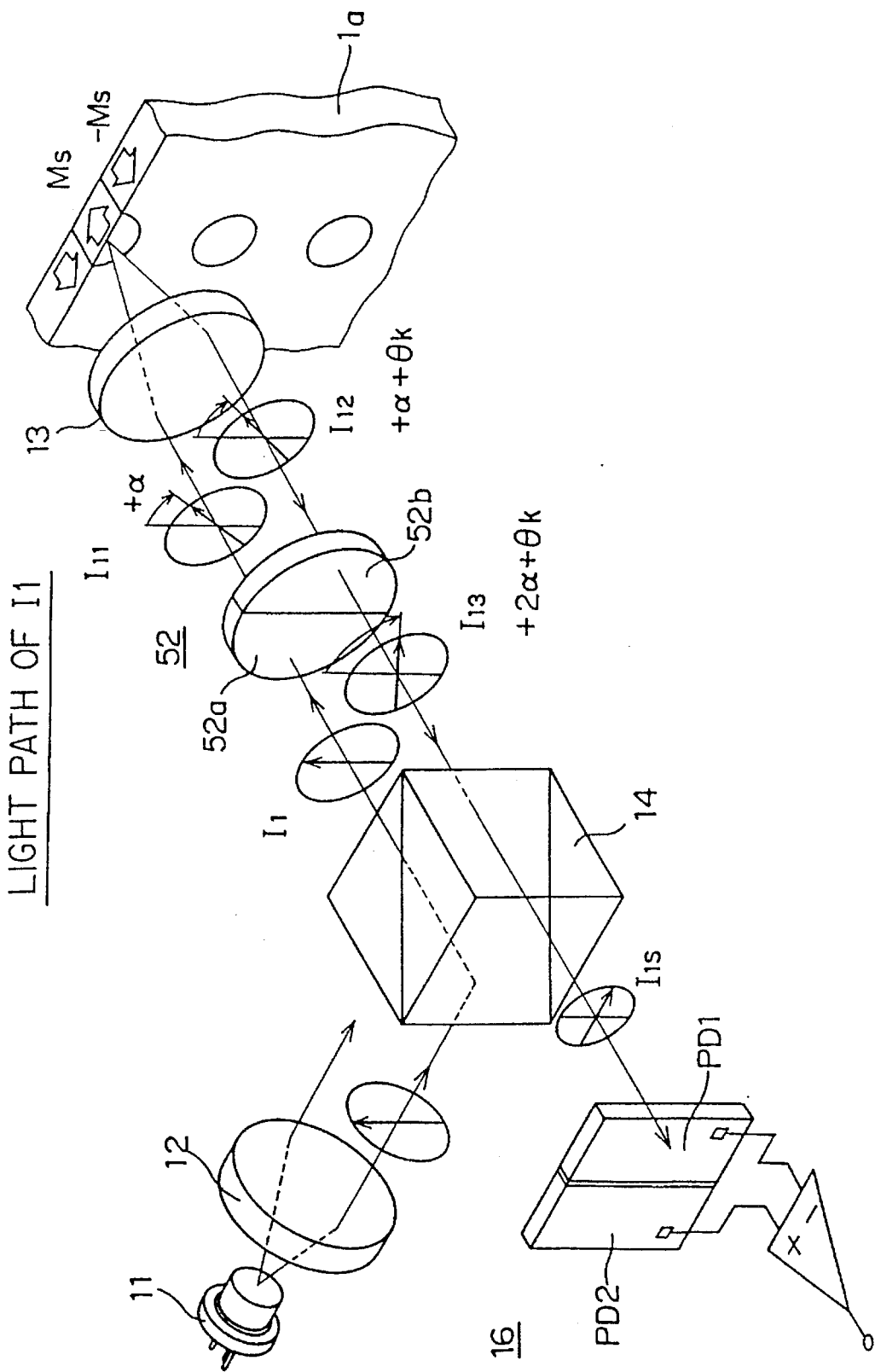
FIG. 25 and FIG. 26 are views illustrating the beam trace in the third embodiment of the optical pickup apparatus for the magneto-optic storage device of the present invention.
Figure 26:
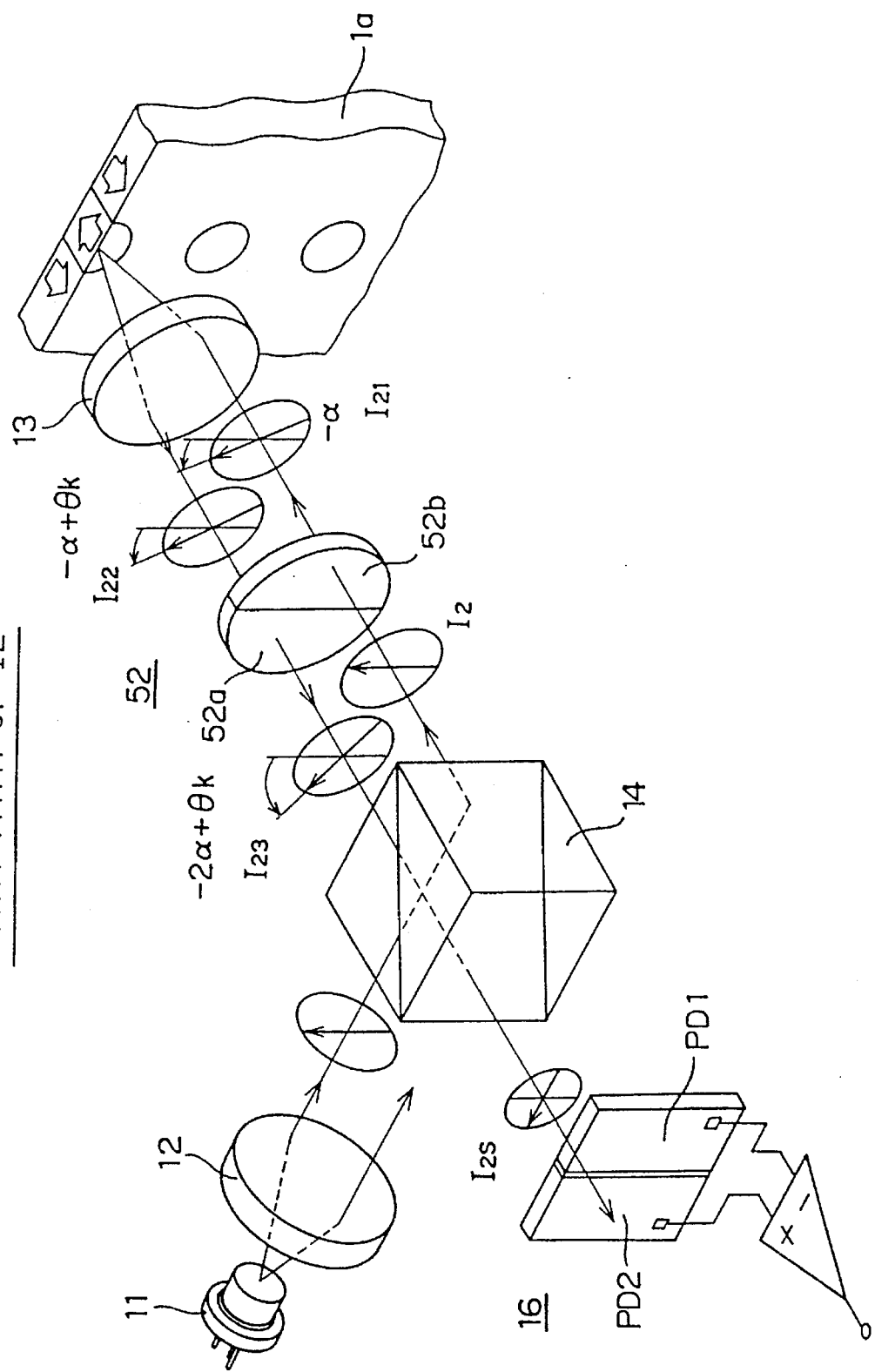

FIG. 25 and FIG. 26 are perspective views of the optical pickup apparatus illustrated in FIG. 22. Note, the orientation of the incident light from the laser beam source 11 and collimate lens 12 to the polarization beam splitter 14 and the orientation of the emitted light from the polarization beam splitter 14 to the detector 16 are different from those in FIG. 22.

A description will be made by dividing one laser beam to two laser beams passing through two light paths I1 and I2. FIG. 25 shows the conversion of the plane of polarization of I1, and FIG. 26 shows the conversion of the plane of polarization of I2. In FIG. 25 and FIG. 26, the orientations of the arrows in the circles show the orientations of the polarization of the linear polarized beam.

Here, for simplifying the explanation, a description will be made while omitting the Kerr rotation angle $\theta_k$.

In FIG. 25, the laser beam $I_1$, which is the S polarized beam from the collimate lens 12, is completely reflected at the polarization beam splitter 14, and when it passes through the left optical rotating plate 52a, becomes the laser beam $I_{11}$ obtained by the rotation of the plane of polarization exactly at +α. When this laser beam $I_{11}$ passes through the objective lens 13, is reflected at the recording surface 1a of the magneto-optic disk 1, and passes again through the objective lens 13, the returning light becomes the laser beam $I_{12}$ passing through the light path on the opposite side while sandwiching the center axis of the objective lens 13 (light axis O-O') therebetween. The plane of polarization at this time is +α as is. When this laser beam $I_{12}$ passes through the right optical rotating plate 52b, it is then given optical rotation in the clockwise direction. At this time, it should be noted that the advance direction (orientation) of the laser beam is reverse between the left optical rotating plate 52a and the right optical rotating plate 52b, and therefore it means that the rotation in the clockwise direction further becomes +α, and the laser beam $I_{13}$ transmitted through the right optical rotating plate 52b is rotated exactly by +2α with respect to the laser beam $I_1$ incident upon the left optical rotating plate 52a. That is, there is an optical rotation angle of +2α in total between the incident light $I_1$ and the emitted light $I_{13}$ with respect to the optical rotating plate 52.

The laser beam $I_{13}$ receives the wave detection of polarization in the polarization beam splitter 14, only the P wave component is transmitted, and the laser beam $I_{1S}$ is incident upon the detector 16. The amplitude of the laser beam $I_{1S}$ incident upon the detector 16 becomes the value indicated by the following equation 6.

$$I_{13} \times \sin(+2\alpha) \tag{6}$$

Also the conversion of the plane of polarization of the light path I2 shown in FIG. 26 becomes similar to that described above in principle. The laser beam $I_2$, which is the S polarized beam from the collimate lens 12, is completely reflected at the polarization beam splitter 14, and when it passes through the right optical rotating plate 52b on the opposite side to the laser beam $I_1$, it becomes the laser beam $I_{21}$ in which the plane of polarization is inversely rotated exactly by $-\alpha$. When this laser beam $I_{21}$ passes through the objective lens 13, is reflected at the recording surface 1a of the magneto-optic disk 1, and passes again through the objective lens 13, the returning light becomes the laser beam $I_{22}$ passing through the light path on the opposite side while sandwiching the center axis of the objective lens 13 (light axis O-O') therebetween. The plane of polarization at this time is $-\alpha$ as is. When this laser beam $I_{22}$ passes through the left optical rotating plate 52a, it is then given rotation in the counterclockwise direction. The advance direction (orientation) of the laser beam is reverse between the left optical rotating plate 52a and the right optical rotating plate 52b, and therefore it means that the optical rotation in the counterclockwise direction further becomes $-\alpha$, and the laser beam $I_{23}$ transmitted through the left optical rotating plate 52a is rotated exactly by $2\alpha$ with respect to the laser beam $I_2$ incident upon the right optical rotating plate 52b. That is, there is an optical rotation angle of $-2\alpha$ in total between the incident light $I_1$ and the emitted light $I_{13}$ with respect to the optical rotating plate 52. The laser beam $I_{23}$ receives the wave detection of polarization in the polarization beam splitter 14, and the laser beam $I_{23}$ is incident upon the detector 16. The amplitude of the laser beam $I_{13}$ incident upon the detector 16 becomes the value indicated by the following equation 7.

$$I_{23} \times \sin(-2\alpha) \tag{7}$$

In this way, in the optical pickup apparatus shown in FIG. 25 and FIG. 26, a similar effect as if the Faraday element were used can be obtained. Note, in this optical pickup apparatus, the loss of the amount of light met where the Faraday element is used is theoretically zero, and a better effect is exhibited than that of the case using a Faraday element.

Next, a description will be made of the signal processing where the MO signal is put on the laser beam in the light paths I1 and I2. Here, as shown in FIG. 25 and FIG. 26, it is assumed that a Kerr optical rotation angle of $+\theta_k$ is given to the reflection light on the recording surface 1a by the magnetization $M_3$ of pits which is obtained when the magnetization of the recording surface 1a is inverted. The plane of polarization in this case will be shown in Table 3.

TABLE 3

|  | System of I1 | System of I2 |
| --- | --- | --- |
| Incident light | $I_{11}$: $+\alpha$ | $I_{21}$: $-\alpha$ |
| Reflection light | $I_{12}$: $+\alpha + \theta_k$ | $I_{22}$: $-\alpha + \theta_k$ |

TABLE 3-continued

|  | System of I1 | System of I2 |
| --- | --- | --- |
| After passing through right rotating plate 52b | $I_{13}$: $+2\alpha + \theta_k$ |  |
| After passing through left rotating plate 52a |  | $I_{23}$: $-2\alpha + \theta_k$ |
| After transmitting through polarization beam splitter 14 | $I_{1S}$: $I_{13} \times \sin(+2\alpha + \theta_k)$ | $I_{2S}$: $I_{23} \times \sin(-2\alpha + \theta_k)$ |

The MO signal is found from the differential detection of the signals obtained from the PD1 and PD2 of the detector 16.

$$MO\ signal = PD1 - PD2 \tag{8}$$

$$Sum\ (RF)\ signal = PD1 + PD2 \tag{9}$$

Figure 27:
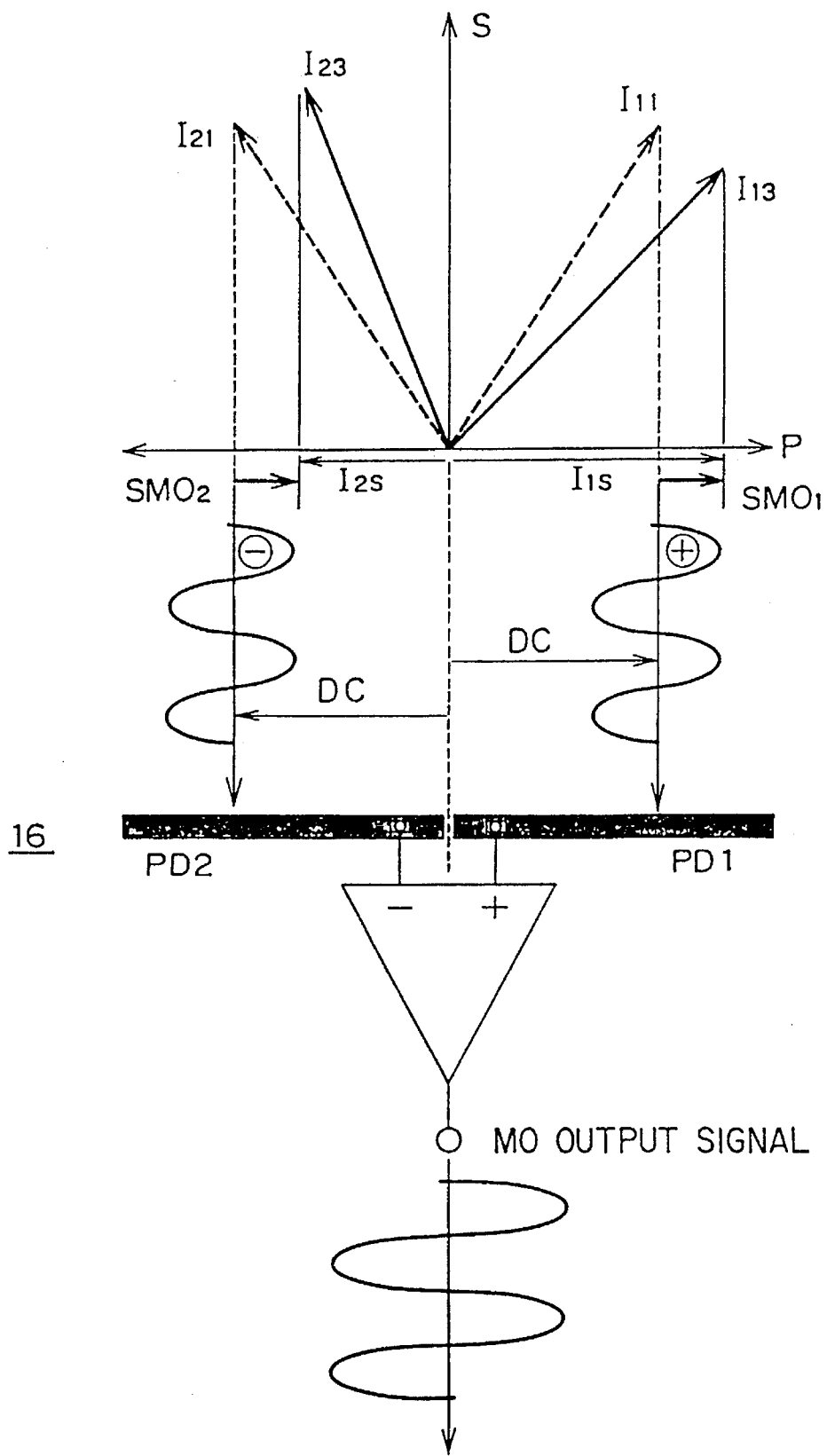
FIG. 27 is a view showing signal processing in the optical pickup apparatus shown in FIG. 25 and FIG. 26.

FIG. 27 is a view illustrating the wave detection of the MO signal by the double cross-section differential detection method.

The double cross-section differential detection method was named in this way because while there is apparently a single laser beam, use is made of a laser beam with a cross-section controlled in polarization independently at its half-moon shaped areas so as to detect the MO signal from the differentiation of area of the light amount.

The MO signal is the transmission light of the polarization beam splitter 14, and therefore both of the laser beams $I_{1S}$ and $I_{2S}$ have only the S polarized beam component. That is, the $\theta_1$ component is detected as the difference of the light intensity in the reflection stage, and when the differentiation between two signals is taken, the same phase component is removed. In the present invention, in principle, it is possible to perform the removal of the same phase up to the extinction rate of the polarization beam splitter 14, and therefore an intended MO signal having a high same phase removing ratio and high quality can be obtained.

The MO signal can be detected out by a similar processing as with a push-pull. As a result, it is possible to constitute the detection system of the MO signal by a planar structure, and therefore the optical pickup apparatus can be made small in size.

Also, it is possible to obtain the following signal as the signal of the four-way divided detector 16 based on the arithmetic operation of the above-described equation 8 and equation 9 using the astigmatic optical system as in the condenser lens 17 and the cylindrical lens 18.

TABLE 4

Focus error signal FE by the astigmatism method
Tracking error signal by the push-pull method
MO signal by the tangential push-pull method
RF signal by sum of four division signals of detector 16

That is, the MO signal can be detected by almost the same structure as that of the optical system of CD.

In the conventional MO optical system, it is necessary to mass-produce the reflection film of the beam splitter while controlling the optical phase characteristic (retardation), and thus there was a problem of a high price, but in the present embodiment, the polarization beam splitter 14 is used, and therefore the retardation basically does not occur.

In the combination optical rotating plate 52, the light amount is detected only in the return light path from the recording surface 1a and the light amount in the outgoing path is substantially completely transmitted, therefore the coupling efficiency is improved.

In this way, it is possible to arbitrarily set the optical rotation angle of the combination optical rotating plate 52 without any effect upon the coupling efficiency in the outgoing path, and therefore the amount of the incident light upon the detector 16 can be controlled. For example, when the optical rotation angles of the left optical rotating plate 52a and the right optical rotating plate 52b are changed to 0° to 45°, respectively, the returning light to the detector 16 can be arbitrarily set to 0 to 100 percent. That is, when the optical rotation angle of the combination optical rotating plate 52 is adjusted, it is possible to arbitrarily set the returning light, and therefore freedom of design of the amplifier connected to the output side of the detector 16 can be given, and thus the SN is improved.

As mentioned above, a change of phase difference as in the ½-wavelength plate 15 is not produced, and therefore the variation of the oscillation wavelength of laser beam source 11 is no longer a problem. As a result, it further becomes possible to assemble two or more laser beam sources 11 in the same optical system.

In the combination optical rotating plate 52, even if the left optical rotating plate 52a and the right optical rotating plate 52b have different optical rotation angles, the sums of the optical rotation angles in the outgoing path and return path become equal to (right optical rotation angle+left optical rotation angle) in both of the laser beam $I_{1S}$ and the laser beam $I_{2S}$, and therefore it is not necessary to strictly set the specifications of the elements of the combination optical rotating plate 52.

The polarization beam splitter 14 is cheap in comparison with the beam splitter for the MO, and also the combination optical rotating plate 52 is more inexpensive than a Wollaston prism. By actively utilizing such an advantage, the optical pickup apparatus of the present invention is constituted as illustrated in FIG. 28.

Figure 28:
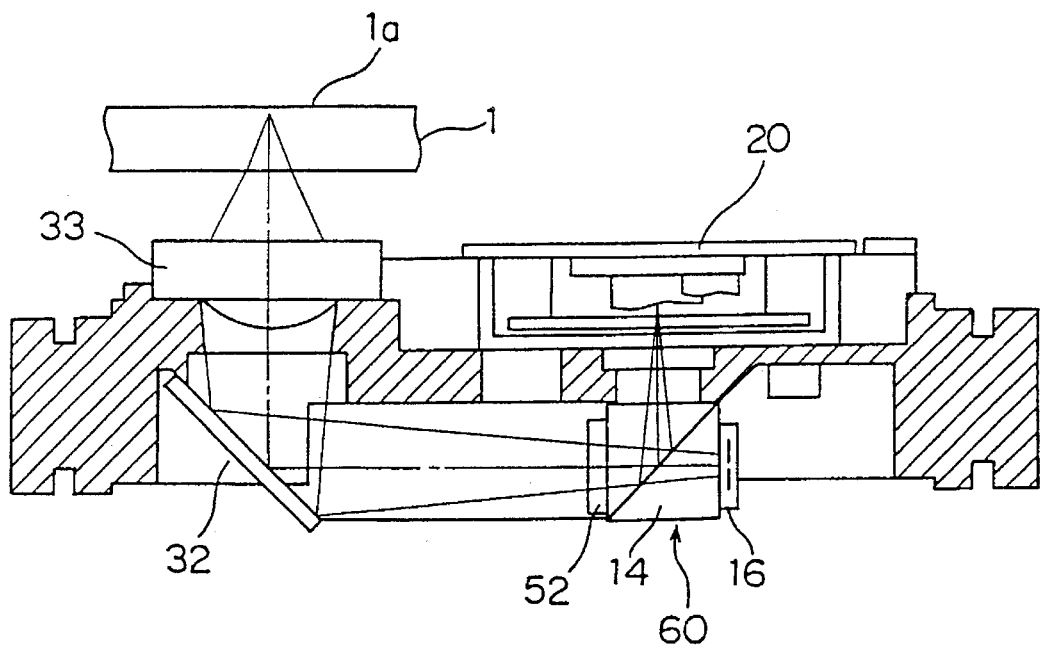
FIG. 28 is a cross-sectional structural view of an optical pickup apparatus of the third embodiment of the optical pickup apparatus for the magneto-optic storage device of the present invention.
Figure 29:
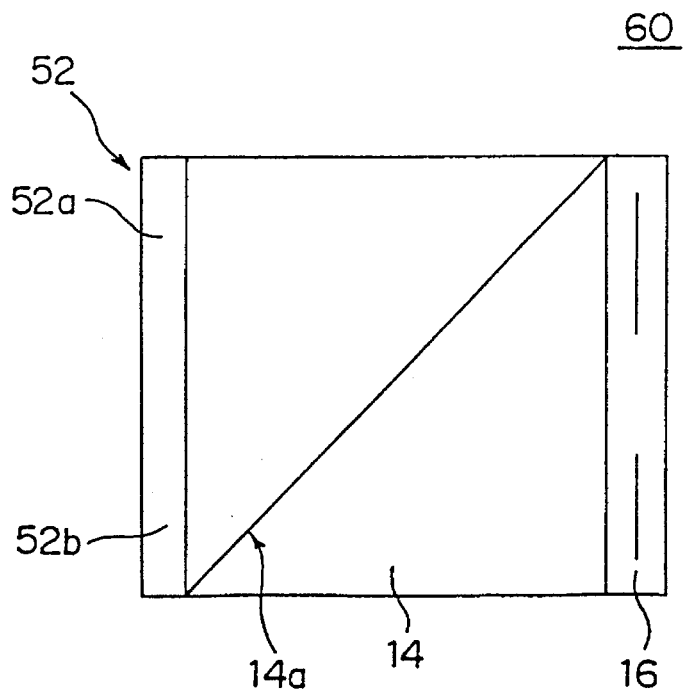
FIG. 29 is a partially enlarged structural view of the optical pickup apparatus shown in FIG. 28.

FIG. 28 corresponds to FIG. 13 illustrating the structure of the optical pickup apparatus using the ½-wavelength plate 15 as the first embodiment. However, the ½-wavelength plate 15 is not provided in the optical pickup apparatus shown in FIG. 28, but an optical assembly 60 formed by integrally constituting the combination optical rotating plate 52, the polarization beam splitter 14, and the detector 16 as shown in FIG. 29 is provided in the attachment part of the silicon mirror 31. A laser coupler 20 similar to the one illustrated in FIG. 14 is provided above the plane 14a of the polarization beam splitter 14. The silicon mirror 32 is arranged in the optical assembly 60, and the objective lens 13 is arranged at the top thereof.

Further, when considering the third embodiment of the present invention, new effects such as an advantage that an ultra-high resolution optical system was constituted, the effect of canceling out the push-pull signal to MO, the effect that the cutoff of the MTF (modulation transfer function) can be halved exactly for the same phase noise, and so on were found. A detailed description of these will be separately given in detail as the fourth embodiment.

Note that, the above-mentioned combination optical rotating plate 52 is not only used in the optical pickup apparatus for the magneto-optic storage device of the present invention, but can be applied to other various purposes changing the phase of the light and consequently generating a phase difference between a plurality of lights similar to the CPR 39 mentioned referring to the second embodiment.

A fourth embodiment of the optical pickup apparatus for the magneto-optic storage device of the present invention will be explained next referring to FIG. 30 to FIG. 42.

In the third embodiment, a description was made of how the internal polarization state of the combination optical rotating plate 52 was converted and how the MO signal was wave-detected by this. In the fourth embodiment of the present invention, a description will be made of the change of the space frequency axis (MTF) expressed by the optical characteristics, for example, the MO signal, phase pit signal, pregroove signal, etc. when the optical rotation angle and division direction in the combination optical rotating plate were changed.

Figure 30:
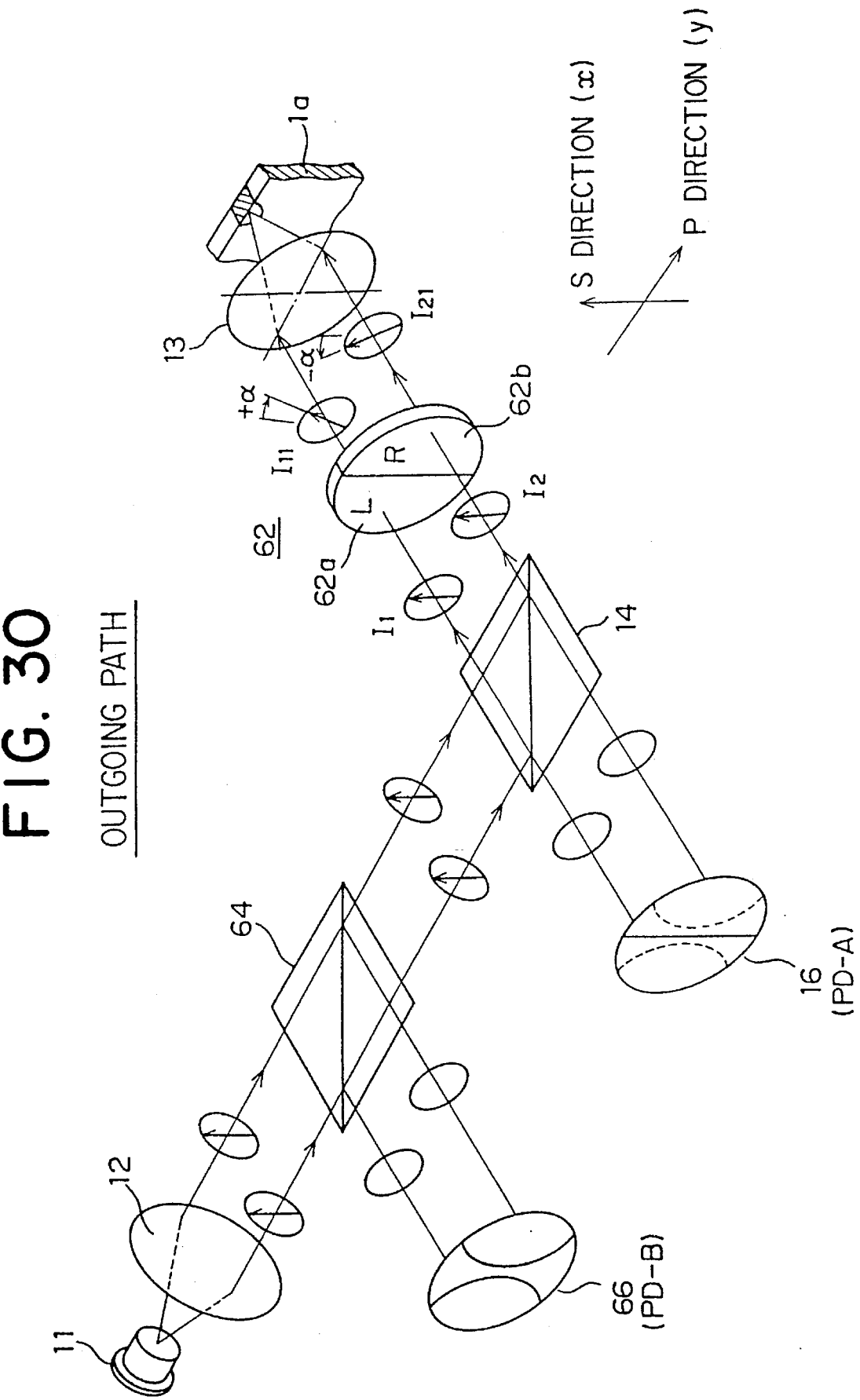
FIG. 30 and FIG. 31 are schematic structural perspective views of the optical pickup apparatus of the fourth embodiment of the optical pickup apparatus for the magneto-optic storage device of the present invention and a view of a beam trace.
Figure 31:
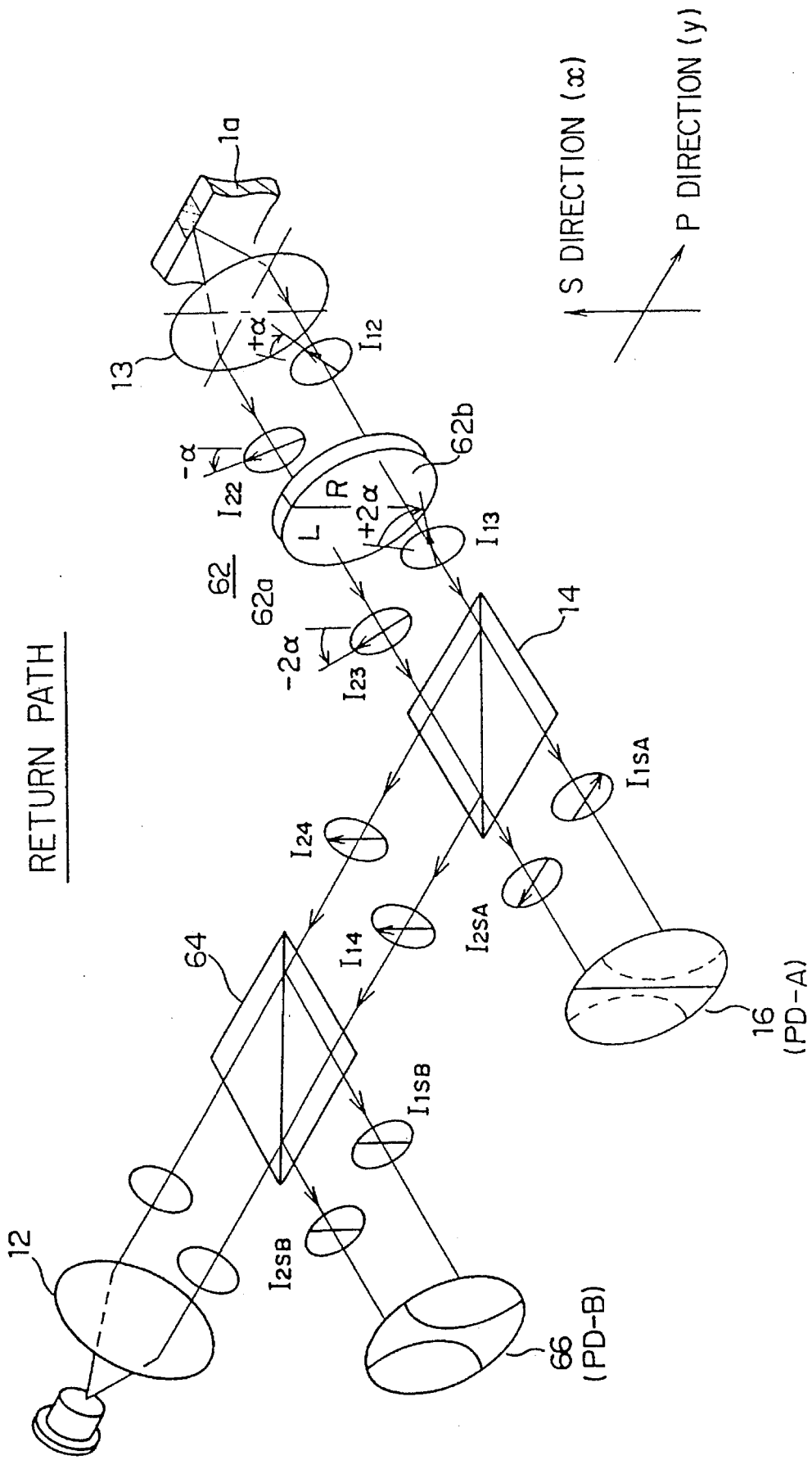
Figure 32A:
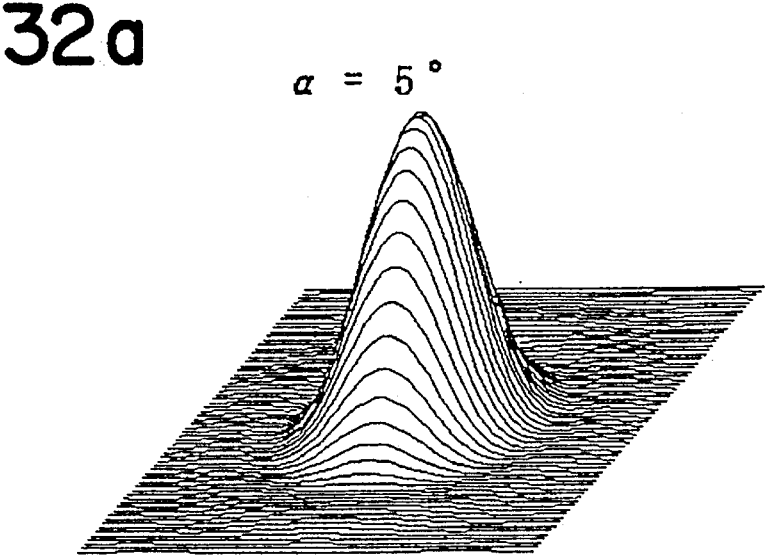
FIG. 32a to FIG. 32e are characteristic views of the optical combination rotating plate in FIG. 30 and FIG. 31.
Figure 32B:
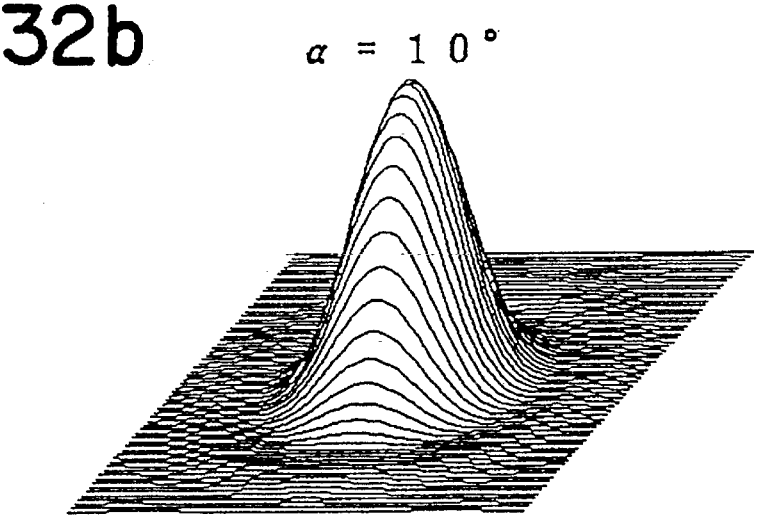
Figure 32C:
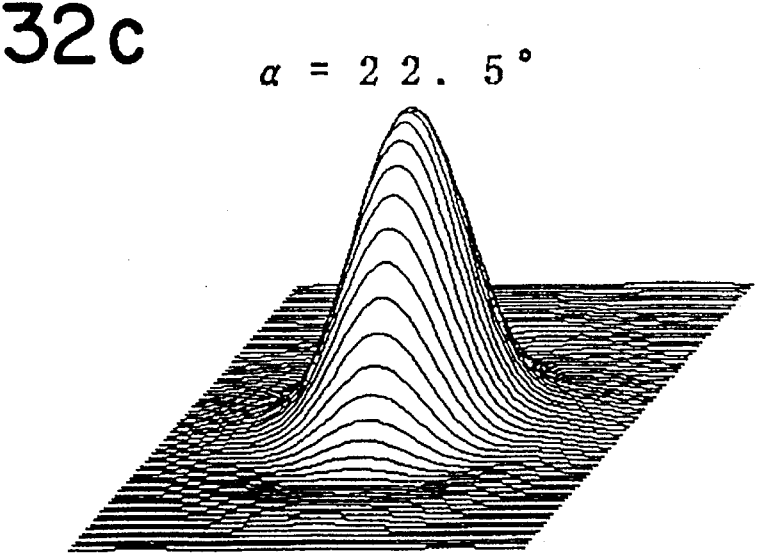
Figure 32D:
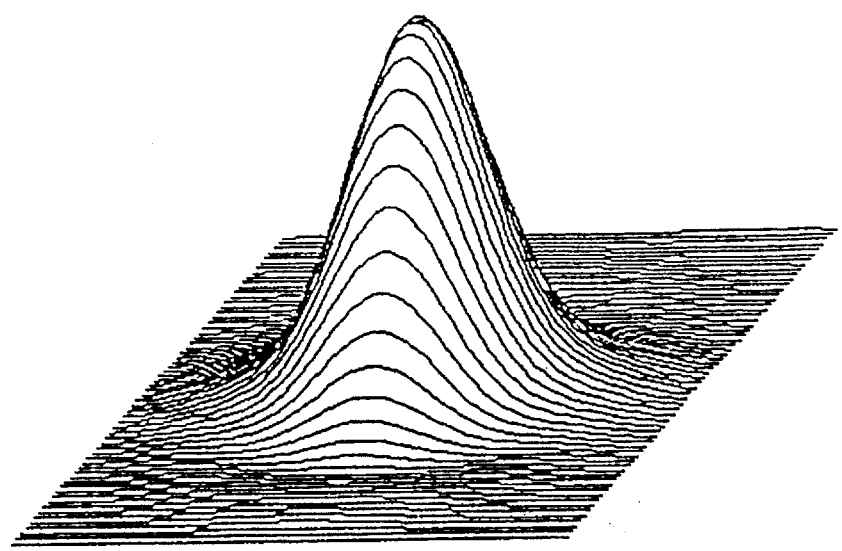
Figure 32E:
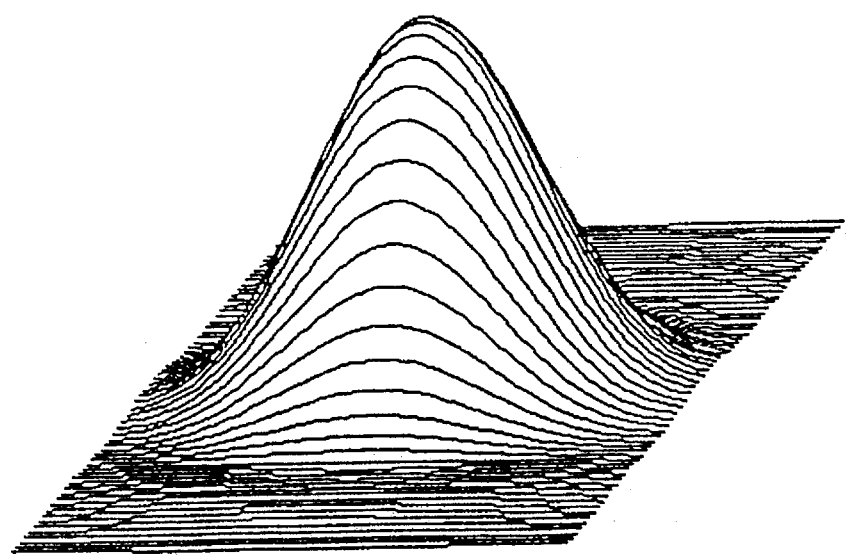

FIG. 30 and FIG. 31 are diagrammatical views of an optical system of an optical pickup apparatus of the fourth embodiment. FIG. 30 shows the outgoing path and FIG. 31 shows the return path.

This optical pickup apparatus uses the combination optical rotating plate 62 in place of the combination optical rotating plate 52 of the optical pickup apparatus shown in FIG. 22 of the third embodiment or in FIG. 25 and FIG. 26 and provides a beam splitter 64 between the collimate lens 12 and the polarization beam splitter 14 and also a second detector 66 on the emission side of this beam splitter 64. The laser beam source 11, collimate lens 12, polarization beam splitter 14, objective lens 13, and magneto-optic disk 1 (recording surface 1a) are similar to those of the optical pickup apparatus shown in FIG. 22.

First, a description will be made of the beam spot in the combination optical rotating plate 62.

The beam in the combination optical rotating plate 62 differs between the half-moon shaped division regions, and the beam spot obtained by converging these beams by the lens differs from the usual beam spot.

FIG. 32a to FIG. 32e respectively show the results of finding the beam spot by setting the optical rotation angle α of the combination optical rotating plate 62 to 5°, 10°, 22.5°, 30°, and 45°, by simulation. When the optical rotation angle α becomes larger, the distribution of the outer beam spot are expanded in the division direction.

As seen also from the ray tracing in the outgoing path shown in FIG. 30, in the polarization state of the beam light just before being incident upon the objective lens 13, since there is a difference of polarization of the angle +α and −α between respective cross-sections of the half-moon shaped left optical rotating plate 62a and right optical rotating plate 62b of the combination optical rotating plate 62, the same polarized beam components interfere with each other in the beam spot.

Figure 33:
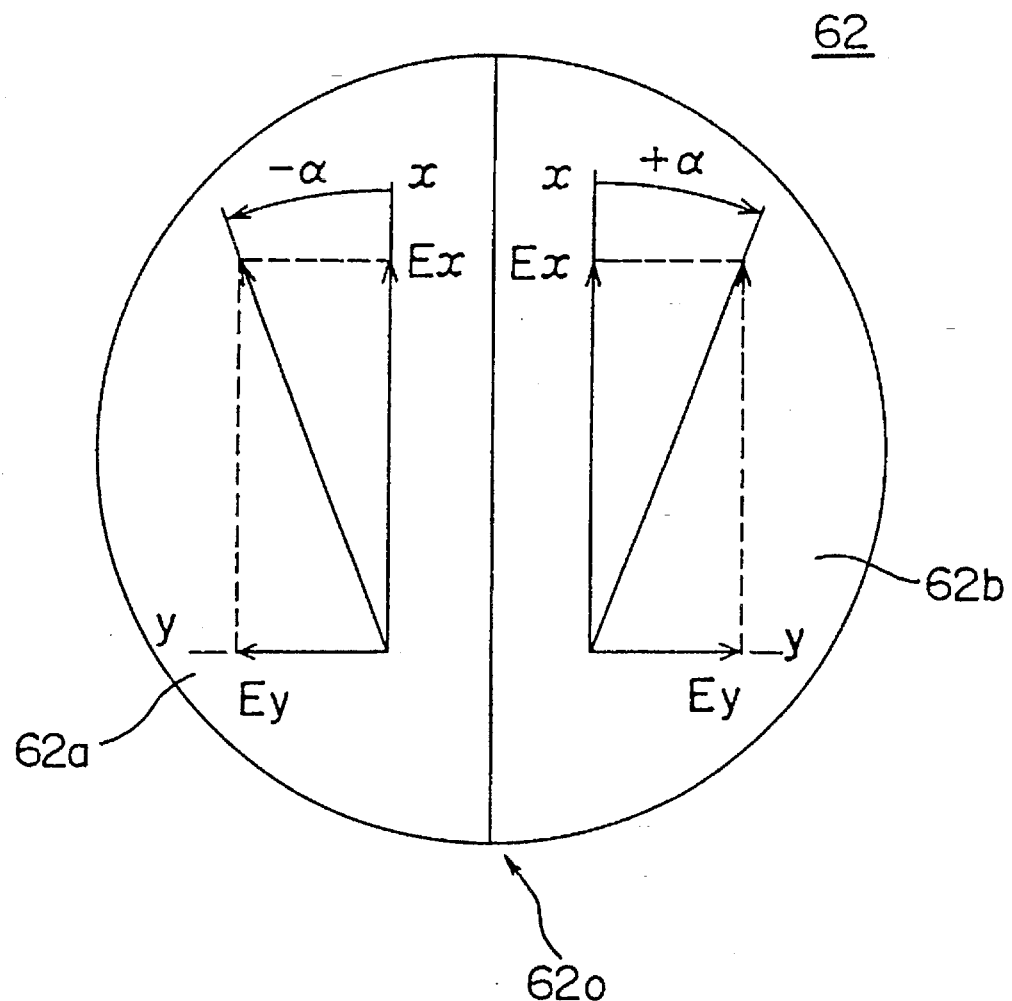
FIG. 33 is a view illustrating the signal component of the optical combination rotating plate shown in FIG. 32a to FIG. 32e.
Figure 34A:
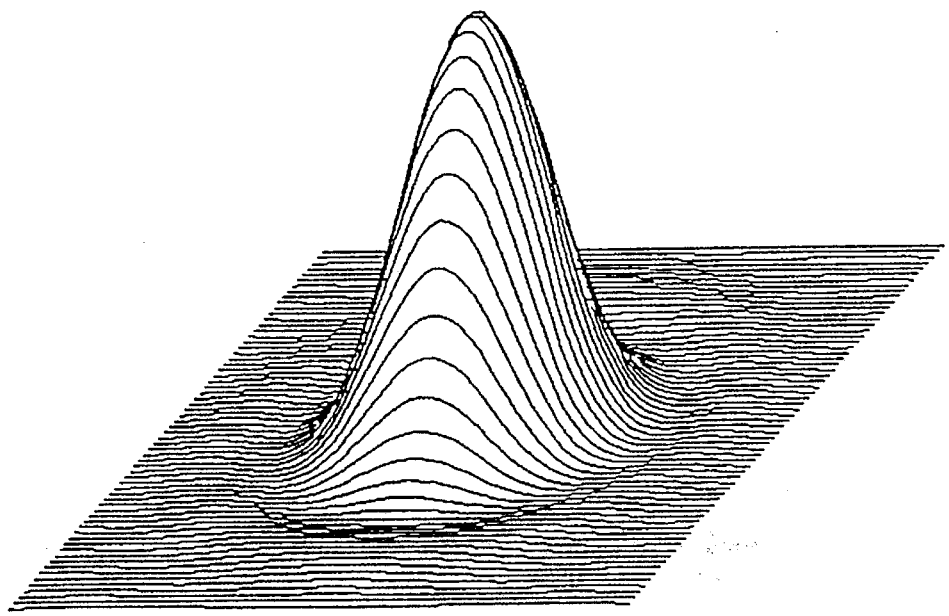
FIG. 34a and FIG. 34b are views illustrating x and y direction signal components of the optical combination rotating plate shown in FIG. 32a to FIG. 32e.
Figure 34B:
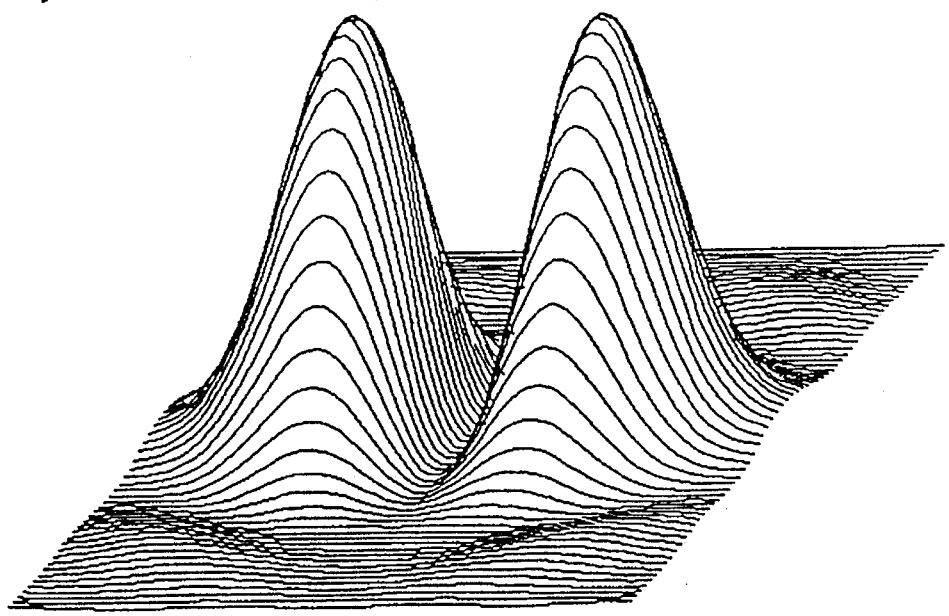

Therefore, as illustrated in FIG. 33, the results of simulation of how the beam spot becomes for each component in each direction where the direction along the divisional line 620 of the combination optical rotating plate 62 is an x-direction and the direction orthogonal to the divisional line 620 is the y-direction are shown in FIG. 34a and FIG. 34b. From this, there can be found the beam spot of the y-component having the same polarization direction as the so-called beam spot in the x-direction, i.e., of the same phase component but having the inverted phase to this. In the beam spot of the component in the y-direction, the light amount always becomes zero since the phase is inverted by 180° at the center of the beam.

As mentioned above, when a large optical rotation angle α of the combination optical rotating plate 62 is taken, the polarized beam component of the inverse phase is increased, and therefore the y-component shown in FIG. 34a and FIG. 34b is increased, and as shown in FIG. 32a to FIG. 32e, the beam spot in the divisional direction of the combination optical rotating plate 62 has an expanded bottom.

For example, when the optical rotation angle α is set to be equal to ±90°, the beam spot becomes the beam light shape per se of the y-component $E_y$.

In considering the reproduction characteristic of the magneto-optic disk 1, the energy distribution of this beam spot is important. The MTF and other parameters can be determined by this PSF (point spread function). In the combination optical rotating plate 62, the $E_x$ component and the $E_y$ component have different PSFs.

As the orthogonal planes of polarization, mere superposing can be applied. Accordingly, it is sufficient if the action of each of the $E_x$ component beam spot and the $E_y$ component beam spot is seen as the reproduction characteristic in the combination optical rotating plate 62.

Below, the removal of the phase groove diffraction light will be explained

Figure 35:
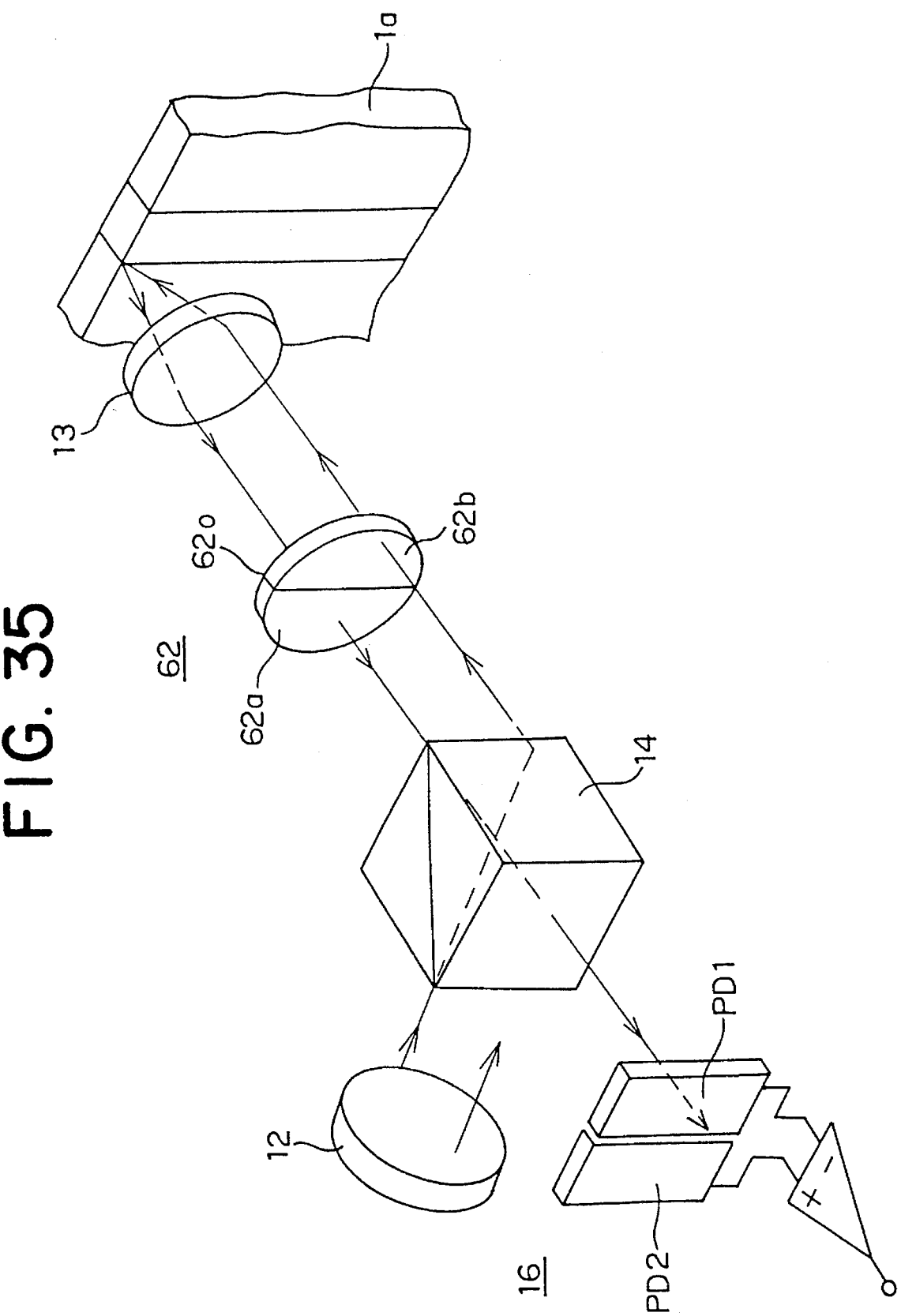
FIG. 35 is a view illustrating the division of the optical combination rotating plate of the first aspect of the fourth embodiment of the present invention.

As mentioned referring to FIG. 25 to FIG. 27 of the third embodiment of the present invention, the MO signal can be found by the double cross-section differential detection method. Here, an experiment was carried out for the case of an arrangement using a push-pull for the case where the division line 620 of the combination optical rotating plate 62 was arranged in parallel to the pregroove of the recording surface 1a as shown in FIG. 35, and it was divided into left and right portions, i.e., a left optical rotating plate 62a and a right optical rotating plate 62b. It was confirmed that there was an effect of outputting the MO signal and removing the push-pull signal.

A detailed description of the ray tracing will be given referring to FIG. 35a to FIG. 36m.

FIG. 36a to FIG. 36g and FIG. 36h show the respective beam states at the positions of $I_{12}$ and $I_{22}$ in the outgoing path shown in FIG. 31.

Figure 36A:

FIG. 36a: Referring to FIG. 30 and FIG. 31, in the plane of polarization of the laser beam reflected by the polarization beam splitter 14, all beam planes are in the S direction. The amplitude at this time is standardized to "1". Also the reflectance of the recording surface 1a of the magneto-optical disk 1 is set to "1".

Figure 36B:
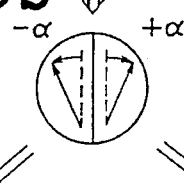

FIG. 36b: The laser beams passed through the combination optical rotating plate 62 and reflected at the recording surface 1a are defined as $I_{22}$ and $I_{12}$.

Figure 36C:
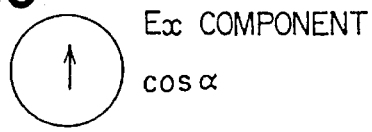
Figure 36D:

FIG. 36c and FIG. 36d: The beam is considered while dividing the same to the $E_x$ component and the $E_y$ component. Then, a case where these beams are subjected to the S axis diffraction at the recording surface 1a is assumed. For easy understanding, the pregroove is considered in the space frequency region of more than 1/NA (number of openings) at which the push-pull becomes maximum.

Figure 36E:
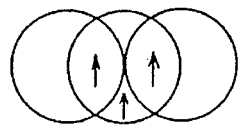
Figure 36F:
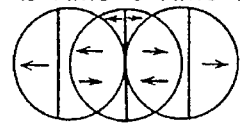

FIG. 36e and FIG. 36f: They indicate the superposing of the primary diffraction light by the pregroove (+/−) and the 0 order light. The intensities of (+/−) primary diffraction lights are l and r, and the intensity of the 0 order light is defined as c. Since the (+/−) primary diffraction lights are diffracted to l times and r times, respectively, in the form including also the plane of polarization, they exhibit inverse phases in the superposed part on the 0 order light in FIG. 36f.

Figure 36G:
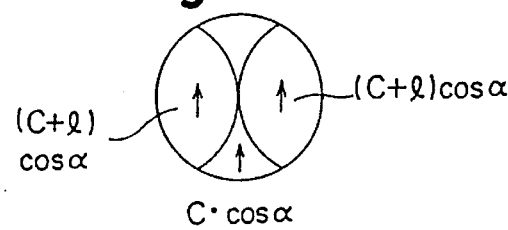
Figure 36H:
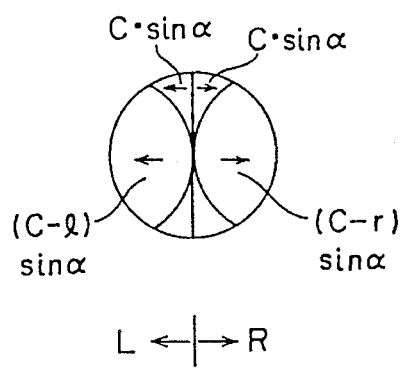

FIG. 36g and FIG. 36h: The characteristics illustrated in FIG. 36e and FIG. 36f are indicated by the amplitude.

FIG. 36i and FIG. 36j show the state of the beams $I_{13}$ and $I_{23}$ in the outgoing path shown in FIG. 30 at different positions.

FIG. 36i and FIG. 36j: In a step where the light reflected at the recording surface 1a is returned, when it passes through the combination optical rotating plate 62 again, the plane of polarization is rotated exactly at the optical rotation angle α together with the beam shown in FIG. 36g and FIG. 36h, and therefore there exist again the $E_x$ component and the $E_y$ component in a mixed manner.

FIG. 36k and FIG. 36l show the state of the beams $I_{1SA}$ and $I_{2SA}$ in the outgoing path indicated in FIG. 30 at different positions.

FIG. 36k and FIG. 36l: The characteristics illustrated in FIG. 36i and FIG. 36j are wave-detected at the polarization beam splitter 14 and only the P component is transmitted.

FIG. 36m: The P components shown in FIG. 36k and FIG. 36l are added.

From the above, both of the beams $I_{1SA}$ and $I_{2SA}$ are 2c·sinα·cosα, the push-pull signal becomes "0", and the phase groove diffraction light does not depend upon the magnifications l, r, and c and does not depend on the optical rotation angle α.

Note that, in the above-mentioned phase groove diffraction light, the S component in FIG. 36i and FIG. 36j is reflected at the polarization beam splitter 14 and this polarization beam depends on the magnifications l, r, and c and depends on the optical rotation angle a, and therefore contains the push-pull component, and thus it is possible to apply tracking servo control by the signal from the second detector 66.

Also, the beams $I_{1SA}$ and $I_{2SA}$ have the same plane of polarization but have the phase of 180°, and therefore the MO signal can be detected from $(I_{1SA} - I_{2SA})$.

Figure 37:
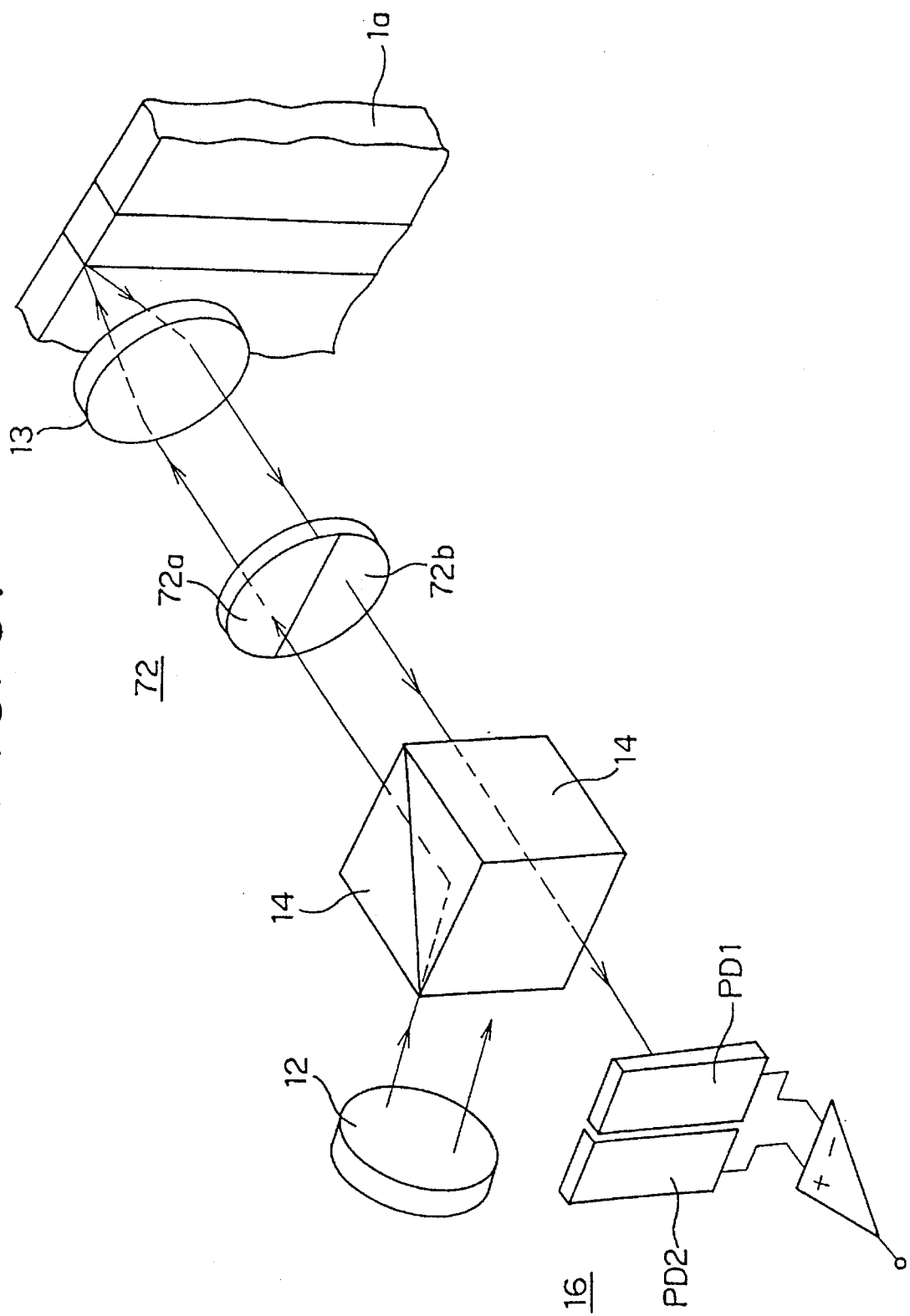
FIG. 37 is a view illustrating the division of the optical combination rotating plate of the second aspect of the fourth embodiment of the present invention.
Figure 38A:
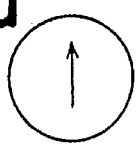
FIG. 38a to FIG. 38i are views illustrating the beam trace in FIG. 37.
Figure 38B:
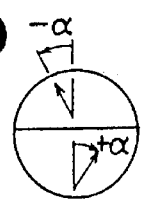
Figure 38C:
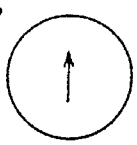
Figure 38D:
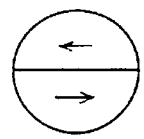
Figure 38E:
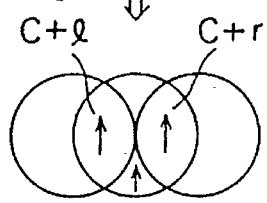
Figure 38F:
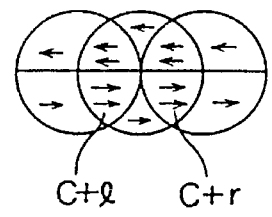
Figure 38G:
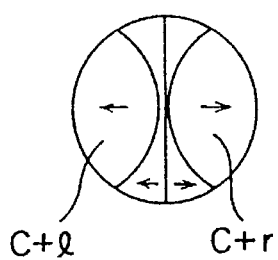
Figure 38H:
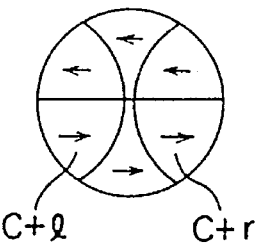
Figure 38I:
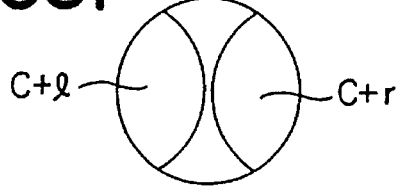

On the other hand, as shown in FIG. 37, where the combination optical rotating plate 72 is divided into two, the left optical rotating plate 72a and the right optical rotating plate 72b in the tangential direction, it is possible to also take out the push-pull signal as a signal from the detector 16 by the radial push-pull method, and further to take out also the MO signal by subtraction of the signal depending on the optical rotating plate in the tangential direction.

FIG. 38a to FIG. 38i show the ray tracing corresponding to FIG. 36a to FIG. 36m in the optical system shown in FIG. 37.

A description will be made of the phase pit diffraction light removing (suppressing) effect.

As illustrated in FIG. 36m, a push-pull signal is not derived from $(I_{1SA} - I_{2SA}) = 0$. Moreover, also $(I_{1SA} + I_{2SA})$ does not contain the information of the pregroove. Namely, a track loss signal is not derived. In other words, a case where the combination optical rotating plate 72 is divided in the tangential direction as illustrated in FIG. 37 means that also the phase pit is not reproduced. The double cross-section differential detection method is used so as to obtain the MO signal for removing such a same phase noise, and therefore the fourth embodiment exhibits an effect of the reduction of the same phase noise.

As mentioned above, in the fourth embodiment, the combination optical rotating plate 62 or the combination optical rotating plate 72 has a characteristic that the way of viewing the MO signal and pit signal differs depending upon the optical rotation angle α and the division direction in tangential the direction or the radial direction.

Figure 39A:
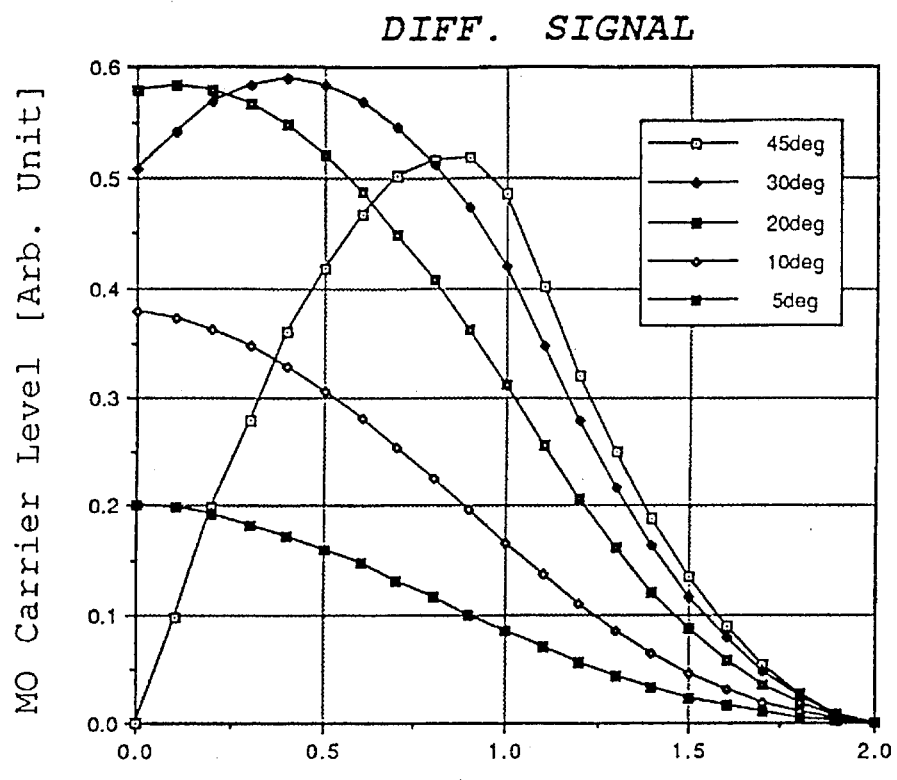
FIG. 39a and FIG. 39b are graphs indicating the results of simulation for an MO signal and sum signal of the optical combination rotating plate of the fourth embodiment of the present invention.
Figure 39B:
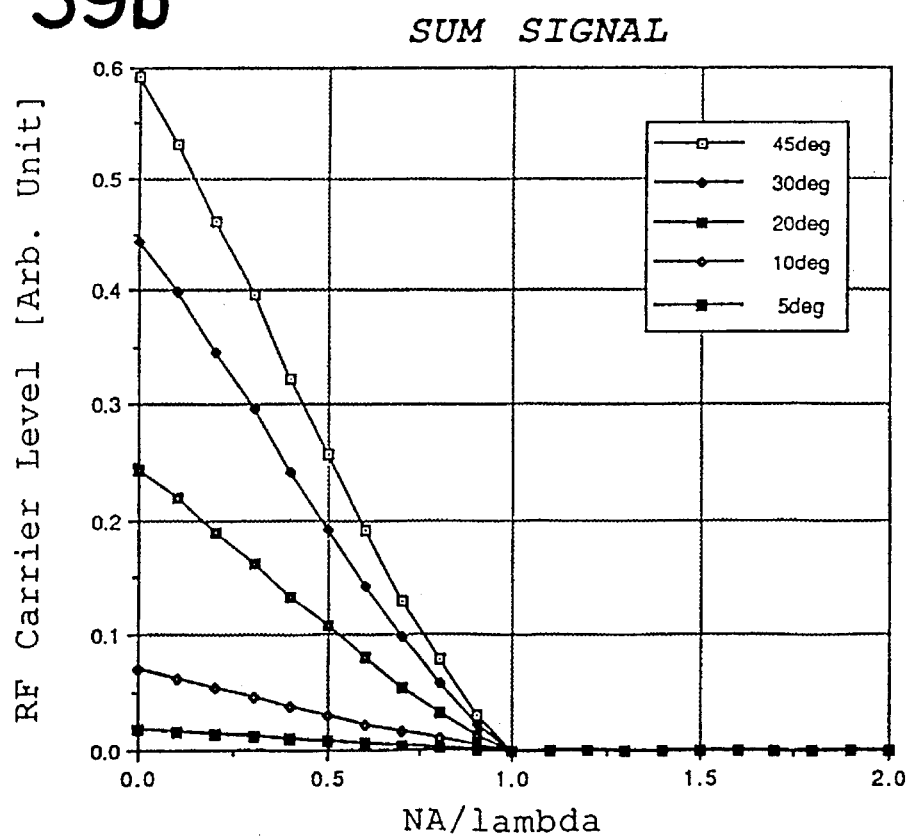

FIG. 39a and FIG. 39b are views of the characteristics of the differential (push-pull) signal and the characteristics of the sum (RF) signal based on simulation when the optical rotation angle α of the combination optical rotating plate 62 is equal to 0°, 5°, 22.5°, 30°, and 45° as shown in FIG. 32a to FIG. 32f. The abscissa shows the NA/λ.

Figure 40:
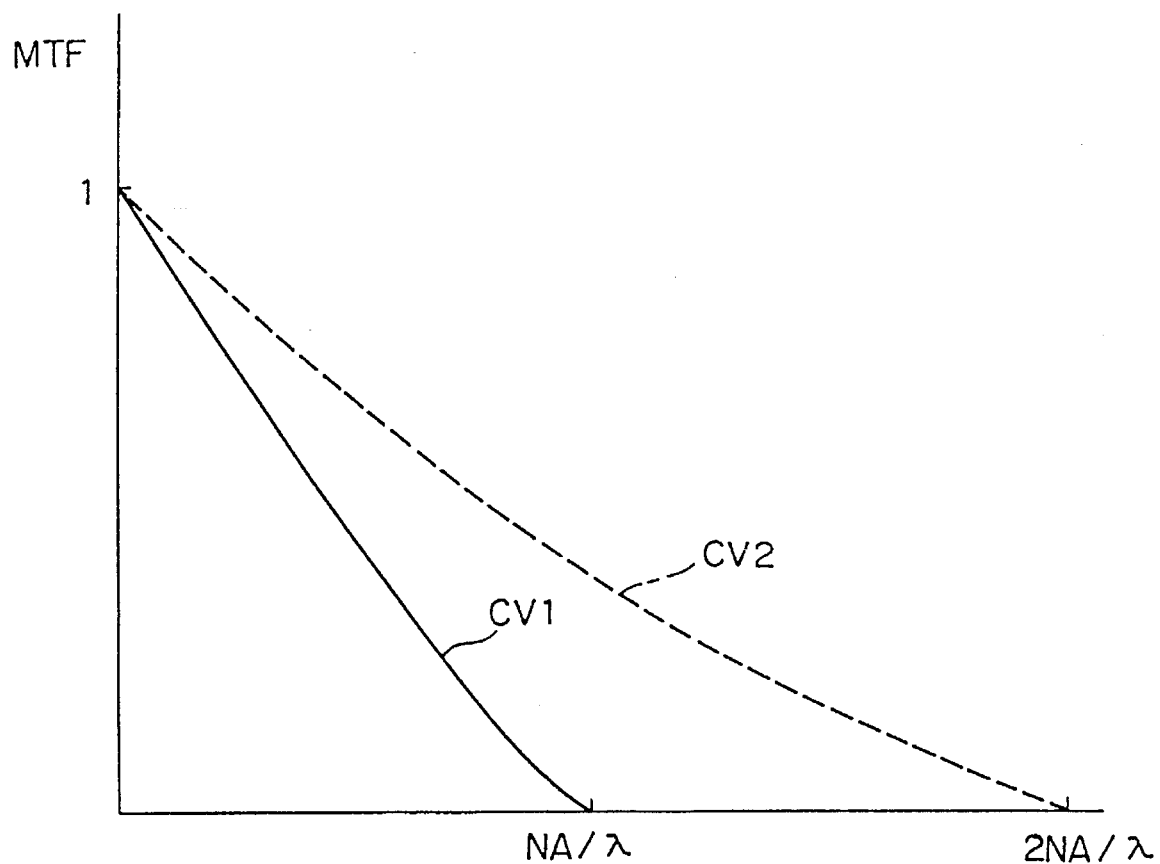
FIG. 40 is a graph defining the graph illustrated in FIG. 39b.

FIG. 39b shows that the MTF of the pit train aligned in the tangential direction can be reproduced to exactly an extent of a half of the space frequency when the combination optical rotating plate 72 is divided in the tangential direction as illustrated in FIG. 37. The larger the optical rotation angle α of the combination optical rotating plate 72, the larger the amount of light of the beam returned to the detector 16, and therefore the absolute value varies, but as shown in FIG. 40, when it is standardized by NA/λ=0, it is aligned to one line as indicated by a curve CV1 shown by a solid line. Note that, the curve of the broken line indicates the conventional MTF curve CV2.

Note that, the push-pull signal is removed as the carrier level=0 since the period of pits (period of pregroove) is at NA/λ=1.0 when the reflection light of the recording surface 1a is reproduced by dividing the combination optical rotating plate 72 in the radial direction.

As shown in FIG. 39a, the MO signal can also be reproduced by changing the form of the MTF curve. Further, it is seen that it becomes possible to largely take out also the amplitude value of the MO signal. Particularly where α is set equal to 22.5°, wave detection is performed at 45° in PBS, and therefore the maximum amplitude can be obtained.

In this way, the optical system of the fourth embodiment exhibits an ultrahigh resolution, and when for example the optical rotation angle α=45°, also spatial differential detection becomes possible.

Also, in the fourth embodiment of the present invention, there is exhibited an effect that the amplitude of the signal becomes large and the SN of the amplifier is enhanced.

Figure 41A:
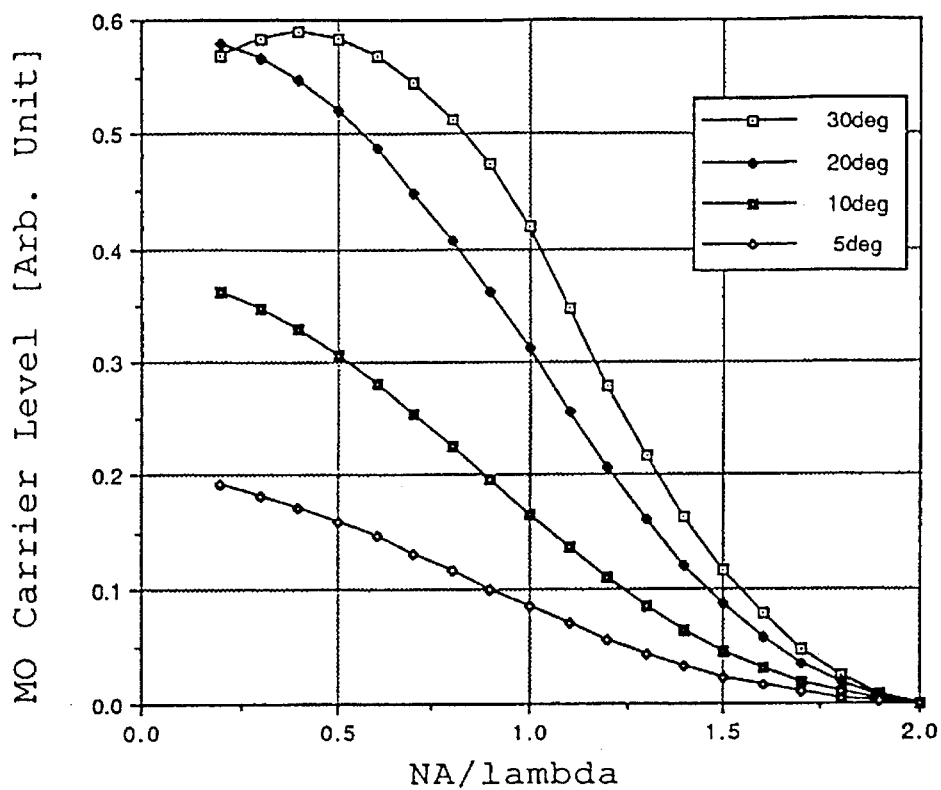
FIG. 41a and FIG. 41b are graphs showing theoretical values and actually measured values of the optical combination rotating plate in the fourth embodiment of the present invention.
Figure 41B:
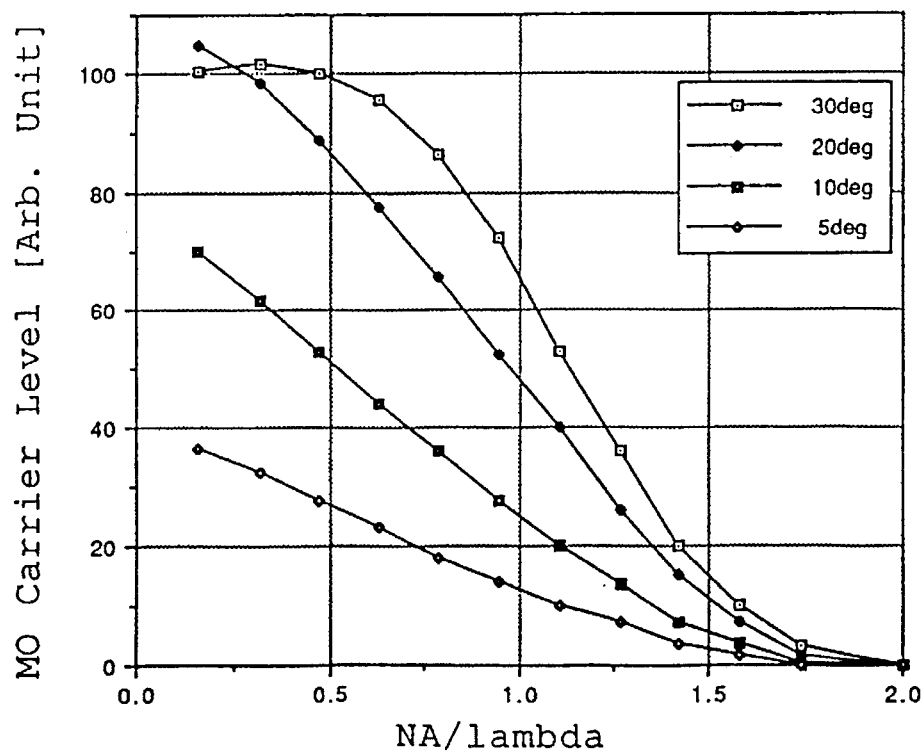

FIG. 41a shows the curve of the theoretical values of the MO signal and FIG. 41b shows the curve of the actually measured values. In this way, the theoretical values and the actually measured values correspond well.

Figure 42:
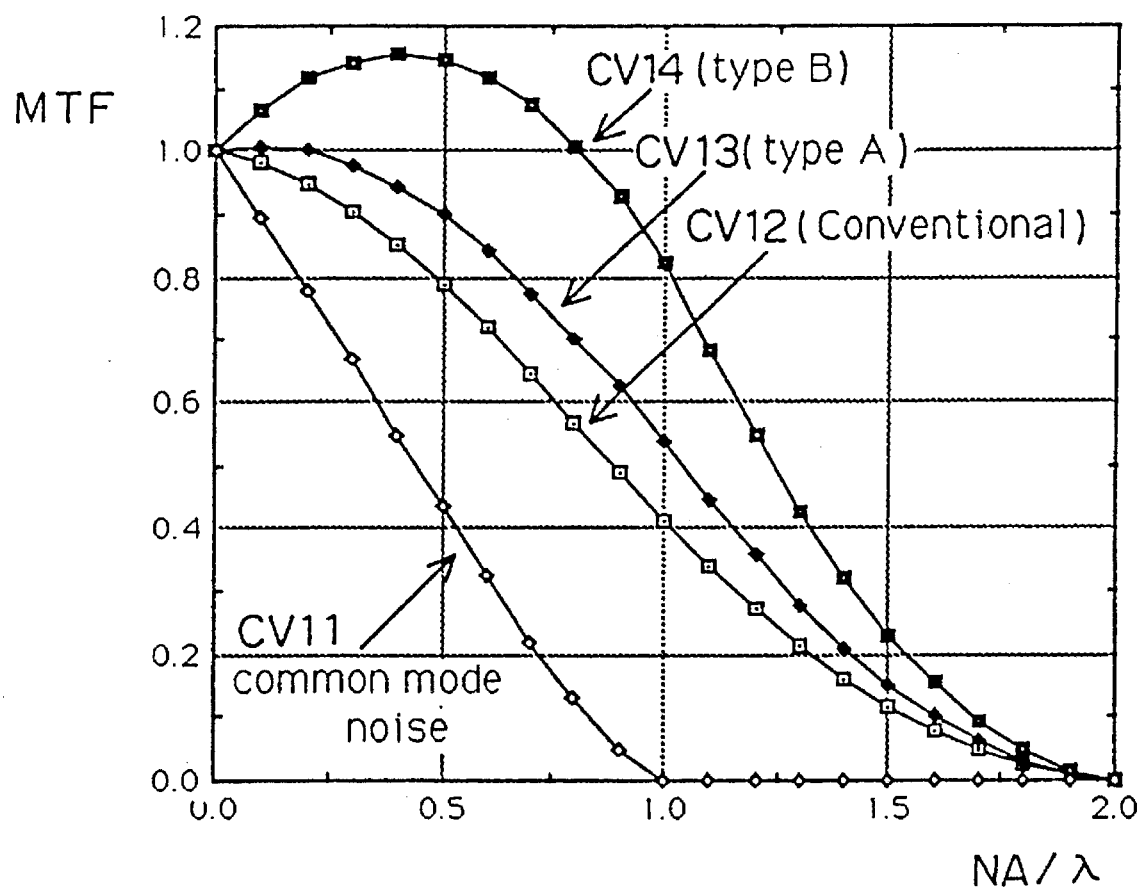
FIG. 42 is a graph showing the MTF of the conventional combination rotating plate and the optical combination rotating plate of the fourth embodiment of the present invention.

FIG. 42 is a graph showing the values of FIG. 41a and FIG. 41b by the MTF curve by standardizing the same by 1.0. The curve CV11 shows the same phase noise, that is, RF signal; the curve CV12 shows the MTF when the optical rotation angle α=10°; the curve CV13 shows the MTF when the optical rotation angle α=20° as the fourth embodiment; and also the curve CV14 shows the MTF when the optical rotation angle α=30° as the fourth embodiment. Particularly, it is seen that an ultra-high resolution optical system has been realized in the curve CV14 (rotation angle α=30°).

The combination optical rotating plate 62 or combination rotating plate 72 of the fourth embodiment of the present invention mentioned above can be applied for an optical pickup apparatus similar to FIG. 28 and FIG. 29 shown as the third embodiment.

Further, the combination optical rotating plate 62 or the combination optical rotating plate 72 mentioned as the fourth embodiment of the present invention can be applied to other optical apparatuses other than the optical pickup apparatus.

The present invention is not restricted to the above-mentioned embodiments and can include other various modified aspects.

Moreover, it is also possible to appropriately combine various embodiments of the present invention mentioned above.

INDUSTRIAL APPLICABILITY

An optical pickup apparatus for a magneto-optic storage device of the present invention can be preferably used in an optical recording and reproduction apparatus. Particularly, the optical pickup apparatus for the magneto-optic storage device of the present invention is constituted to have a small size, and therefore also the entire magneto-optic storage device including this optical pickup apparatus for a magneto-optic storage device can be made to have a small size. Alternatively, the optical pickup apparatus for a magneto-optic storage device of the present invention can be applied to a small size magneto-optic storage device.

Further, the ½-wavelength plate, combination phase retardation prism, and combination optical rotating plate exemplified as the elements constituting the optical pickup apparatus for a magneto-optic storage device of the present invention not only can be applied to an optical pickup apparatus for a magneto-optic storage device, but also can be applied to various apparatuses changing the phase of two beams with predetermined relationships.

We claim:

1. An optical pickup apparatus for a magneto-optic storage device having a laser beam source (11), a polarization beam splitter (14), an objective lens (13), and a light detection element (16) which are arranged along a light axis (0-0'), wherein emitted light from said laser beam source is emitted as converted light to a recording surface (1a) of a magneto-optic recording medium (1) and a predetermined polarized beam component in the reflection light from the recording surface of said magneto-optic recording medium is split by said polarization beam splitter and taken out at said light detection element, characterized in that the apparatus includes:

phase change means (15, 39, 52:62:72) which change the phase of light passing through one side of said light axis and the phase of the light passing through the other side of said light axis at exactly a predetermined angle between said polarization beam splitter (14) and said objective lens (13), wherein said phase change means comprises a ½-wavelength plate (15), said plate including two division regions (15a, 15b) on a flat plane orthogonal to said light axis (0-0') facing across said light axis as a boundary and having planes of vibration at predetermined angles relative to said light axis, having C axes with respect to said light axis defined as a $C_1$ axis and a $C_2$ axis, and said plate being arranged so that the emitted light from said laser beam source (11) passes through one division region and the reflection light reflected at the recording surface (1a) of said magneto-optic recording medium (1) passes through another division region; and wherein the light changed by said phase change means is detected via said polarization beam splatters (14, 14A) and said light detection elements (16, 16A:19), wherein said light detection element is divided into at least two regions with said light axis (0-0') as a center corresponding to the division of said ½-wavelength plate (15).

2. An optical pickup apparatus for a magneto-optic storage device as set forth in claim 1, wherein said light detection element (16) has four division regions each of which does not have a detection portion in the portion corresponding to said light axis (0-0').

3. An optical pickup apparatus for a magneto-optic storage device as set forth in claim 2, wherein a magneto-optic (MO) recording signal recorded in said magneto-optic recording medium is detected from the detection signals of each of the four division regions of said light detection element (16).

4. An optical pickup apparatus for a magneto-optic storage device as set forth in claim 3, wherein an astigmatic optical system, such as a condenser lens (17), cylindrical lens (18), and the like is provided between said light detection element (16) and said polarization beam splitter (14).

5. An optical pickup apparatus for a magneto-optic storage device as set forth in claim 1, wherein said ½-wavelength plate (15) is face-adhered to the surface of said polarization beam splitter (14) on said objective lens (13) side.

6. An optical pickup apparatus for a magneto-optic storage device as set forth in claim 1, wherein, as said light detection element (16), a light detection element (19) having a large light receiving surface area is face-adhered to the surface of said polarization beam splitter (14) orthogonal to the surface to which said ½-wavelength plate (15) is adhered.

7. An optical pickup apparatus for a magneto-optic storage device as set forth in claim 6, wherein said laser beam source (11) is a hologram laser unit equipped with a focus error detection function.

8. An optical pickup apparatus for a magneto-optic storage device as set forth in claim 4, wherein a collimate lens (12) collimating the beam from said laser beam source to a parallel beam is provided between said laser beam source (11) and said polarization beam splitter (14).

9. An optical pickup apparatus for a magneto-optic storage device as set forth in claim 1, wherein the aforesaid polarization beam splitter includes a polarization beam splitter (14A) in which the phase difference between the polarized P wave component and the polarized S wave component is almost 0°.

10. An optical pickup apparatus for a magneto-optic storage device as set forth in claim 1, wherein:
   the angles of the vibration planes in said two division regions (15a, 15b) of said ½-wavelength plate (15) are made different and
   a light detection element (16A) in which the light receiving plane is not divided is used as said light detection element (16).

11. An optical pickup apparatus for a magneto-optic storage device as set forth in claim 1, wherein the light detection element (16A) in which the light receiving plane is not divided is an avalanche photodiode.

12. An optical pickup apparatus for a magneto-optic storage device as set forth in claim 1, wherein said optical pickup apparatus for a magneto-optic storage device comprises:
   a laser coupler (20) which includes a microprism (23) having a plane (23a) with a predetermined inclination angle and having a first parallel plane reflecting the light incident through said plane at the first position and a second parallel plane parallel to said first parallel plane at which the light reflected at said first position is further reflected and is constituted so that the light reflected at the second parallel plane is further reflected to the second position of the first parallel plane; two light detection elements (24, 25) provided corresponding to said first position and second position of said first parallel plane, and each having three division regions obtained by division into three, i.e., a center portion (24b, 25b) and two side portions (24a:24c, 25a:25c) thereof; and a laser beam source (22) provided so as to face said inclination plane of said microprism (23), said microprism, said two light detection element and said laser beam source being integrally constituted on the same semiconductor substrate (21);
   a first mirror (31) provided on the side at which the light from said laser beam source (22) incident upon the inclination plane of said microprism (23) is reflected;
   a second mirror (32) which faces the reflection plane of said first mirror (31), receives the reflection light from said first mirror, and emits the same to an orthogonal direction; and
   a ½-wavelength plate (34) which has two division regions (34a, 34b), for dividing the emitted light of said second mirror (32) to at least two, which face each other with said light axis as a boundary on a plane orthogonal to said light axis (0-0'), have planes of vibration of predetermined angles, and have C axes with respect to said light axis defined as a $C_1$ axis and $C_2$ axis, and which is arranged so that the emitted light from said second mirror (32) passes through one division region and the reflection light reflected at the recording surface (1a) of said magneto-optic recording medium (1) passes through another division region.

13. An optical pickup apparatus for a magneto-optic storage device as set forth in claim 12, wherein: provision is further made of two differential amplifiers (26, 27) which detect the differential signals from the three division regions of each of said two light detection elements (24, 25) and a third differential amplifier (28) which further differential-amplifies the output signals of these differential amplifiers.

14. An optical pickup apparatus for a magneto-optic storage device as set forth in claim 13, wherein an objective lens (33) is provided between said ½-wavelength plate (34) and said magneto-optic-disk (1).

15. An optical pickup apparatus for a magneto-optic storage device as set forth in claim 1, wherein:
   a polarization beam splitter (14A) in which the phase difference between the polarized P wave component and the polarized S wave component is almost 0° is used as said polarization beam splitter;
   said ½-wavelength plate (15) is face-adhered to the surface of said polarization beam splitter (14A) on the side of said objective lens (13); and
   a light detection element (19) having a laser light receiving surface area is face-adhered to the surface of said polarization beam splitter (14A) orthogonal to the surface to which said ½-wavelength plate (15) is face-adhered.

16. An optical pickup apparatus for a magneto-optic storage device as set forth in claim 15, wherein:
   the angles of said planes of vibration in two division regions (15a, 15b) of said ½-wavelength plate (15) are made different and
   a light detection element (16A) in which the light receiving plane is not divided is used as said light detection element.

17. An optical pickup apparatus for a magneto-optic storage device as set forth in claim 16, wherein said light detection element (16A) in which the light-receiving plane is not divided is an avalanche photodiode.

18. An optical pickup apparatus for a magneto-optic storage device as Bet forth in claim 1, which has:
   a laser beam source (11);
   an objective lens (13) which converges the emitted light from said laser beam source and irradiates the same onto the recording surface (1a) of the magneto-optic recording medium (1);
   a polarization beam splitter (14) which is arranged between the above-described laser beam source and the objective lens and splits the predetermined polarized beam component in the reflection light reflected at the recording surface of the above-described magneto-optic recording medium;
   a ½-wavelength plate (15) which is arranged between said polarization beam splitter and said magneto-optic recording medium, has planes of vibration having predetermined angles in two division regions (15a, 15b) on the plane orthogonal to the light axis, and has C axes of them with respect to said light axis defined as the $C_1$ axis and $C_2$ axis; and
   light detection elements (16, 16A) which detect the level of the predetermined polarized beam component split at the above-described polarization beam splitter, and wherein the reflection light in the emitted light from said laser beam source, passed through one region of said ½-wavelength plate, and reflected at the recording surface of said magneto-optic recording medium is made to pass through another region of said ½-wavelength plate.

19. An optical pickup apparatus for a magneto-optic storage device as set forth in claim 1, wherein the angles of the planes of vibration of said two division regions are 45° and 22.5°, respectively.

20. An optical pickup apparatus for a magneto-optic storage device as set forth in claim 1, wherein:

said phase change means comprises a phase difference generation device including a 45 degree prism (40), and phase difference generating films (41, 41A, 41B) which have a plurality of division regions (41a:41b, 41aA:41bA, 41aB:41bB) which are coated on the reflection plane of said 45 degree prism, are obtained by division into at least two on the plane orthogonal to said light axis (O-O'), and have mutually predetermined phase difference characteristics and which are arranged so that the emitted light from said laser beam source (11) passes through one division region and the reflection light reflected at the recording surface (1a) of said magneto-optic recording medium (1) passes through another division region.

21. An optical pickup apparatus for a magneto-optic storage device as set forth in claim 20, wherein the film thickness of said phase difference generating films (41, 41A, 41B) is adjusted to change said phase difference.

22. An optical pickup apparatus for a magneto-optic storage device as set forth in claim 21, wherein:

the number of said division regions is two and these two division regions are divided symmetrically relative to a diagonal line of said reflection plane (40a).

23. An optical pickup apparatus for a magneto-optic storage device as set forth in claim 21, wherein:

the number of said division regions is two and these two division regions are divided symmetrically in a vertical direction in said reflection plane (40a).

24. An optical pickup apparatus for a magneto-optic storage device as set forth in claim 21, wherein:

the number of said division regions is two and these two division regions are divided symmetrically horizontally in said reflection plane (40a).

25. An optical pickup apparatus for a magneto-optic storage device as set forth in claim 20, wherein said light detection element (14) is divided corresponding to the division of said phase difference generating film.

26. An optical pickup apparatus for a magneto-optic storage device as set forth in claim 25, wherein the magneto-optic recording signal recorded in said magneto-optic recording medium is detected from the detection signal of said light detection element.

27. An optical pickup apparatus for a magneto-optic storage device as set forth in claim 26, wherein a condenser lens (17) and a cylindrical lens (18) are provided between said light detection element and said polarization beam splitter (14).

28. An optical pickup apparatus for a magneto-optic storage device as set forth in claim 27, wherein, as said light detection element, a light detection element (19) having a large light receiving surface area is face-adhered to the surface of said polarization beam splitter (14) orthogonal to the side on which said phase difference generation device is arranged.

29. An optical pickup apparatus for a magneto-optic storage device as set forth in claim 20, wherein said optical pickup apparatus for a magneto-optic storage device comprise:

a laser coupler (20) which includes a microprism (23) having a plane (23a) with a predetermined inclination angle and having a first parallel plane reflecting the light incident through said plane at the first position and a second parallel plane parallel to said first parallel plane at which the light reflected at said first position is further reflected and is constituted so that the light reflected at the second parallel plane is further reflected to the second position of the first parallel plane; two light detection elements (24, 25) provided corresponding to said first position and second position of said first parallel plane, and each having three division regions obtained by division into three, i.e., a center portion (24b, 25b) and two side portions (24a:24c, 25a:25c) thereof, respectively; and a laser beam source (22) provided so as to face said inclination plane of said microprism (23), said microprism, said two light detection element and said laser beam source being integrally constituted on the same semiconductor substrate (21);

a polarization beam splitter (14) provided on the side at which the light from said laser beam source (22) incident upon the inclination plane of said microprism (23) is reflected;

said phase difference generation device (39) which is arranged on the light emission side of said phase polarization beam splitter;

a mirror (32) arranged on the light emission side of said phase difference generation device; and an objective lens (13) for guiding the emitted light of said mirror (32) to the recording surface (1a) of said magneto-optic disk (1).

30. An optical pickup apparatus for a magneto-optic storage device as set forth in claim 20, which has:

a laser beam source (11);

an objective lens (13) which converges the emitted light from said laser beam source and irradiates the same onto the recording surface (1a) of the magneto-optic recording medium (1);

a polarization beam splitter (14) which is arranged between said laser beam source and the objective lens and splits the predetermined polarized beam component in the reflection light reflected at the recording surface of said magneto-optic recording medium; and a phase difference generation device which is arranged between said polarization beam splitter and said magneto-optic recording medium, has a 45 degree prism (40) and phase difference generating films (41, 41A, 41B) which have a plurality of division regions having mutual predetermined phase difference characteristics (41a:41b, 41aA:41bA, 41aB:41bB) coated on the reflection plane of said 45 degree prism and obtained by division into at least two on the plane orthogonal to said light axis (O-O'), and which are arranged so that the emitted light from said laser beam source (11) passes through one division region and the reflection light reflected at the recording surface (1a) of said magneto-optic recording medium (1) passes through another division region; and light detection elements (16, 16A) detecting the level of the predetermined polarized beam component split at said polarization beam splitter, and wherein the reflection light in the emitted light from said laser beam source, passed through one region of said phase difference generation device and reflected at the recording surface of said magneto-optic recording medium, is made to pass through another region of said phase difference generation device.

31. An optical pickup apparatus for a magneto-optic storage device as set forth in claim 1, wherein said phase change means comprises a combination optical rotating plate (52, 62, 72) which has at least two division regions (52a:52b, 62a:62b, 72a:72b) on the plane orthogonal to said light axis (0-0') and which are arranged so that the emitted light from said laser beam source (11) is passed through one region while right optical rotating or left optical rotating the emitted light at exactly a predetermined angle, and the reflection light reflected at the recording surface of said magneto-optic recording medium is passed through another region while optical rotating the reflection light in the inverse rotation direction to said rotation exactly at a predetermined angle.

32. An optical pickup apparatus for a magneto-optic storage device as set forth in claim 31, wherein the optical rotation angle of said optical rotating plate is defined by the material and thickness of said optical rotating plate.

33. An optical pickup apparatus for a magneto-optic storage device as set forth in claim 31, wherein said light detection element has a circuit which has a plurality of division regions corresponding to the division of said combination optical rotating plate, differentially computes the signals corresponding to the light receiving surface area detected in these division regions of the light detection element, and thereby detects the magneto-optic signal recorded in said magneto-optic recording medium.

34. An optical pickup apparatus for a magneto-optic storage device as set forth in claim 35, wherein said combination optical rotating plate (52) and said detector (16) are integrally constituted on the facing planes of said polarization beam splitter (14).

35. An optical pickup apparatus for a magneto-optic storage device as set forth in claim 31, wherein provision is made of an astigmatic optical system such as a condenser lens (17), cylindrical lens (18), etc. between said light detection element (16) and said polarization beam splitter (14).

36. An optical pickup apparatus for a magneto-optic storage device as set forth in claim 31, wherein a collimate lens (12) collimating the beam from said laser beam source to a parallel beam is provided between said laser beam source (11) and said polarization beam splitter (14).

37. An optical pickup apparatus for a magneto-optic storage device as set forth in claim 1, wherein:

said optical pickup apparatus for a magneto-optic storage device has an integral type apparatus having a laser coupler (20) which includes a microprism (23) having a plane (23a) with a predetermined inclination angle and having a first parallel plane reflecting the light incident through said plane at a first position and a second parallel plane parallel to said first parallel plane at which the light reflected at said first position is further reflected, and constituted so that the light reflected at a second parallel plane is further reflected to a second position of the first parallel plane; two light detection elements (24, 25) provided corresponding to said first position and second position of said first parallel plane, each having three division regions obtained by division into three, i.e., a center portion (24b, 25b) and two side portions (24a:24c, 25a:25c) thereof, respectively; and a laser beam source (22) provided so as to face said inclination plane of said microprism (23) said microprism, said two light detection elements and said laser beam source being integrally formed on the same semiconductor substrate (21), and a polarization beam splitter (14) provided on the side at which the light from said laser beam source (22) incident upon the inclination plane of said microprism (23) is reflected;

a mirror (32) which is arranged on said combination rotating plate (52) of said integral type apparatus so as to face each other; and an objective lens (13) which guides the emitted light of said mirror (32) to the recording surface (1a) of said magneto-optic disk.

38. An optical pickup apparatus for a magneto-optic storage device comprising:

a laser beam source (11);

an objective lens (13) which converges the emitted light from said laser beam source and irradiates the emitted light onto the recording surface (1a) of the magneto-optic recording medium (1);

a polarization beam splitter (14) which is arranged between the above-described laser beam source and the objective lens and splits the predetermined polarized beam component in the reflection light reflected at the recording surface of the above-described magneto-optic recording medium;

a combination optical rotating plate (52, 62, 72) which is arranged between said polarization beam splitter and the above-described magneto-optic recording medium, has division regions (52a:52b, 62a:62b, 72a:72b) on the plane orthogonal to the light axis (0-0'), and is arranged so that the emitted light from said laser beam source (11) is passed through one side region while right optical rotating or left optical rotating the emitted light exactly at a predetermined angle, and the reflection light reflected at the recording surface of the above-described magneto-optic recording medium is passed through the other side region while rotating the reflection light in the inverse rotation direction to the above-described rotation exactly at a predetermined angle; and light detection elements (16, 16A) which detect the level of the predetermined polarized beam component split at the above-described polarization beam splitter, and wherein the reflection light in the emitted light from said laser beam source, passed through one region of said combination rotating plate and reflected at the recording surface of said magneto-optic recording medium, is made to pass through another region of said combination rotating plate (52).

39. An optical pickup apparatus for a magneto-optic storage device as set forth in claim 31 or 38, wherein:

said combination optical rotating plates (52, 62 and 72) are divided by a line parallel to a pit-forming direction of the recording surface (1a) of said magneto-optic disk (1) and the optical rotation angles of said divisional left optical rotating plate (52a, 62a, 72a) and the optical rotation angles of the right optical rotating plate (52b, 62b, 72b) are set to predetermined values, so that phase change characteristics are adjusted.

40. An optical pickup apparatus for a magneto-optic storage device as set forth in claim 31 or 38, wherein:

said combination optical rotating plate (52, 62 and 72) is divided by a line orthogonal to a pit-forming direction of the recording surface (1a) of said magneto-optic disk (1) and the optical rotation angle of said divisional left optical rotating plate (52a, 62a, 72a) and the optical rotation angle of the divisional right optical rotating plate (52b, 62b, 72b) are set to predetermined values, so that phase change characteristics are adjusted.

41. An optical pickup apparatus for a magneto-optic storage device as set forth in claim 39, wherein the optical rotation angle of said combination optical rotating plate is set to about 10° or more.

42. An optical pickup apparatus for a magneto-optic storage device as set forth in claim 41, wherein the optical rotation angle of said combination optical rotating plate is set to 22.5°.

43. A combination optical rotating plate comprising at least two regions (52a, 52b) on a plane orthogonal to the light axis (0-0') and, formed so that the light incident upon one region is passed while right optical rotating or left optical rotating the light exactly at a predetermined angle, and the light incident upon another region is passed while optical rotating the light in the inverse rotation direction to said rotation exactly at a predetermined angle, wherein the optical rotation angle of said optical rotating plate is defined by the material and thickness of said combination optical rotating plate, and wherein the materials constituting said division regions are end face-adhered when they have a predetermined thickness, and are polished to a thickness giving the desired optical rotation angle, whereby said combination optical rotating plate is formed.

44. A combination optical rotating plate as set forth in claim 43, wherein:

said combination optical rotating plate (52, 62, 72) is divided in a predetermined orientation and the optical rotation angle of the divisional optical rotating plate is set to a predetermined value, to thereby adjust phase change characteristics.

45. An optical pickup apparatus for a magneto-optic storage device as set forth in claim 40, wherein the optical rotation angle of said combination optical rotating plate is set to about 10 or more.

46. An optical pickup apparatus for a magneto-optic storage device as set forth in claim 45, wherein the optical rotation angle of said combination optical rotation plate is set to 22.5°.

* * * * *